(12) United States Patent
Amico et al.

(10) Patent No.: US 7,426,302 B2
(45) Date of Patent: Sep. 16, 2008

(54) SYSTEM AND METHOD FOR DIGITIZING A PATTERN

(76) Inventors: John Amico, 12 Hilltop Rd., Bronxville, NY (US) 10708; Carmelo Sberna, 7 Colonial Rd., Bronxville, NY (US) 10708

(*) Notice: Subject to any disclaimer, the term of this patent is extended or adjusted under 35 U.S.C. 154(b) by 0 days.

(21) Appl. No.: 10/825,216

(22) Filed: Apr. 16, 2004

(65) Prior Publication Data
US 2005/0119779 A1  Jun. 2, 2005

Related U.S. Application Data

(60) Provisional application No. 60/525,137, filed on Nov. 28, 2003.

(51) Int. Cl.
*G06K 9/46* (2006.01)
(52) U.S. Cl. .................. 382/203; 382/111; 356/429
(58) Field of Classification Search .......... 382/108, 382/141, 111–113, 151, 169–174, 181, 194, 382/197–203, 256–270, 285, 289, 175, 312, 382/316, 321; 356/238.1, 429; 348/207.1; 345/582, 622; 700/138, 217; 250/235; 33/17 R
See application file for complete search history.

(56) References Cited

U.S. PATENT DOCUMENTS

| | | | | |
|---|---|---|---|---|
| 3,877,903 A | | 4/1975 | Peterson | |
| 4,554,635 A | | 11/1985 | Levine | |
| 4,575,628 A | * | 3/1986 | Bankart et al. | 250/235 |
| 4,583,181 A | * | 4/1986 | Gerber et al. | 700/143 |
| 4,780,960 A | * | 11/1988 | Merz | 33/17 R |
| 4,853,866 A | | 8/1989 | Andrada Galan et al. | |
| 5,089,971 A | | 2/1992 | Gerber | |
| 5,315,666 A | | 5/1994 | Norton-Wayne | |
| 5,379,350 A | * | 1/1995 | Shimazu et al. | 382/197 |
| 5,537,946 A | | 7/1996 | Sadeh et al. | |
| 5,757,661 A | | 5/1998 | Surville | |
| 5,790,687 A | | 8/1998 | McLaughlin et al. | |
| 5,815,398 A | * | 9/1998 | Dighe et al. | 700/217 |
| 5,831,857 A | * | 11/1998 | Clarino et al. | 700/135 |
| 5,838,569 A | | 11/1998 | Gane | |
| 5,953,232 A | | 9/1999 | Blaimschein | |
| 6,298,275 B1 | | 10/2001 | Herman, Jr. | |

(Continued)

FOREIGN PATENT DOCUMENTS

EP     0363178 B1    10/1989

OTHER PUBLICATIONS

ASTM Subcommittee D13-66, Standard Practice for Sewn Products Pattern DataInterchange—Data Format, Aug. 5, 2003.

(Continued)

*Primary Examiner*—Seyed Azarian

(57) ABSTRACT

The present invention provides a novel system and method for digitizing garment patterns. In a system embodiment, there are imaging devices supported above a garment pattern-making table. The imaging devices are connected to a computing device via a suitable network connection. The imaging devices are operable to capture data representative of a known garment pattern, and deliver that data to the computing device. In turn, the computing device is operable to vectorize the pattern. Once vectorized, the pattern is subjected to a fully automated recognition operation, and a file is outputted that includes a digitized pattern representing the garment pattern, including elements such as the border, turn points along the border and other specific elements within the border.

21 Claims, 47 Drawing Sheets

U.S. PATENT DOCUMENTS

| | | | |
|---|---|---|---|
| 6,587,745 B1* | 7/2003 | Polden et al. | 700/138 |
| 7,031,527 B2* | 4/2006 | Ishikawa et al. | 382/203 |
| 2004/0247180 A1 | 12/2004 | Ishikawa | |

OTHER PUBLICATIONS

Chenyang Xu and J. L. Prince, Active Contours and Gradient Vector Flow, [online] [Retreived on May 28, 2004] Retreived from Image Analysis and Communication Homepage, Johns Hopkins University at http://iacl.ece.jhu.edu/projects/gvf/.

International Search Report issued against International Serial No. PCT/IB2004/03214, dated Oct. 28, 2005.

Written Opinion issued against International Serial No. PCT/IB2004/03214, dated Oct. 28, 2005.

International Preliminary Report on Patentability issued against International Serial No. PCT/IB2004/03214, dated May 29, 2006.

L. Norton-Wayne et al., Measurement of Garment Dimensions using Machine Vision, 3rd International Conference on Image Processing and its Application, Jul. 1989, pp. 197-201.

J. Jimenez and J. Navalon, Some Experiments in Image Vectorization, IBM J. Res. Develop., vol. 26, No. 6, Nov 1982, pp. 724-734.

* cited by examiner

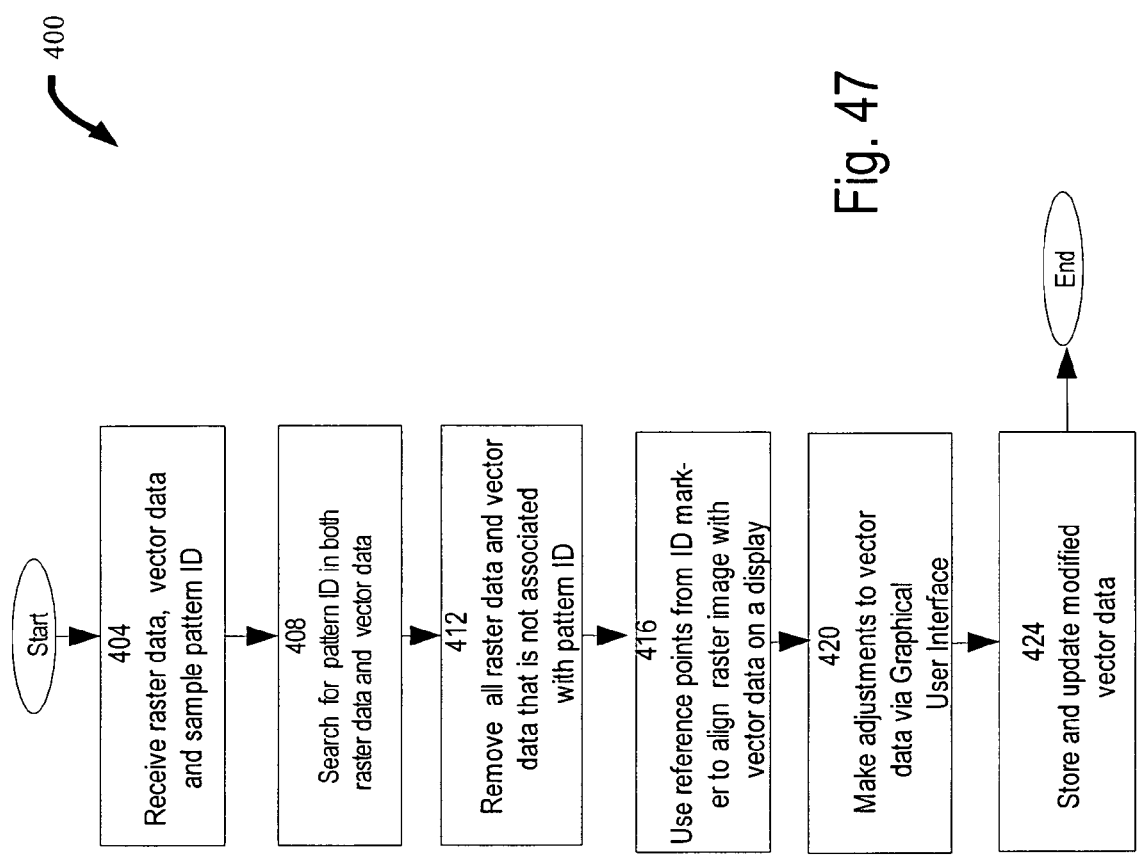

SYSTEM AND METHOD FOR DIGITIZING A PATTERN

PRIORITY

The present application claims priority from U.S. Provisional Patent Application No. 60/525,137, filed Nov. 28, 2003, the contents of which are incorporated herein by reference.

FIELD OF THE INVENTION

The present invention relates to garment design and manufacturing and more particularly relates to a system and method for automatically digitizing a garment pattern and the garment industry specific elements within it.

BACKGROUND OF THE INVENTION

The garment industry, like many other industries, is increasingly undergoing automation in order to improve efficiencies and quality in the design and manufacturing of garments. It is now well known to provide automatic garment manufacturing machines, such as automated cutting and stitching machines, which include computers that store a digitized pattern. In turn, the computers instruct the garment manufacturing machine to perform its task according to the stored pattern. Thus, an automated cutting machine can be instructed by the computer to cut particular patterns, while the automated stitching machine can be instructed by the computer to sew particular patterns and/or along certain seams and/or according to various types of threads. In this manner, one computer can instruct multiple machines to help produce garments of consistent size, pattern and quality. However, in order for the computer to issue these "instructions", the desired pattern must first be inputted into the computer, so that the computer knows what pattern is to be used to guide the cutting and sewing machines through their operations. As part of the digitizing process, key garment pattern elements specific to the industry should be both properly identified and formatted to the American Society for Testing and Materials/American Apparel Manufacturing Association-Drawing Interchange (ASTM/MMA-DXF) file standard. This collation is necessary in order for the output file to be useable by garment industry CAD systems.

While the automation of garment manufacturing machines is well established, there are many deficiencies in the areas of pattern digitization and the recognition of industry specific elements.

It is known to enter a garment pattern into the computer using an electromechanical system known as a manual digitizing table that can detect the position of a manually movable input stylus known as a "puck". More particularly, the user lays the garment pattern onto the digitizing table. Using the puck, the operator can input the dimensions and features of a garment pattern into the computer. There is much human input involved in this procedure, causing it to be a slow and error-prone method of digitizing a garment pattern.

U.S. Pat. No. 3,887,903, issued Jun. 3, 1975, describes a digitizing table for manually inputting the digital coordinates representing both the boundary of the pattern piece and industry specific elements such as turn points, grain lines, notches, drill holes, etc. While this system is accurate in representing the complete details of a garment pattern, the input process is completely manual. This process can be applied to both "cut out" and "non-cut out" patterns.

U.S. Pat. No. 4,575,628, issued Mar. 11, 1986, describes a scanner for semi-automated digitizing of a pattern piece. Prior to scanning the piece, manual pre-marking is required of industry specific elements including turn points, grain lines, notches, drill holes, etc. While this semi-automated process is faster than a completely manual process, the pre-marking of the pattern's industry specific elements slows the total processing time significantly. Further, this process can only be applied to "cut out" patterns, but not "non-cut out" patterns. In addition, this system does not automatically detect and format ASTM/AAMA pattern elements necessary to the garment industry.

U.S. Pat. No. 4,554,635, issued Nov. 19, 1985, describes a process for a marker making system for laying out patterns, mainly to make ventilation ducts in the duct mark identifying, coupled with automated CAD abilities for drafting new patterns based on user input parameters. However, in this patent, an operator must manually input specific information, and so the system does not automatically recognize pattern elements. Similarly, U.S. Pat. No. 6,298,275, issued Oct. 2, 2001, describes a process for temporarily identifying cut sheet material through the use of a signal generation. Both systems can identify individual pieces through border paths detection, but neither has the ability to recognize specific elements within the pieces.

U.S. Pat. No. 5,537,946, issued Jul. 23, 1996, describes a sewing system which captures the image of the pattern piece to be sewn, and analyzes and measures the location of all the edges of the part, using a man-machine interface for inputting sewing parameters such as stitch size and distance of the stitch from the edge. All data is then used to generate therefrom a sewing program for sewing the part along its edges. This system, however, does not have the ability to export pictures directly to software programs used extensively in the garment industry.

There are still further disadvantages of prior art methods of garment patternmaking. For example, as part of the manual patternmaking process, current industry practices involve transfers of the pattern piece representations back and forth between white paper patterns and cutout patterns. As an additional example, in the garment industry it is common to keep "rubbings" of the actual garment prototype. These images are used as a communication tool between work groups in the production environment. However, the quality of the information conveyed through this medium is inadequate for garment industry purposes.

The purpose of digitizing a garment pattern is mainly to generate a digital output file for use with either garment CAD or grading systems. CAD systems allows designers and pattern makers to make adjustments to a pattern piece. Grading systems allow production managers to efficiently create a full size range of patterns from a single base pattern. In either process, substantial time savings can be gained over their manual alternatives by use of a fully automated digitizing system.

As part of the digitizing process, key garment pattern elements specific to the industry must be both properly identified and formatted to the ASTM/AAMA-DXF file format standard. The elements defined in this format include but are not limited to boundary line, turn points (also known as corner points), curve points, notches, grade reference lines, alternate grade reference lines, mirror lines, grain lines, internal lines, stripe reference lines, plaid reference lines, internal cutouts, drill holes, sew lines, cut lines and fold lines. This collation is necessary in order for the output file to be usable by garment industry CAD and grading systems.

Digitizing a garment pattern is also useful for pattern correction. Traditionally, pattern making and correction has been done by hand. Artisans with extensive training have been needed to achieve the delicate curves required, particularly at finer levels of garment production. This manual process is performed by the pattern maker using a pencil or pen to draw directly on a pattern piece, with corrections being made by hand to change the existing boundary and/or internal elements specific to the garment industry.

CAD systems have been modified to allow operators to perform similar technical corrections. First, however, a hand drafted pattern must be digitized into the system before an operator can make the corrections. As patterns become more complex, however, CAD systems do not have the capability to make fine adjustments at the same quality level as manual pattern correction. Working at this level of detail, CAD systems tend to lose either time, efficiency or quality.

A fully automated digitizing system is also useful for grading. Grading encompasses the process of generating a full size range of patterns from a single base size. For example, if the base pattern size is a size 8, a size range is created by drafting identically shaped patterns that are proportionately larger or smaller to produce the corresponding sizes 2, 4, 6, 10, 12, 14, 16. Computer grading systems have been developed to automate the drafting of pattern size ranges based on a sample pattern. First, however, a hand drafted pattern must be digitized into the system before an operator can begin the grading process. While computerized grading is extremely efficient at generating multiple size ranges from a single pattern, the process requires that grade movement be calculated and manually assigned to multiple locations prior to processing. This mandatory step is time consuming and can only be done by operators highly skilled in the art. U.S. Pat. No. 5,757,661, issued May 26, 1998, describes a computer system which automatically generates grading rules from a measurement scale in order to perform the grading requirements for garment patterns. However, this patent does not describe a method for automatically identifying grade points and does not describe a method for automatically assigning grade point numbers.

Finally, a fully automated digitizing system is useful for garment cataloging. Taking a picture of a garment has been a means for production managers to convey a description of the product to manufacturers. It is commonplace in the garment industry to take a single picture at a distance in order to capture the general details of a garment. Additionally, a series of tiled pictures are taken at close range in order to capture the finer details of the garment. While the information obtained from this procedure is reasonably useful, the process is time consuming and the output is difficult to collate. Also, the level of detail within each picture is inflexible (i.e., there is no "zoom" feature).

Finally, garment CAD and grading systems typically use a monitor in conjunction with a mouse-type input control device to maneuver the on screen pointer needed to operate an application. Whether the user is digitizing, pattern correcting, or grading, these systems generally incorporate a "heads-up" display interface where to effect an adjustment, the operator looks up at the display monitor and coordinate a mouse on a separate plain of operation. In some procedures the operator attempts to use this process to duplicate the same effect produced naturally by drafting pen on paper. Satisfactory results are difficult to achieve because again the viewer display is on a different plane of operation than the mouse. While this is considered the current state of the art for input control devices, it requires a deft hand and considerable practice on the part of the operator to achieve satisfactory results.

SUMMARY OF THE INVENTION

It is an object of the present invention to provide a novel system and method for garment pattern digitization that obviates or mitigates at least one of the above-identified disadvantages of the prior art.

The present invention provides a garment pattern digitization system that can automatically import a digital image of a garment pattern (raster data), and then export the information to a DXF/AAMA-formatted file (vector data). In one aspect of the invention, pattern shapes are digitized by receiving data representing shape(s), identifying the outline(s) of such shapes in the data, and identifying various pattern elements, such as, boundary line, turn points (also known as corner points), curve points, notches, grade reference lines, alternate grade reference lines, mirror lines, grain lines, internal lines, stripe reference lines, plaid reference lines, internal cutouts, drill holes, sew lines, cut lines and fold lines outline(s).

Another aspect of the invention provides a system for digitizing shapes, with a memory arrangement including a computer program and a processing arrangement which, when executing the computer program, receives data representing shape(s), identifies outline(s) of such shapes in the data, and identifies various pattern elements of such outline(s).

Another aspect of the invention provides a software storage medium which, when executed by a processing arrangement, is configured to digitize shapes. This software storage medium includes a software program that has (i) a first module which, when executed, receives data representing shape (s), (ii) a second module which, when executed, identifies outline(s) of shape(s) in the data, and (iii) a third module which, when executed, identifies various pattern elements of such outline(s).

Another aspect of the invention provides a method of garment pattern digitization by (i) receiving image data representative of a garment pattern, (ii) analyzing the image data to create vector data, (iii) analyzing the vector data to identify, measure, and classify garment pattern elements, and (iv) outputting a digitized representation of the pattern. The garment pattern can be any of a hard-paper cutout pattern, a white-paper non-cutout pattern, or a photograph of an actual garment. The pattern elements being identified can include the boundary of the pattern itself, or the turn points and curve points on such pattern boundary, notches, mirror lines, internal lines, internal cutouts, grain lines, drill holes, grade reference lines, stripe reference lines, plaid reference lines, sew lines, alternate grade reference lines, cut lines and fold lines.

Another aspect of the invention provides a method of digitizing shapes, the method comprising the steps of:
receiving at least one data representing at least one shape, identifying at least one outline of the at least one shape in the at least one data, and
identifying at least one corner of the at least one outline.

Another aspect of the invention provides a system for digitizing shapes comprising: a memory arrangement including thereon a computer program; and a processing arrangement which, when executing the computer program, is configured to: receive at least one data representing at least one shape, identify at least one outline of the at least one shape in the at least one data, and identify at least one corner of the at least one one outline.

Another aspect of the invention provides a software storage medium which, when executed by a processing arrangement, is configured to digitize shapes, the software storage medium comprising a software program including: a first module which, when executed, receives at least one data representing at least one shape, a second module which, when executed, identifies at least one outline of the at least one shape in the at least one data, and a third module which, when executed, identifies at least one corner of the at least one outline.

Another aspect of the invention provides a method of garment pattern digitization comprising the steps of:
- receiving image data representative of a garment pattern;
- analyzing the image data and vectorizing the image data to convert the image data to vector data;
- analyzing the vector data, to identify, measure, and classify at least one garment pattern element; and,
- outputting a digitized representation of the hard-paper pattern.

The user input can be received on a heads-down interactive display and the user output can be received on a heads-down interactive display.

The pattern can be a hard-paper cutout pattern, a white-paper non-cutout pattern, a photograph of an actual garment, or other physical representation of a garment.

The least one pattern element can be a pattern boundary. The analyzing step can include at least one additional pattern element, being a turn points on the pattern boundary. The analyzing step can include at least one additional pattern elements being a curve points on the pattern boundary.

The at least one pattern element can be selected from the group consisting of notches, grain lines, mirror lines, internal lines, internal cutouts, grade lines, alternate grade lines, stripe reference lines, plaid reference lines, drill holes, sew lines, cut/fold lines, and balance lines.

Another aspect of the invention provides a method of identifying the pattern boundary of a garment pattern, the method comprising the steps of:
- receiving a color raster image of the garment pattern;
- selecting an optimum color filter;
- converting the color raster image to grey-scale raster data;
- converting the grey-scale raster data to black and white raster data;
- converting the black and white raster data to vector data;
- determining a subclass of the vector data that form polygons;
- determining largest polygon;
- labeling largest polygon "pattern boundary";
- digitizing pattern boundary in garment industry file format.

The garment industry file format can be selected from the group consisting of ASTM/AAMA-DXF, Gerber (a.k.a. Accumark), Lectra Investronica, Optitex, Polygon, PAD, and Micromark.

Another aspect of the invention provides a method of identifying a turn point of a garment pattern, the method comprising the steps of:
- receiving at least three digitized pattern boundary points of the garment pattern;
- arranging the boundary points sequentially;
- determining the angle between the three boundary points;
- identifying a middle point of the three points as a turn point if the angle is less than about one hundred and eighty degrees and is substantially less than a predetermined threshold, or if the angle is more than about one hundred and eighty degrees and the result of subtracting the angle from three hundred and sixty is substantially less than the predetermined threshold;
- outputting the turn point to a user output device.

The receiving, arranging, determining, identifying and outputting steps can be repeated for each pattern boundary point of the garment pattern.

Another aspect of the invention provides a method of identifying a curve point of a garment pattern, the method comprising the steps of:

(i) receiving a plurality of boundary points and a plurality of turn points of the garment pattern;
(ii) arranging the boundary points and the turn points sequentially;
(iii) selecting sequences of two consecutive turn points;
(iv) selecting all boundary points that lie between the sequences of two consecutive turn points and identifying the selected boundary points as curve points if the boundary points do not substantially lie on a straight line between the two consecutive turn points;
(v) out putting the identified curve points to a user output device.

Steps (i)-(v) can be repeated for all the sequences of two consecutive turn points of the garment pattern element.

Another aspect of the invention provides a method of identifying notch points of a garment pattern, the method comprising the steps of:
(i) receiving a plurality of boundary points and a plurality of turn points of the garment pattern;
(ii) arranging the boundary points and the turn points sequentially;
(iii) selecting sequences of five consecutive turn points, comprising a first, second, third, fourth and fifth turn points;
(iv) identifying the consecutive turn points as notch points provided that:
- the distance between first notch point and fifth notch point is substantially equal to a predetermined standard notch distance, and
- the difference in direction of the garment pattern before and after the turn points is substantially equal to a predetermined angles matching angles of standard predefined notches;
(v) outputting the notch points to a user output device.

The above method can be specifically implemented wherein,
- the difference in direction of the garment pattern, immediately before and after the first turn point is about positive two hundred and seventy degrees, and
- the difference in direction of the garment pattern, immediately before and after the second turn point is about positive forty five degrees, and
- the difference in direction of the garment pattern immediately before and after the third turn point is about positive ninety degrees, and
- the difference in direction of the garment pattern immediately before and after the fourth turn point is about positive forty five degrees, and
- the difference in direction of the garment pattern immediately before and after the fifth point is about positive two hundred and seventy degrees.

Steps (iii), (iv), and (v) of the method can be repeated for all the sequences of five consecutive turn points of the garment pattern element.

Another aspect of the invention provides a method of identifying notch points of a garment pattern, the method comprising the steps of:
(i) receiving a plurality of boundary points and a plurality of turn points;
(ii) receiving original raster data from which vector data was extracted;
(iii) receiving at least one image of a known notch;
(iv) arranging the boundary points and turn points in sequential order;
(v) selecting a turn point;
(vi) locating the selected turn point on the original raster data;

(vii) extracting a sub-image substantially adjacent to selected turn point;

(viii) determining whether there is a group of boundary points either before or after the turn point that substantially correspond with at least one of the images;

(ix) identifying the group of boundary points as a notch corresponding to the image; and (x) outputting the notch to a user output device.

Steps (v)-(x) can be repeated for all the turn points of the garment pattern element.

Another aspect of the invention provides a method of modifying the shape of an extracted notch, the method comprising the steps of:

receiving a plurality of pattern boundary points and notch points forming at least one notch;

selecting a notch receiving raster data representing the garment pattern;

locating an image of the selected notch on the raster data;

locating a centre of the image;

locating a straight line substantially perpendicular to the pattern boundary in substantially close vicinity of the image;

notifying a user that there is a discrepancy and prompting the user to choose between the straight line and the selected notch, if the straight line does not intersect the pattern boundary at the centre of the image.

Another aspect of the invention provides a method of identifying a grain line of a garment pattern, the method comprising the steps of:

(i) receiving a plurality of vector points of the garment pattern;

(ii) determining which vector points form polygons;

(iii) determining which polygon forms a pattern boundary;

(iv) removing vector points that form the polygons except for the pattern boundary;

(v) arranging vector points according to lines and in sequential order;

(vi) identifying each line as a grain line where:

all vector points forming the line are substantially on a straight line; all points forming the lines are substantially within the pattern boundary;

the line is substantially parallel to a row of pixels in the raster data;

the line has an arrowhead at one end; and the line has a length within an acceptable range;

(vii) outputting the grain line to a user output device.

The identifying step and the outputting step can be repeated for every the line of the garment pattern element.

The method can be implemented using the following steps to identify an arrowhead, the method comprising the steps of:

receiving a library of known arrowheads comprising a plurality of arrowheads receiving any objects that intersect the line;

identifying a the object as an arrowhead if one of the arrowheads in the library of known arrowheads substantially aligns with the object.

The method can be implemented by performing the following steps to identify an arrowhead, the method comprising the steps of:

receiving all line segments intersecting the line;

identifying two line segments as forming an arrowhead provided that:

the two line segments intersect the line in almost the same location;

the two line segments have a predefined maximum length;

each of the two line segments is less than about positive ninety degrees on either side of the line; and neither of the two line segments intersects another pattern element or line segment.

Another aspect of the invention provides a method of identifying drill holes of a garment pattern, the method comprising the steps of:

receiving a plurality of vector points;

arranging vector points according to lines and in sequential order;

determining which the points form a pattern boundary;

removing all the points which form the lines except points forming the pattern boundary and points forming line segment pairs that intersect each other but do not intersect the pattern boundary;

identifying a line segment pair as a drill hole provided that:

each line segment in the line segment pair is substantially perpendicular to the other line segment in the pair;

each line segment in the line segment pair is about a quarter of an inch in length; and each line segment in the line segment pair is substantially within the pattern boundary;

outputting the drill hole to a user output device.

The arranging, identifying and outputting steps can be repeated for all the line segment pairs of the garment pattern in a substantially sequential order.

Another aspect of the invention provides a method of identifying fold-cut lines of a garment pattern, the method comprising the steps of:

(i) receiving a plurality of vector points of the garment pattern;

(ii) arranging the points according to lines and in sequential order;

(iii) determining which the lines form a pattern boundary;

(iv) removing all the points except points that form the pattern boundary and points that form line segments which intersect the pattern boundary;

(v) determining boundary intersection points to be points of intersection of the pattern boundary and the line segments which intersect the pattern boundary;

(vi) selecting one boundary intersection point, (vii) constructing reference lines from the selected boundary intersection point to all other boundary intersection points that are not selected and labeling them opposing boundary intersection points, sequentially arranging the opposing boundary intersection points, selecting one opposing boundary intersection point at a time, receiving linear region from original raster data that corresponds to the selected boundary intersection point and the selected opposing boundary intersection point, determining whether there is a dashed line between the selected boundary intersection point and the selected opposing boundary intersection point and identifying the dashed line as fold-cut line;

(viii) outputting the fold-cut line to user output device.

Steps (vi) to (viii) are repeated for all the boundary extraction points.

Another aspect of the invention provides a method of identifying internal cutouts of a garment pattern, the method comprising the steps of:

(i) receiving a plurality of vector points of the garment pattern;

(ii) arranging vector points according to lines and in sequential order;

(iii) determining which the lines form a pattern boundary;

(iv) selecting all lines, except the pattern boundary;

(v) determining background color of the garment pattern;

(vi) determining whether each selected line is entirely within the pattern boundary, and if so, receiving original raster data corresponding to each selected line; and determining whether the enclosed region in the original raster data includes the background color;

(vii) identifying a selected line as an internal cutout if the selected line is entirely within the pattern boundary and the enclosed region in the original raster data includes the background color;

(viii) outputting the internal cutout to a user output device.

Steps (vi) to (viii) are repeated for all the selected lines.

Another aspect of the invention provides a method of identifying mirror lines of a garment pattern, the method comprising the steps of:

(i) receiving vector points of the garment pattern;

(ii) arranging vector points according to lines and in sequential order;

(iii) determining which the lines form a pattern boundary;

(iv) removing all the points forming polygons, except points forming the pattern boundary;

(v) identifying a remaining line as a mirror line, if for that particular remaining line:
  it is determined that all vector points on the remaining line lie are substantially straight,
  it is determined that the end points of the remaining line intersect the pattern boundary, and
  it is determined that after generating a series of equally spaced points along the selected line and, for each the substantially equally spaced point along the selected line, constructing a line substantially perpendicular to the selected line extending to the pattern boundary on either side of the selected line, it is determined that each equally spaced point along the selected line is at about midpoint of each line perpendicular to the selected line extending to either sides of the selected line;

(vi) outputting the mirror line to a user output device.

Steps (v) and (vi) can be repeated for all the remaining lines.

Another aspect of the invention provides a method of identifying sew lines of a garment pattern, the method comprising the steps of:

(i) receiving vector points of a garment pattern;

(ii) arranging vector points according to lines and in sequential order;

(iii) determining which the lines form a pattern boundary;

(iv) removing all the lines except lines forming the pattern boundary and lines containing at least one turn point;

(v) identifying a remaining line as a sew line, if every vector point on that particular remaining line is about one half of an inch from the pattern boundary;

(vi) outputting the sew line to a user output device.

Steps (v) and (vi) can be repeated for all the remaining lines.

Another aspect of the invention provides a method of identifying plaid reference lines of a garment pattern, the method comprising the steps of:

(i) receiving vector points of the garment pattern;

(ii) arranging vector points according to lines and in sequential order;

(iii) determining which the lines form a pattern boundary;

(iv) removing all the line except the pattern boundary and lines intersecting the pattern boundary;

(v) labeling remaining lines sequentially by order of appearance around the pattern boundary;

(vi) identifying a the remaining line as a plaid reference line if it is determined that the remaining line is:
  substantially perpendicular to the pattern boundary,
  less than about one half of an inch in length,
  does not have a substantially identical neighbor about one quarter of an inch in the counterclockwise direction, and has three almost equally-spaced substantially identical neighbors about one quarter of an inch to three eighths of an inch in the clockwise direction;

(vii) outputting the plaid reference line to a user output device.

Steps (vi) and (vii) can be repeated for all the remaining lines.

Another aspect of the invention provides a method of identifying stripe reference lines of a garment pattern, the method comprising the steps of:

(i) receiving vector points of the garment pattern;

(ii) arranging vector points according to lines and in sequential order;

(iii) determining which the lines form a pattern boundary;

(iv) removing all the line except the pattern boundary and lines intersecting the pattern boundary;

(v) labeling remaining lines sequentially by order of appearance around the pattern boundary;

(vi) identifying a the remaining line as a stripe reference line if it is determined that the remaining line is:
  substantially perpendicular to the pattern boundary,
  less than about one half of an inch in length,
  does not have a substantially identical neighbor, about one quarter of an inch in the counterclockwise direction, and has one or two almost equally-spaced substantially identical neighbors, about one quarter of an inch to three eighths of an inch in the clockwise direction;

(vii) outputting the stripe reference line to a user output device.

Steps (vi) and (vii) are repeated for all the remaining lines.

Another aspect of the invention provides a method of identifying balance lines of a garment pattern, the method comprising the steps of:

(i) receiving vector points of the garment pattern;

(ii) arranging vector points according to lines;

(iii) determining which of the lines form a pattern boundary and which of the lines form a grain line;

(iv) removing all the lines except lines forming the grain line, lines forming the pattern boundary and lines intersecting the grain line;

(v) arranging the lines intersecting the grain line by order of intersecting the grain line;

(vi) identifying a line intersecting the grain line as a balance line if it is determined that the line,
  is substantially perpendicular to the grain line,
  intersects the grain line substantially at midpoint of the line segment, and
  has endpoints which intersect the pattern boundary;

(vii) outputting the balance line to a user output device.

Steps (vi) and (vii) are repeated for all the lines.

Another aspect of the invention provides a method for assigning grading grid layouts to a garment pattern, the method comprising the steps of:

receiving a library of grading grid layouts comprising the grade rule numbers, the each grading grid layouts associated with a different type of garment pattern;

receiving a vectorized image of the garment pattern;

matching vectorized image of the garment pattern with one of grading grid layouts in the library;

substantially aligning the vectorized image of pattern piece with grading grid layout;

outputting the garment pattern substantially aligned with the grading grid layout to a user output device.

The garment pattern can be substantially aligned with the grading grid layout by substantially aligning the center mass point of the garment pattern with the grading grid layout.

The garment pattern can also be substantially aligned by substantially aligning the axis of the grading grid layout with the axis of the garment pattern.

Another aspect of the invention provides a method for assigning grade rule numbers of a garment pattern, the method comprising the steps of:

(i) receiving list of rectangular coordinates (x,y) of turn points and notch points;

(ii) labeling the turn points and notch points as grade points;

(iii) labeling grade points in sequential order;

(iv) selecting a point (n,m) as reference point;

(v) performing a linear transformation wherein all grade points (x,y) are transformed to grade points (x-n, y-m);

(vi) selecting a grading grid layout comprising a plurality of sectors overlaying the garment pattern;

(vii) assigning a grading rule to each the grade point (x-n, y-m), in accordance with the location of each the grade point within the sectors of the grading grid layout.

The method can be performed for all the grade points of the garment pattern.

The sectors may comprise four quadrants. In which case the grade points can be:

determined to be located in the first quadrant and are assigned a first grade rule, if it is determined that the y-coordinate of the grade point is substantially larger than zero and the x-coordinate of the grade point is substantially larger than zero;

determined to be located in the second quadrant and are assigned a second grade rule, if it is determined that the y-coordinate of the grade point is substantially larger than zero and the x-coordinate of the grade point is substantially smaller than zero;

determined to be located in the third quadrant and are assigned a third grade rule, if it is determined that the y-coordinate of the grade point is substantially smaller than zero and the x-coordinate of the grade point is substantially smaller than zero;

determined to be located in the fourth quadrant and are assigned a fourth grade rule, if it is determined that the y-coordinate of the grade point is substantially smaller than zero and the x-coordinate of the grade point is substantially larger than zero.

The reference point (n,m) can be the center mass point of the pattern piece.

Another aspect of the invention provides a method for automatically updating digitized images of pattern elements, the method comprising:

receiving raster data, vector data and a sample image of a pattern ID;

searching for the pattern ID in both the raster data and the vector data;

selecting the raster data and the vector data that is associated with the pattern ID;

creating a difference image by subtracting the selected raster data from the selected vector data;

vectorizing the difference image;

determining end points of intersection of the vectorized difference image with the vector data;

identifying portions of the vectorized difference image and portions of the vector data that lie between the end points of intersection;

removing the portions of vector data that lie between the end points of intersection, and replacing the portions of vector data with the portions of vectorized difference image that lie between the end points of intersection.

Another aspect of the invention provides a method of manually updating digitized images of pattern elements, the method comprising:

receiving raster data and vector data;

receiving a sample image of a pattern ID, the pattern ID comprising a plurality of reference point;

searching for the pattern ID in both the raster data and the vector data;

removing all portions of the raster data and all portions of the vector data that is not associated with the pattern ID;

using the reference points of pattern ID to align the raster image with the vector data;

making desired adjustments to vector data using a graphical user interface.

The graphical user interface used for all of the foregoing can be a heads-down interactive display.

The present invention provides a novel garment cataloging system and method, by using the teachings herein to collect a plurality of images for a plurality of garments.

BRIEF DESCRIPTION OF THE DRAWINGS

The invention will now be described by way of example only, and with reference to the accompanying drawings, in which:

FIG. 47 shows a flow chart of a method of correcting pattern boundaries in accordance with another embodiment of the invention.

DETAILED DESCRIPTION OF THE INVENTION

Figure 1:
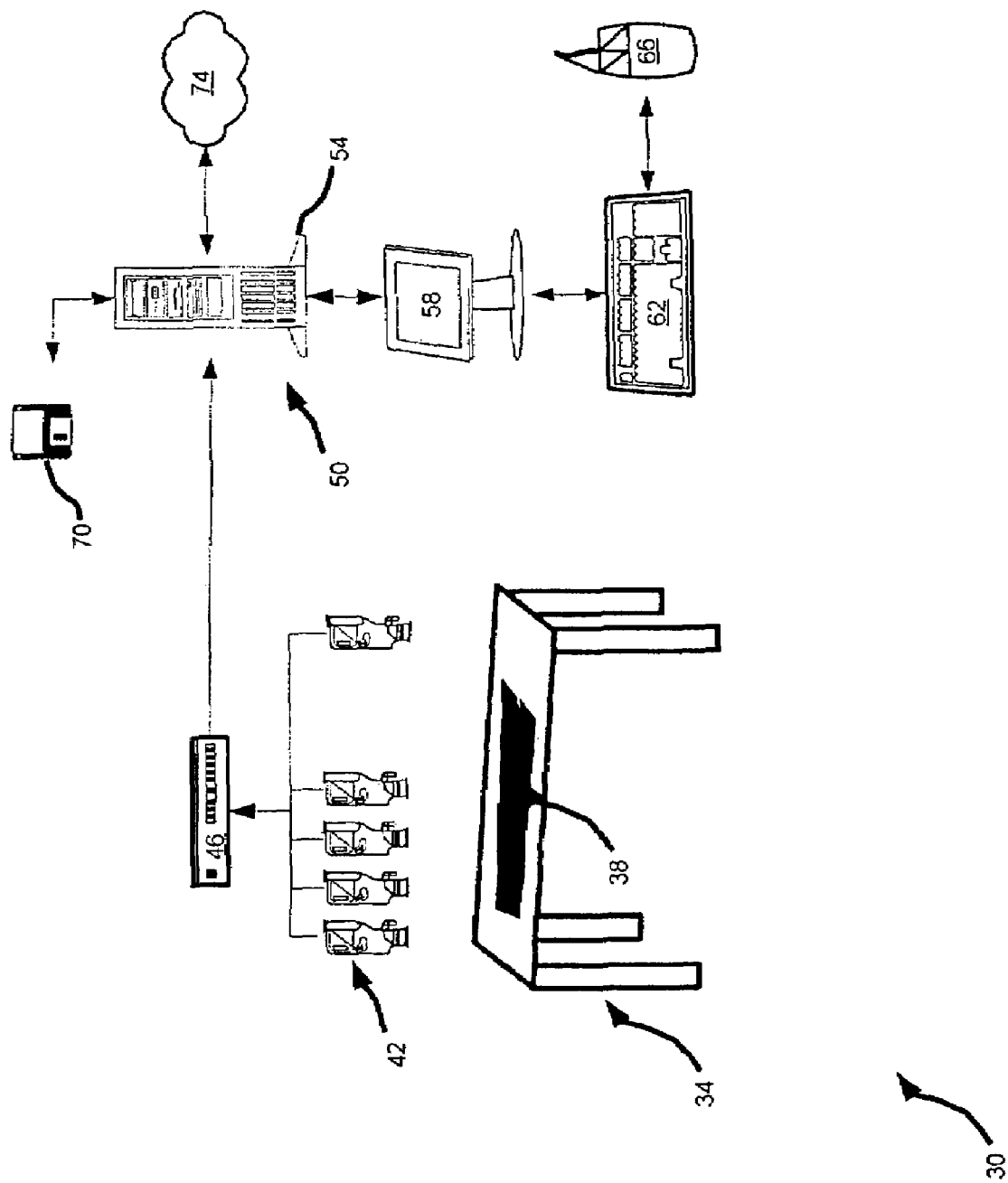
FIG. 1 shows a schematic representation of a system for garment pattern digitization in accordance with an embodiment of the invention.

Referring now to FIG. 1, a garment digitizing system in accordance with an embodiment of the invention is indicated generally at 30. System 30 includes an industry standard garment pattern-making table 34, which can support a pattern 38. One or more imaging devices 42 are disposed over table 34. In a presently preferred embodiment, devices 42 are an array of four complementary metal oxide semiconductor ("CMOS") pixel image sensors each with its own optics and universal serial bus ("USB") communications electronics. In a present embodiment, the array of four devices 42 are disposed about forty-two inches (3 and ½ feet) above table 34 in a two-by-two grid over table 34 such that table 34 is notionally divided into four squares. In a present embodiment, the array of devices 42 are mounted on a frame such that the array of devices 42 does not inhibit access to the surface of the table to allow users to adjust, remove, replace or otherwise work with pattern 38. (In other embodiments, however, devices 42 can simply be a single scanner or the like.)

Imaging devices 42, in turn, are connected to a USB hub 46 that connects to a garment pattern computing device 50. In a present embodiment, device 50 comprises a CPU tower 54 that interconnects a monitor 58 (and/or other output devices), a keyboard 62, a mouse 66 (and/or other input devices). Tower 54 also houses a persistent storage device such as a hard disc drive and a removable storage device that can be used to store data on a removable storage medium 70. Tower 58 further includes a network interface card (or other network interface means) for managing incoming and outgoing communications with a network 74. Network 74 can be any type of computer network, such as intranet, the Internet, a local area network or a wide area network or combinations thereof. Further, network 74 can be connected to one or more garment manufacturing machines such that the digitized patterns generated by device 50 can be automatically transferred to one or more garment manufacturing machines that can utilize the digitized patterns to automatically produce garments.

Figure 2:
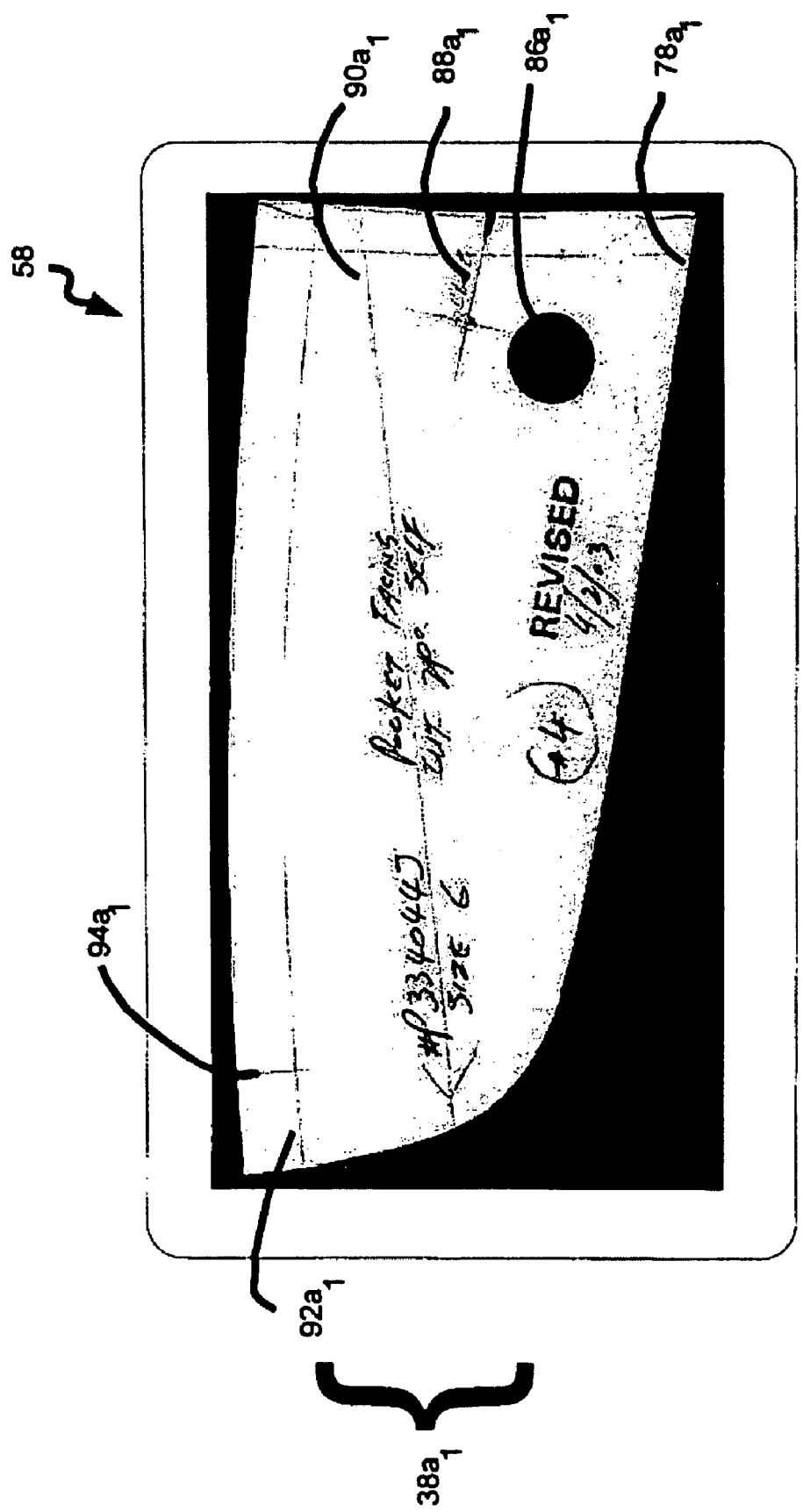
FIG. 2 shows an image of a clothing pattern of the type used in the system in FIG. 1.

The computing environment of device 50 includes an operating system and computer software operable to receive imaging data captured by imaging devices 42 via hub 46, and to process such received data in order to generate a digitized representation thereof. In particular, tower 54 is operable to stitch the array of four individual images captured by each imaging device 42 into a single raster image, a representation of which is indicated generally at 38*a*1 in FIG. 2. FIG. 2 shows raster image 38*a*1 as it would be displayed after capture on monitor 58. Of particular note, while FIG. 2 shows raster image 38*a*1 in black-and-white, it is to be understood that the initially captured raster image 38*a*1 is typically in color (although need not be). Thus, in the present embodiment, raster image 38*a*1, as shown in monitor 58, is to be considered a color image.

Raster image 38*a*1 includes a rasterized image of pattern 38 and the surrounding area of table 34. A viewer examining raster image 38*a*1 on monitor 58 will be able to discern various elements present on pattern 38, including a boundary line 78*a*1, an internal cutout line 86*a*1, a drill hole 88*a*1, a grain line 90*a*1, a stitch line 92*a*1, and a plurality of notches 94*a*1. However, while the viewer can discern these elements by viewing raster image 38*a*1 on monitor 58, such elements are not yet known to system 30 and thus raster image 38*a*1 will undergo further processing.

Other pattern elements that are not included in image 38*a*1, but can be part of a garment pattern image captured in system 30, include, but are not limited to, boundary lines, turn points, corner points, curve points, notches, grade reference lines, alternate grade reference lines, mirror lines, grain lines, internal lines, stripe reference lines, plaid reference lines, internal cutouts, drill holes, sew lines, cut lines and fold lines, and any other pattern elements that can form part of a garment pattern, some of which are enumerated in a document published by the American Society for Testing and Material (ASTM), entitled "Standard Practice for Sewn Products Pattern Data Interchange—Data Format", developed by ASTM Subcommittee D13-66, on Aug. 5, 2003, Revision of D6673-01 (and its successors), the contents of which are hereby incorporated by reference.

Figure 3:
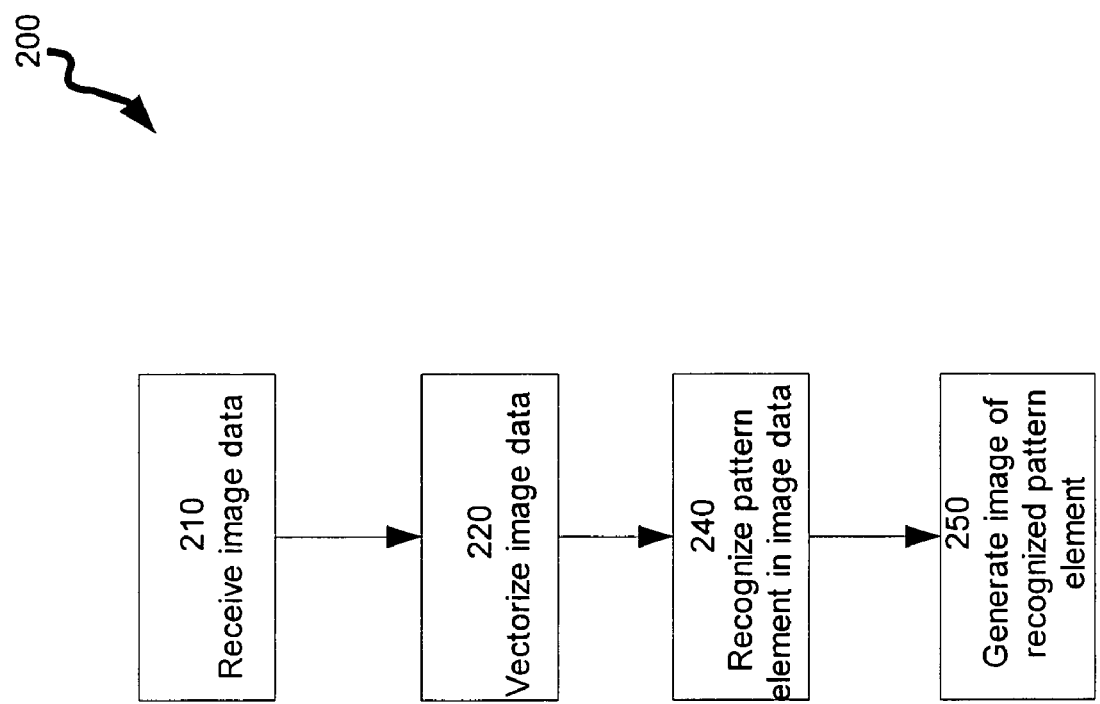
FIG. 3 shows a flow chart of a method for garment digitizing in accordance with another embodiment of the invention.

Referring now to FIG. 3, a method for garment pattern digitization in accordance with another embodiment of the invention is indicated generally at 200. In order to assist in the explanation of the method, it will be assumed that method 200 is operated using system 30. Furthermore, the following discussion of method 200 will lead to further understanding of system 30 and its various components. However, it is to be understood that system 30 and/or method 200 can be varied, need not work exactly as discussed herein in conjunction with each other, and that such variations are within the scope of the present invention.

Beginning at step 210, image data is received. In the present example, this image data consists of four image squares, which are received by tower 54 via hub 46 from devices 42 and are stitched together in device 50 to form one single image 38*a*1 shown in FIG. 2. Each image consists of a set of pixels (also known as raster data), which are stitched together to form one complete set of pixels, as shown in image 38*a*1 on FIG. 2.

Method 200 then proceeds to step 220, where the data received at step 210 is vectorized. A vector is a quantity that has magnitude and direction. It can be represented by a straight line, with magnitude being represented by the length of the line and direction being represented by the orientation of the line in space. In a present embodiment, raster data, consisting of a set of pixels is converted into a set of vectors.

Next, Method 200 proceeds to step 240, where a representation of a particular pattern element is to be recognized. Boundary lines, turn points, curve points, drill holes, internal lines, internal cutouts, grain lines, notches are examples of pattern elements whose representations can be recognized in image 38*a*1.

Next, at step 250, a vector representation corresponding to the recognized pattern element, in garment industry machine readable format, is generated. In the present embodiment, the machine readable format is compatible with various CAD and Computer Aided Manufacturing (CAM) systems, such as Gerber, Lectra Investronica, ASTM/AAMA-DXF), Optotex, Polygon and PAD.

Various specific implementations for method 200 are contemplated and are within the scope of the invention. For example, referring to FIG. 4, a method for recognition of outer boundary lines of garment patterns (herein after referred to as a "pattern boundary") is indicated generally at 200*a*. In order to assist in the explanation of the method, it will be assumed that method 200*a* is operated using system 30. Furthermore, the following discussion of method 200*a* will lead to further understanding of system 30 and its various components. However, it is to be understood that system 30 and/or method 200*a* can be varied, and need not work exactly as discussed herein in conjunction with each other, and that such variations are within the scope of the present invention. By way of example, assume that devices 42 have captured a full image of pattern 38 placed on table 34 as shown in FIG. 1.

Figure 5:
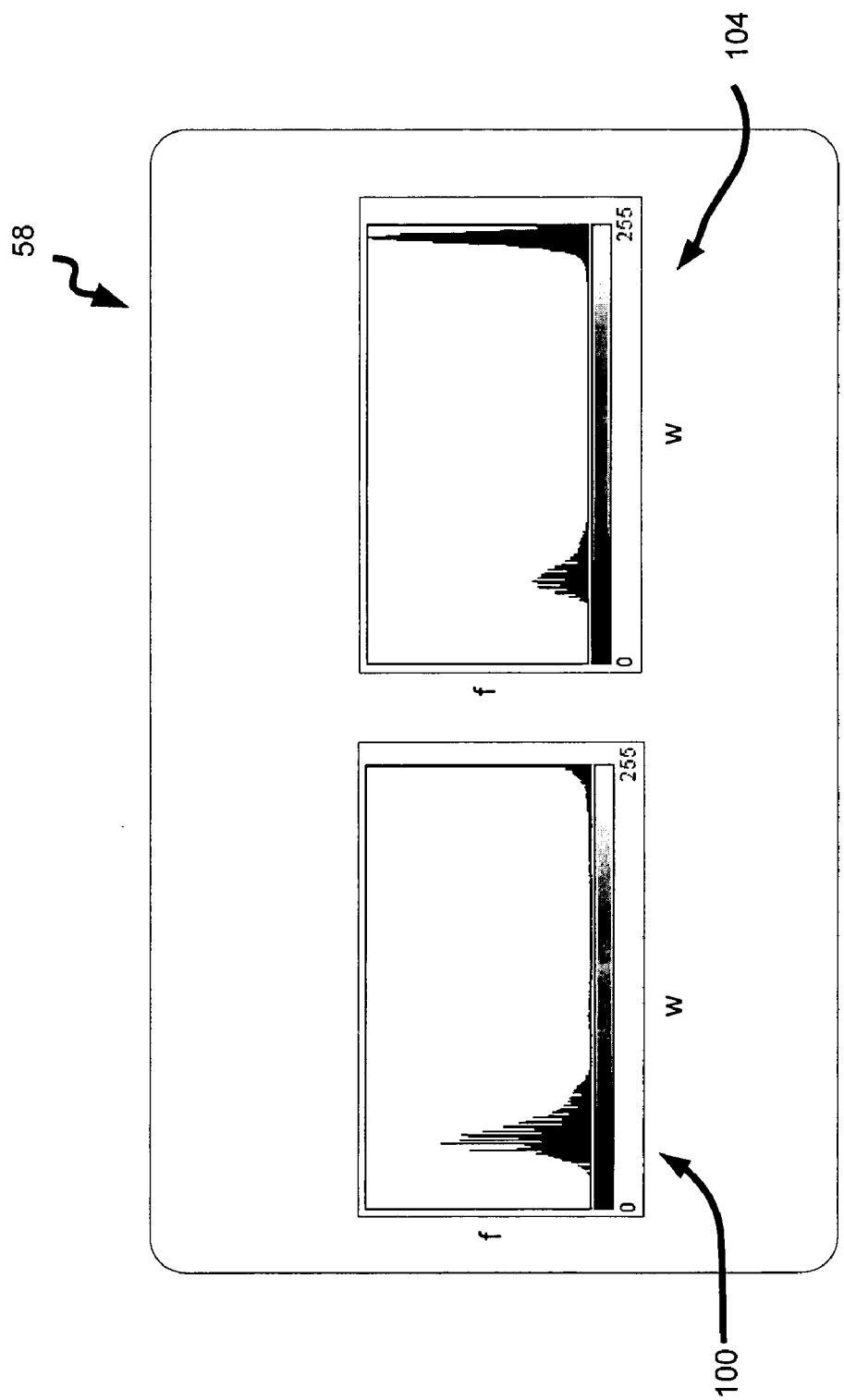
FIG. 5 shows histograms of raster data having been filtered by two colored filters.

At step 210*a*, colored raster image is received. In the case of the present example, devices 42 provide the colored raster data, represented as image 38*a*1 on FIG. 2, which is received by tower 54 via hub 46. The method then proceeds to step 212*a*, where a color channel with the desired contrast is extracted from the original colored raster image. In a present embodiment, the desired contrast provides the greatest contrast of color between different elements of the pattern, i.e., between the pattern paper and the background, so that dark components become darker and light components become lighter. In the present example, this can be done by passing the image through a color filter that blocks certain wavelengths of light for each pixel. Different colored filters can be more suitable for different patterns, by providing greater contrast between different elements of image 38*a*1, hence providing taller (and less numerous) "peaks" in a frequency (i.e. frequency of pixel count) versus intensity graph of the filtered image. FIG. 5 denotes two histograms that include frequency versus intensity graphs 100 and 104 for two different color filters. Graph 100 is the frequency versus intensity graph of raster image 38*a*1, after image 38*a*1 is filtered by a red filter. Similarly, Graph 104 is a frequency versus intensity graph of raster image 38*a*1, after image 38*a*1 is filtered by a green filter. As demonstrated in FIG. 5, graph 104 has taller, more defined and less numerous peaks than graph 100. Moreover, most of the peaks in graph 104 fall within two distinct ranges of intensities, while peaks in graph 100 span the entire range of intensities in graph 100. This means that a filtered image of image 38*a*1, using a green, rather than a red, filter, would have fewer distinct colors, while it would have more contrast between the colors present in the image. Various methods can be used to determine the "optimum" color filter for a given set of data. In a present embodiment of the present invention, an optimization process can take place to determine which type of colored filter would provide the greatest contrast (i.e. tallest and less numerous peaks) for each specific garment pattern and as such form the optimum color filter. The greater the contrast between the colors in the filtered image, the better conversion of color to grey scale and eventually to a black and white, or monochrome, image scale.

Figure 6:
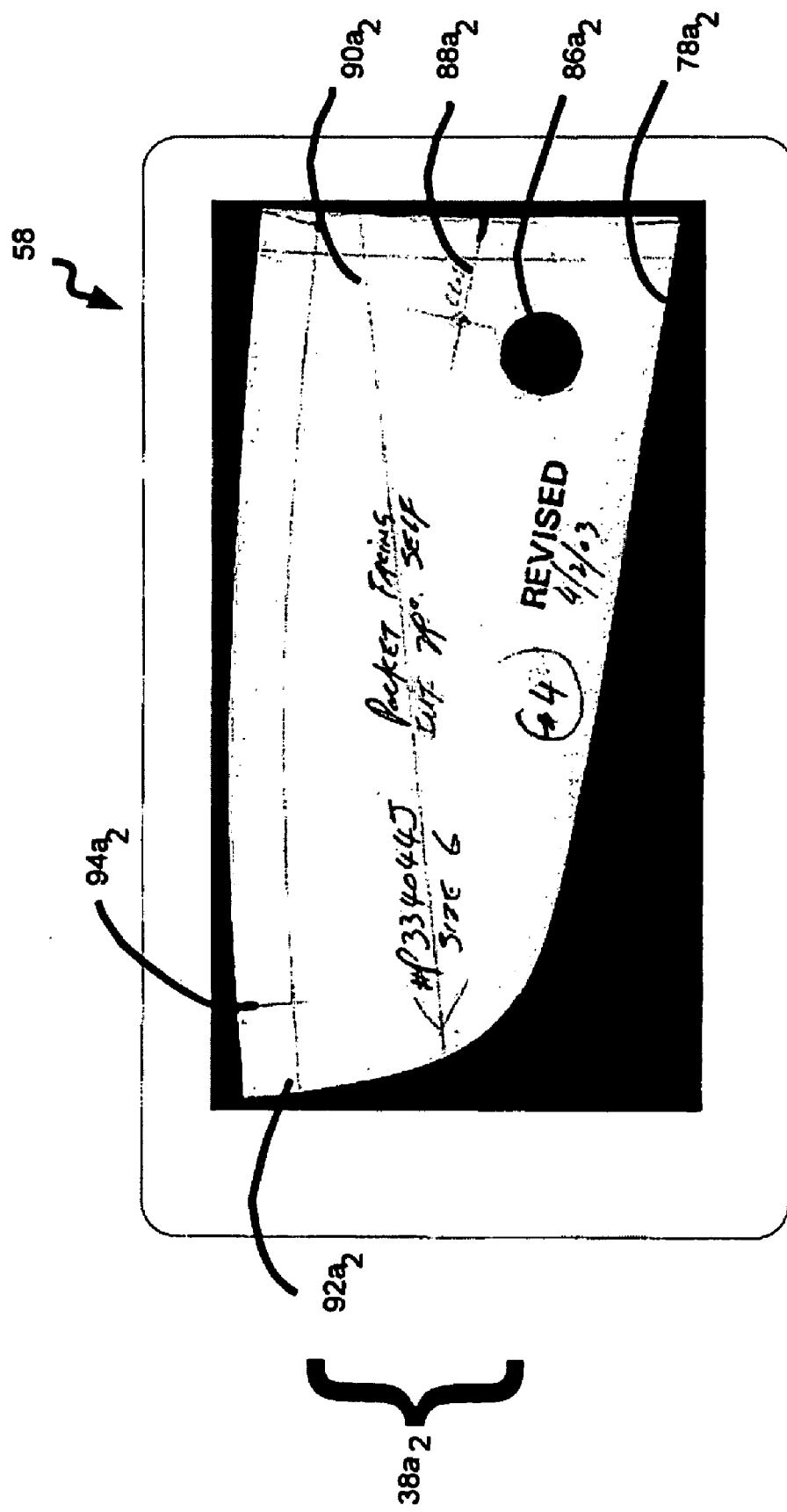
FIG. 6 shows the image of FIG. 2, after the image is converted to an eight-bit monochrome image.

Next, method 200*a* proceeds to step 214*a*, where the filtered colored raster data is converted to grey scale (i.e. eight-bit monochrome). In the present example, the colored filtered image, from step 210*a*, not shown, is converted to an eight-bit monochrome image 38a2 as shown in FIG. 6. As illustrated in FIG. 6, image 38a2 includes pattern elements similar to those of image 38a1 in FIG. 2, and like elements in image 38a2 bear the same reference as their counterparts in image 38a1, except followed with the suffix "a2" instead of the suffix "a1".

Figure 7:
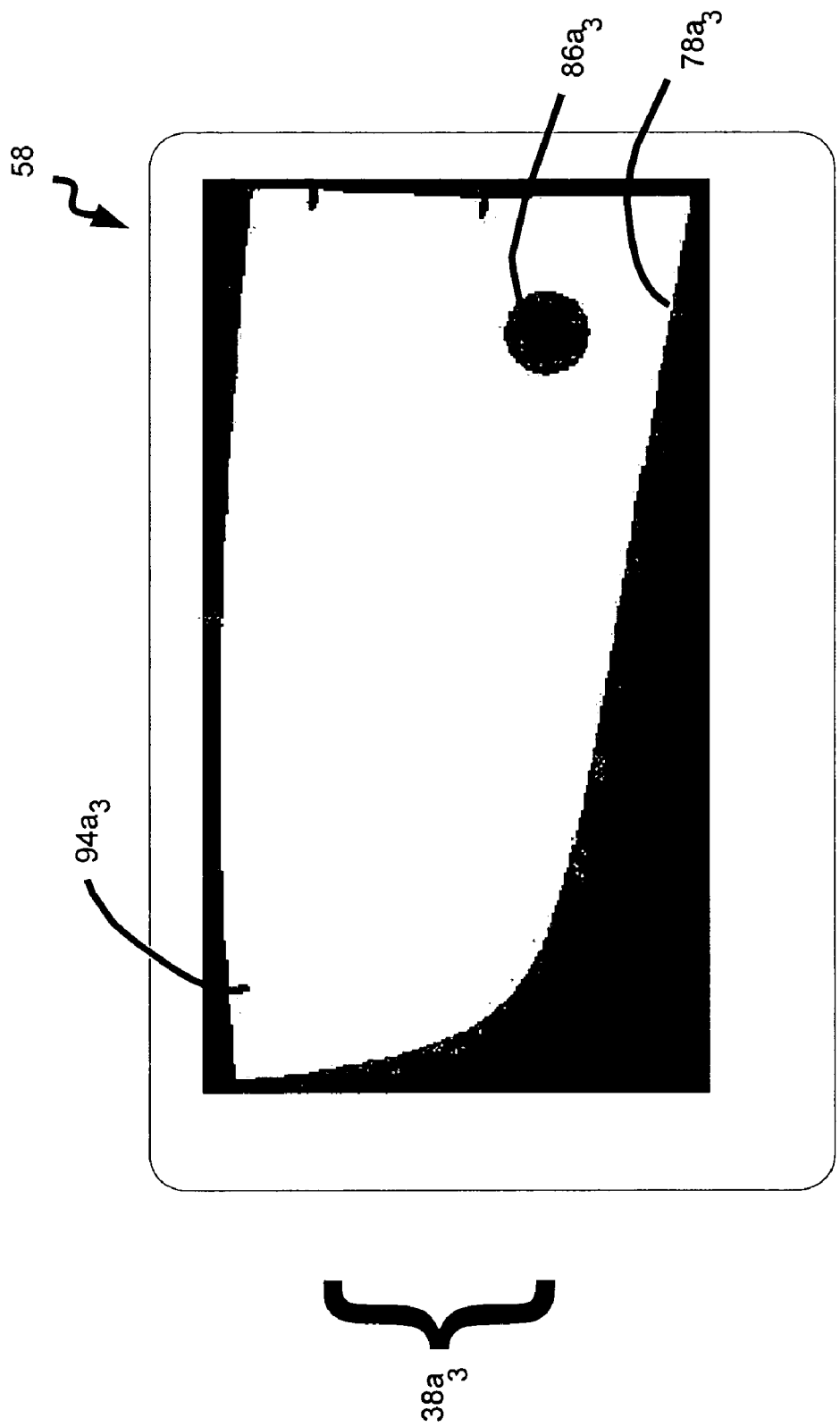
FIG. 7 shows the image of FIGS. 2 and 6, after the image is converted to a one-bit monochrome image.

The method then proceeds to step 216a, where the image derived from step 214a is converted to a black and white image (i.e. one-bit monochrome). In the present example, this process results in the conversion of image 38a2 in FIG. 6, to a one-bit monochrome image 38a3, in FIG. 7. As illustrated in FIG. 7, image 38a3 includes pattern elements similar to those of image 38a1 and image 38a2 in FIGS. 2 and 6, and like elements in image 38a3 bear the same reference as their counterparts in image 38a1 and 38a2, except followed with the suffix "a3". In the present example, however, the process of conversion into a black and white image has, advantageously, resulted in the loss of some of the unwanted information. In particular, elements 88a2, 90a2 and 92a2 in image 38a2 of FIG. 6, are no longer present in image 38a3 of FIG. 7.

Figure 8:
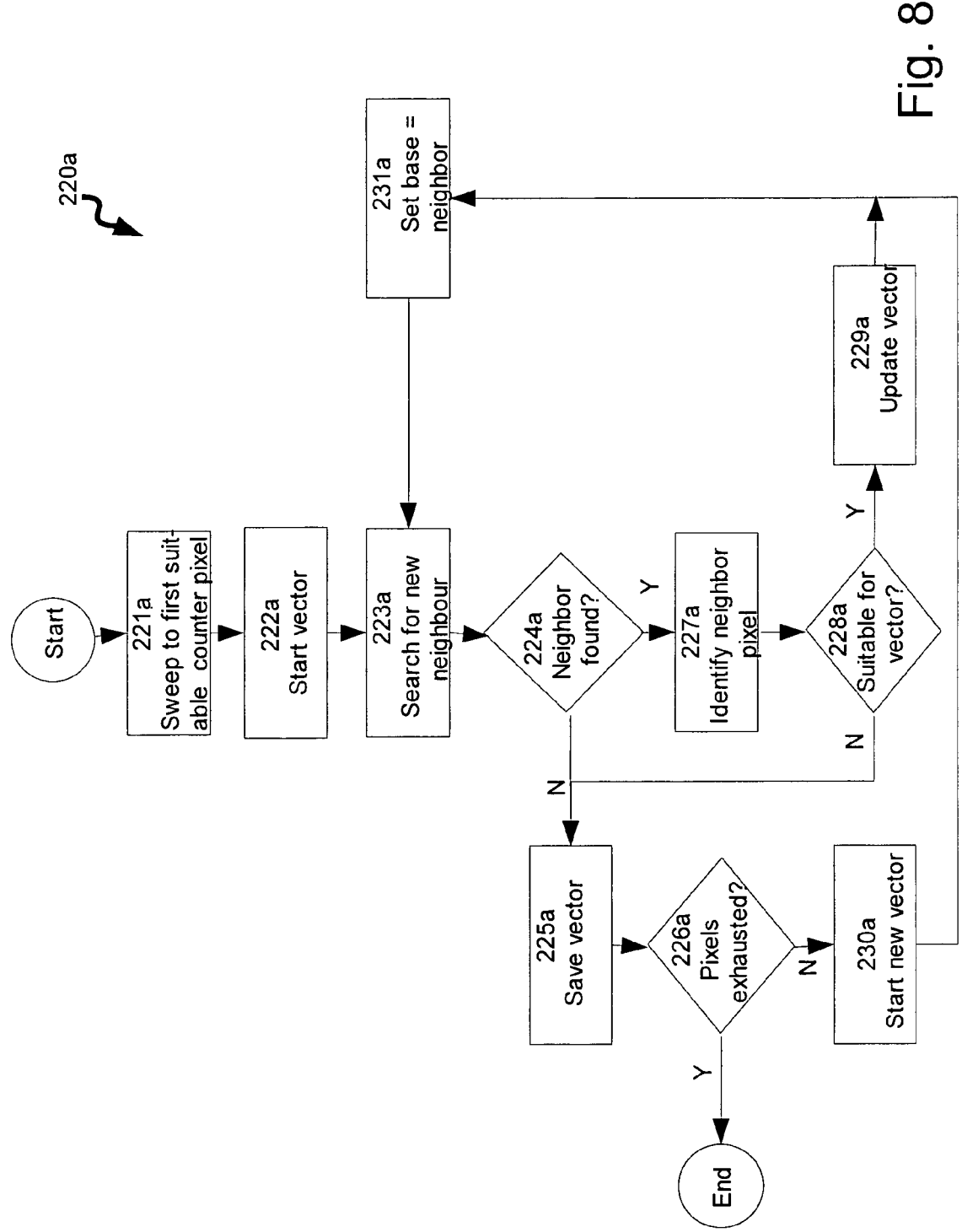
FIG. 8 shows a flow chart of a method for vectorizing the image in FIG. 7 in accordance with another embodiment of the invention.
Figure 9:
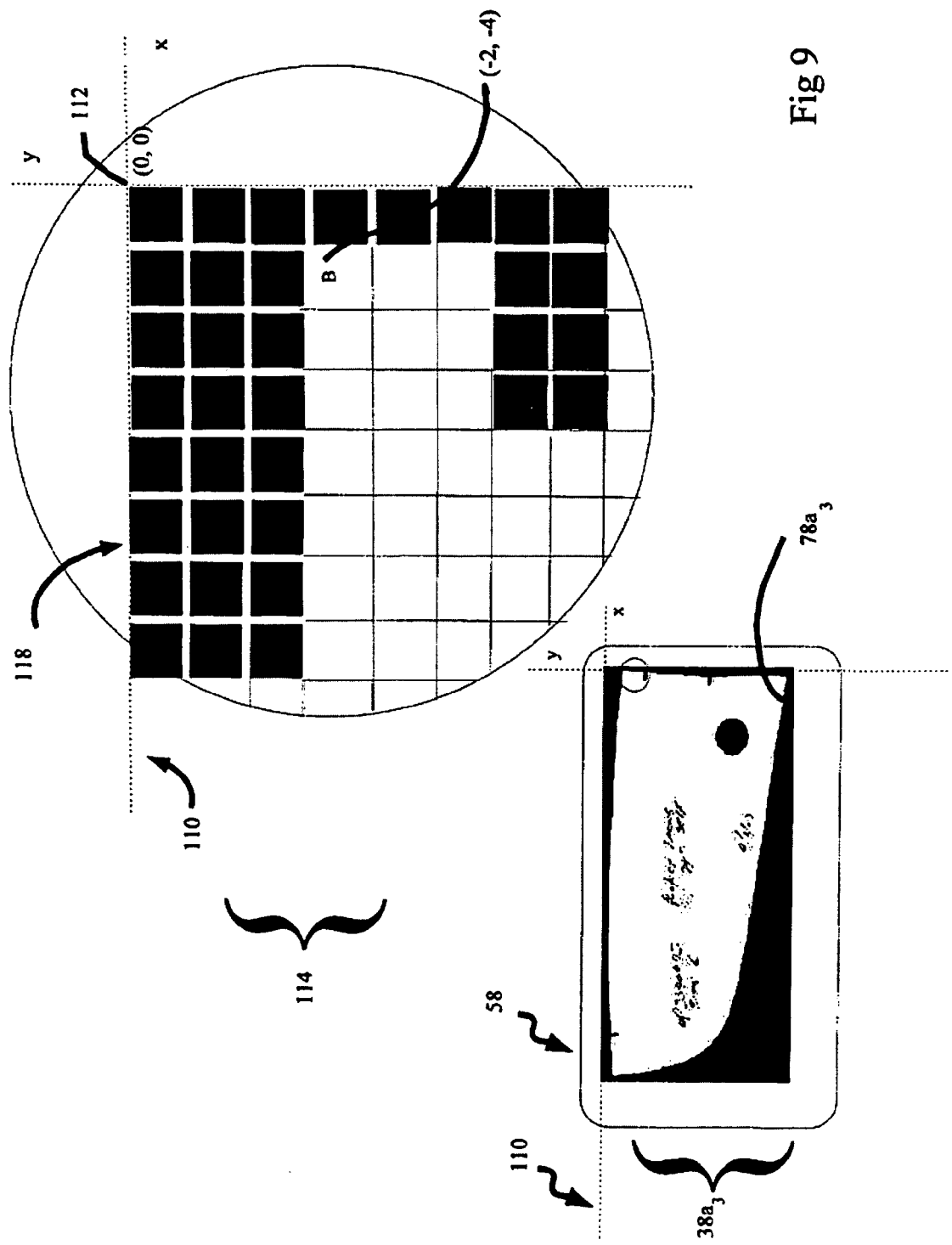
FIG. 9 shows the image of FIG. 7 on an x-y plane, with a "base pixel" having been selected at position (−2, −4)

Next, method 200a proceeds to step 220a, where raster data is converted into vector data. Step 220a can be performed in a variety of ways, one example of which is demonstrated in a number of sub-steps in FIG. 8. In order to assist in the explanation of the sub-steps in FIG. 8, FIG. 9 shows image 38a3 on an x-y plane 110 with its origin 112 located on the top right corner of image 38a3. FIG. 9 also shows a blown up image 114 of the top right corner of image 38a3, which includes the top right corner of pattern element 78a3. Blown up image 114 is made up of a plurality of black and white squares 118, each of which represents a cluster of pixels that make up image 38a3. In order to simplify the description of the present embodiment, a fewer number of pixels are shown than would actually be present (i.e., the resolution of image 114 is low for the purposes of explanation of method 220a). Therefore, a square 118 in image 114, will, hereinafter, be referred to as a "pixel" 118.

Referring now back to FIG. 8, at step 221a, method 220a starts from the origin of the raster image (i.e. origin 112) and searches the pixels until a white pixel is located, representing an edge of pattern image 38a3. Referring now to FIG. 9, the method begins at the origin of x-y plane 110 and searches through black pixels until it finds a white pixel B on the edge of element 78a3.

Next, at step 222a, a vector 112 is started. In the case of the present example, tower 54 begins to store information about vector 112 on Table I. This information includes a first column labeled "Index" that keeps track of the number of vectors; a second column labeled "Vector" that describes the vector being formed; and a third column labeled "Rectangular Co-ordinates" that is split into two sub-columns, labeled "initial point" and "end point", each providing information regarding the initial and end points of each vector in relation to x-y plane 110. Table I also includes a fourth column labeled "Magnitude & Direction", providing information regarding the magnitude and direction of each vector, and a fifth column labeled "Complete?", providing information as to whether each vector has been completed.

Referring now to FIG. 9, pixel B is located two pixels left and three pixels down from origin 112 of x-y plane 110 and will mark the initial point of vector 112. As a result, a "1" is entered in the first column of Table I; a "112" is entered in the second column of Table I, and the co-ordinate "(−2, −4)" is entered under the sub-column labeled "initial point" of the third column labeled "Rectangular Co-ordinates". Since the end point of vector 112 has not yet been determined, the sub-column labeled "End" is left blank. Similarly, since the magnitude and direction of vector 112 is not yet known, an "(m, d)" is entered under the fourth column labeled "Magnitude & Direction". Similarly, since the vector is not completed yet, a "No" is entered under the fifth column labeled "Complete?".

TABLE I

| Index | Vector | Rectangular Co-ordinates | | Magnitude & Direction | Complete? |
|---|---|---|---|---|---|
| | | Initial Point | End Point | | |
| 1. | 112 | (−2, −4) | | (m, d) | No |

Figure 10:
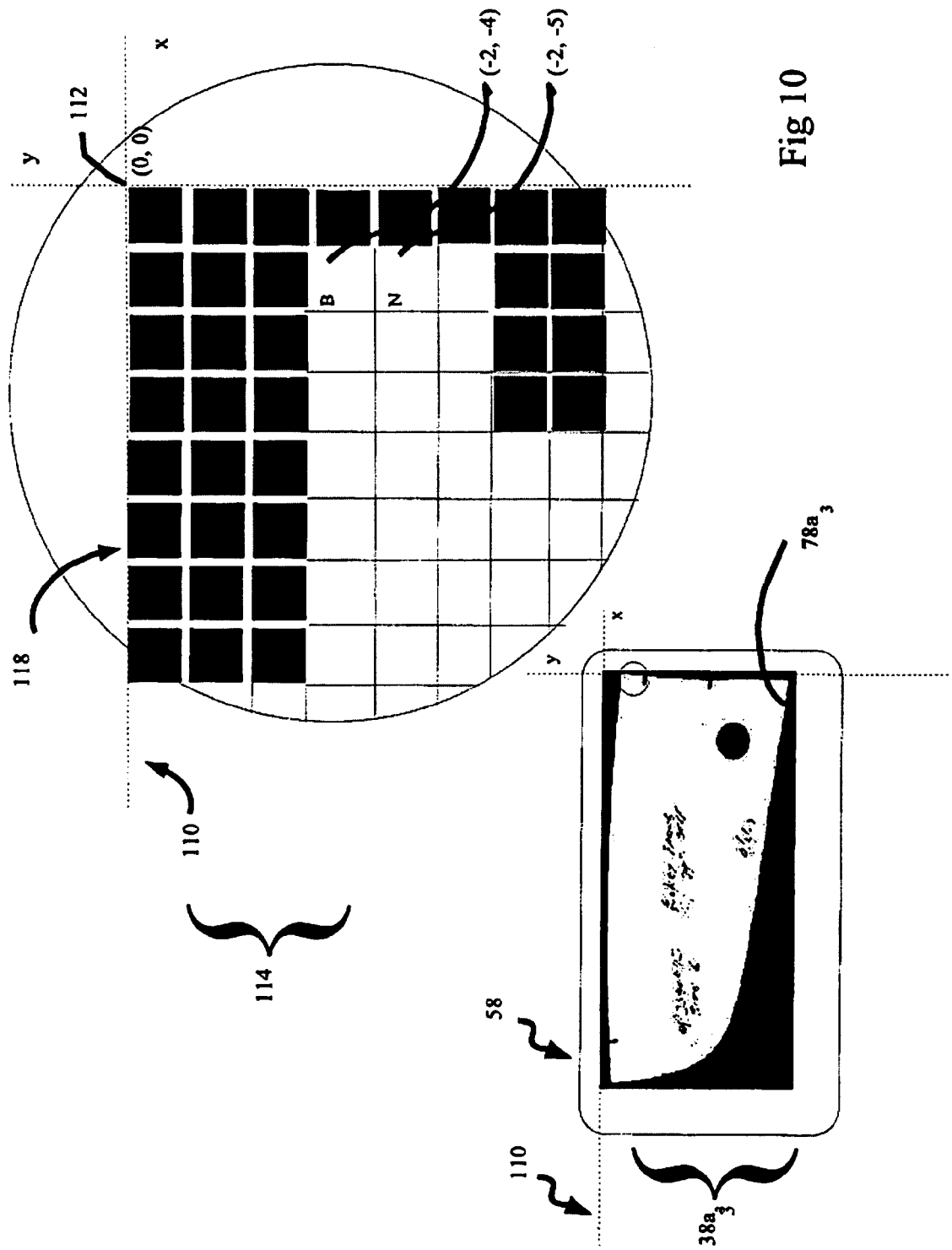
FIG. 10 shows the image of FIG. 7 on an x-y plane, with a "neighbor pixel" having been selected at position (−2, −5)

Next, at step 223a, it is determined if there is a neighboring pixel on the black-white border. If method 220a finds such neighbor, it proceeds to step 227a, where method 220a identifies that neighbor. If, on the other hand, method 220a does not find such a neighbor, method 220a proceeds to step 225a, where the rectangular co-ordinates of the neighbor are entered under the sub-column labeled "End Point", and a "yes" is entered in column five of Table I to indicate that the vector has been completed. In the present example, it is assumed that method 220a searches in a clock-wise direction, encounters pixel "N", shown in FIG. 10, and proceeds to step 227a where it identifies pixel N as having a rectangular co-ordinate equal to (−2, −5).

Figure 11:
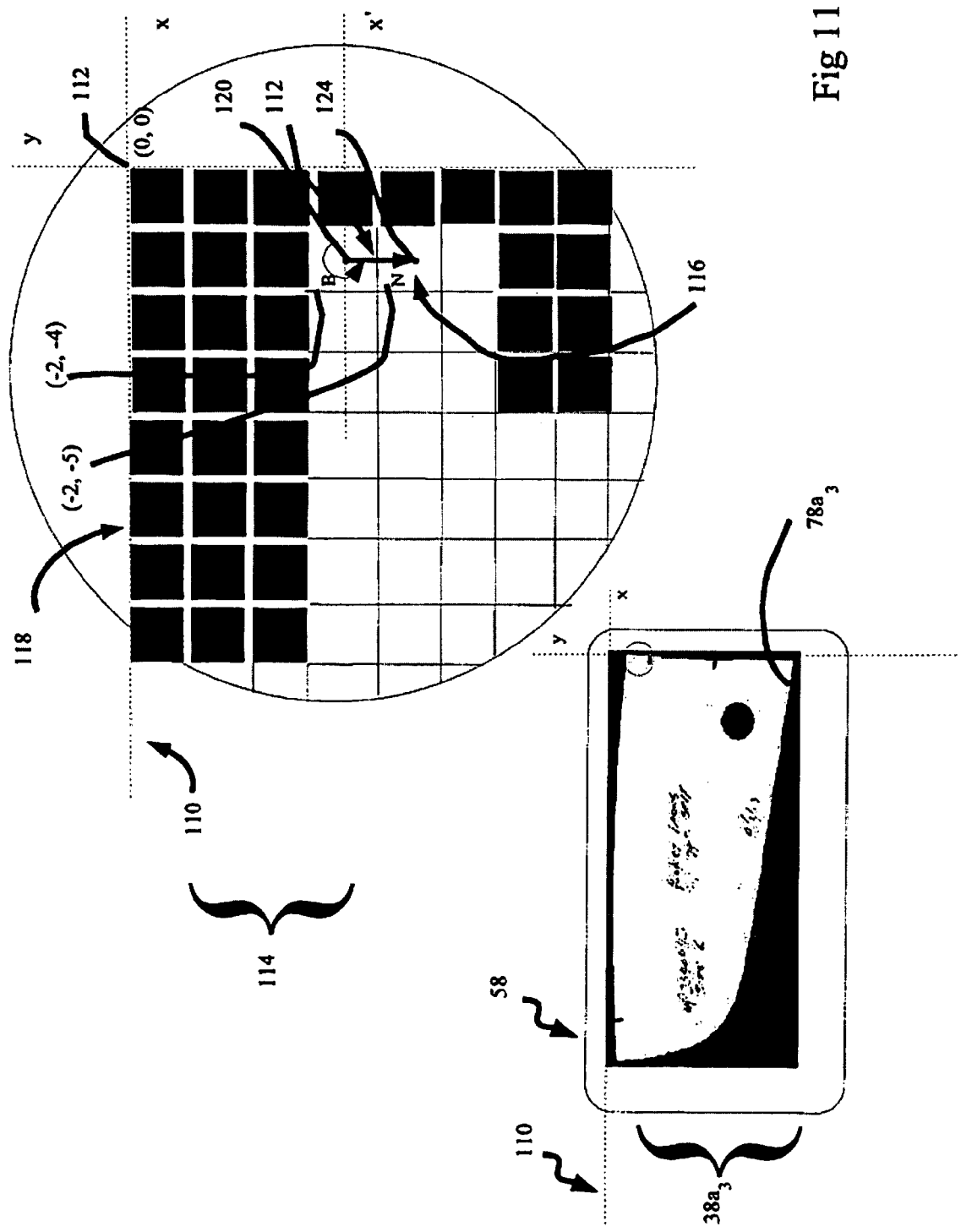
FIG. 11 shows the image of FIG. 7 on an x-y plane, with a vector being formed from the base pixel in FIG. 9 to the neighbor pixel in FIG. 10.

Next, at step 228a, method 220a determines whether the newly found neighbor is suitable for the uncompleted vector in Table I. In the present example, and referring now to FIG. 11, this determination is represented by drawing an arrow 116 from the middle of pixel B to the middle of pixel N with an initial point 120 and an end point 124. Furthermore, in order to represent the method tower 54 uses to determine the direction of vector 112, an x'-axis 128 is placed on initial point 120 of arrow 116, and the angle between x'-axis and arrow 116 is measured in a counterclockwise direction, using the right side of the x'-axis as the origin (i.e. as 0°). In the present example, the angle between x'-axis and arrow 116 is measured to be 270°. If the neighbor is suitable for the vector, the method proceeds to step 229a where the vector in Table I is updated. However, if the neighbor is not suitable for the vector, method 220a proceeds to step 225a where the vector in Table I is saved as complete. In the present example, pixel N is deemed suitable if the direction between pixel B and pixel N (i.e. the direction of arrow 116) is equal to the direction of vector 112. In the present example, since vector 112 is just starting and has no direction yet, pixel N is deemed suitable and adopts the direction of arrow 16.

Next, method 220a proceeds to step 229a where the vector is updated. In the present example, and as demonstrated in Table II, in order to update the vector, the magnitude and direction of vector 112 are recorded. In the present example, one unit of magnitude shall be presented by the distance from the center of one pixel to the center of another neighboring pixel, and, as such, the magnitude and direction (1, 270°) are entered in the fourth column of Table II.

TABLE II (Updated from Table I at step 229a)

| Index | Vector | Rectangular Co-ordinates | | Polar Co-ordinates | Complete? |
|---|---|---|---|---|---|
| | | Initial Point | End Point | | |
| 1. | 112 | (−2, −4) | | (1, 270°) | No |

Figure 12:
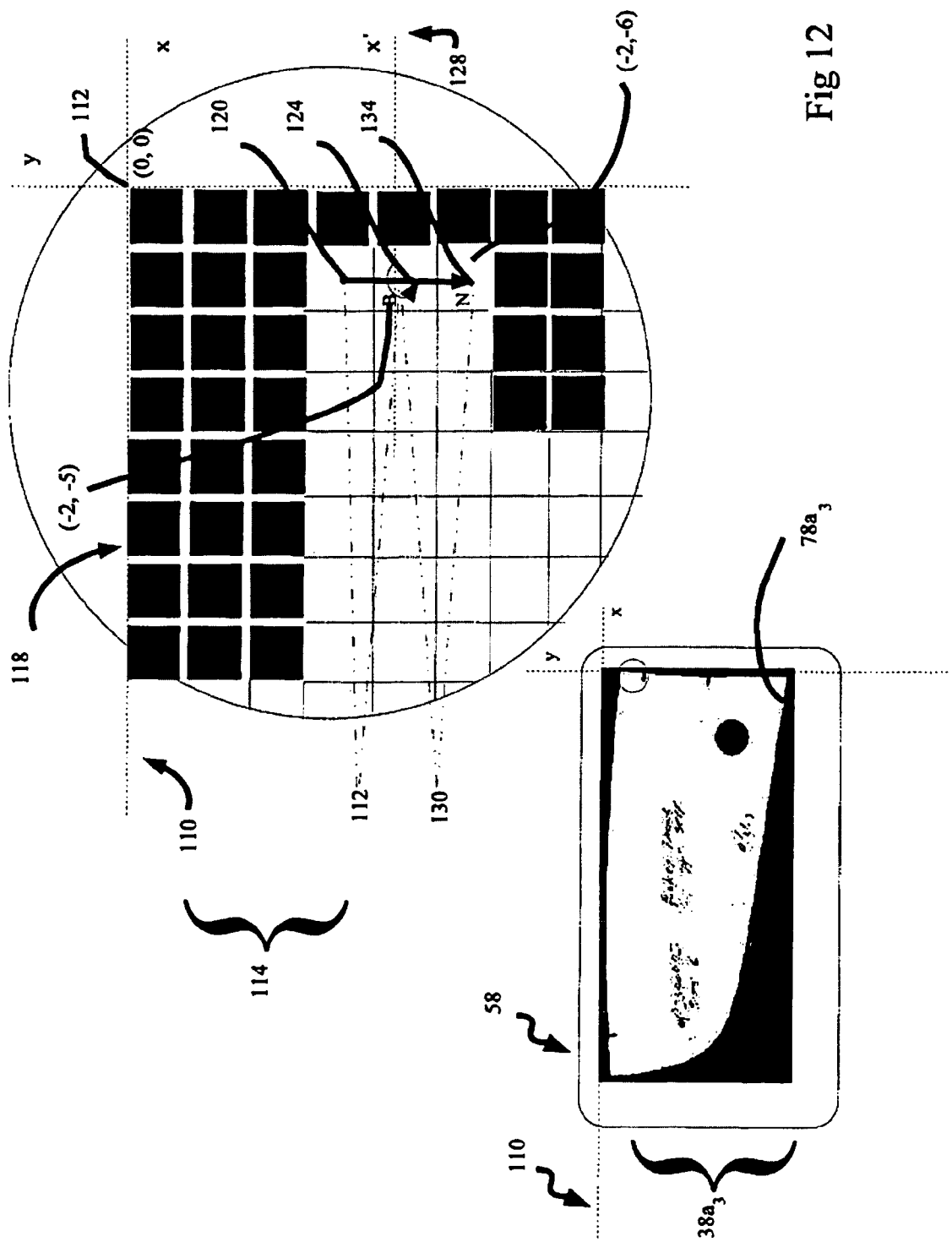
FIG. 12 shows the image of FIG. 7 on an x-y plane, with the vector in FIG. 11 being extended to position (−2, −6)

Next, at step 231a, the base pixel is set equal to the neighbor pixel, and method 220a proceeds back to step 223a where a new neighboring pixel on the black-white boundary is sought. In the present example, and referring once again to FIG. 12, the pixel at (−2, −5) is now named pixel B, and the method proceeds to step 223a where a new neighbor is sought. It should now be apparent that, as demonstrated in FIG. 12, the method proceeds to step 224a, where a new neighbor is found at (−2, −6), and proceeds to step 227a to identify and label the neighbor as pixel N.

Next, method 220a proceeds to step 228a, where an arrow 130 is drawn from point 124 to the center of new pixel N (i.e. point 134), in order to determine whether pixel N is suitable for vector 112. This time, and referring now to FIG. 12, x'-axis 128 is placed at point 124, and it is determined that the direction of arrow 130 is also 270°. Since the direction of arrow 130 is equal to the direction of vector 112, new pixel N is deemed suitable for vector 112 in Table II, and the method proceeds to step 229a, where, as demonstrated in Table III, the vector is updated in column four to increase the magnitude of vector 112 by one unit.

TABLE III (Updated from Table II at step 228a)

| Index | Vector | Rectangular Co-ordinates | | Polar Co-ordinates | Complete? |
|---|---|---|---|---|---|
| | | Initial point | End Point | | |
| 1. | 112 | (−2, −4) | | (2, 270°) | No |

Figure 13:
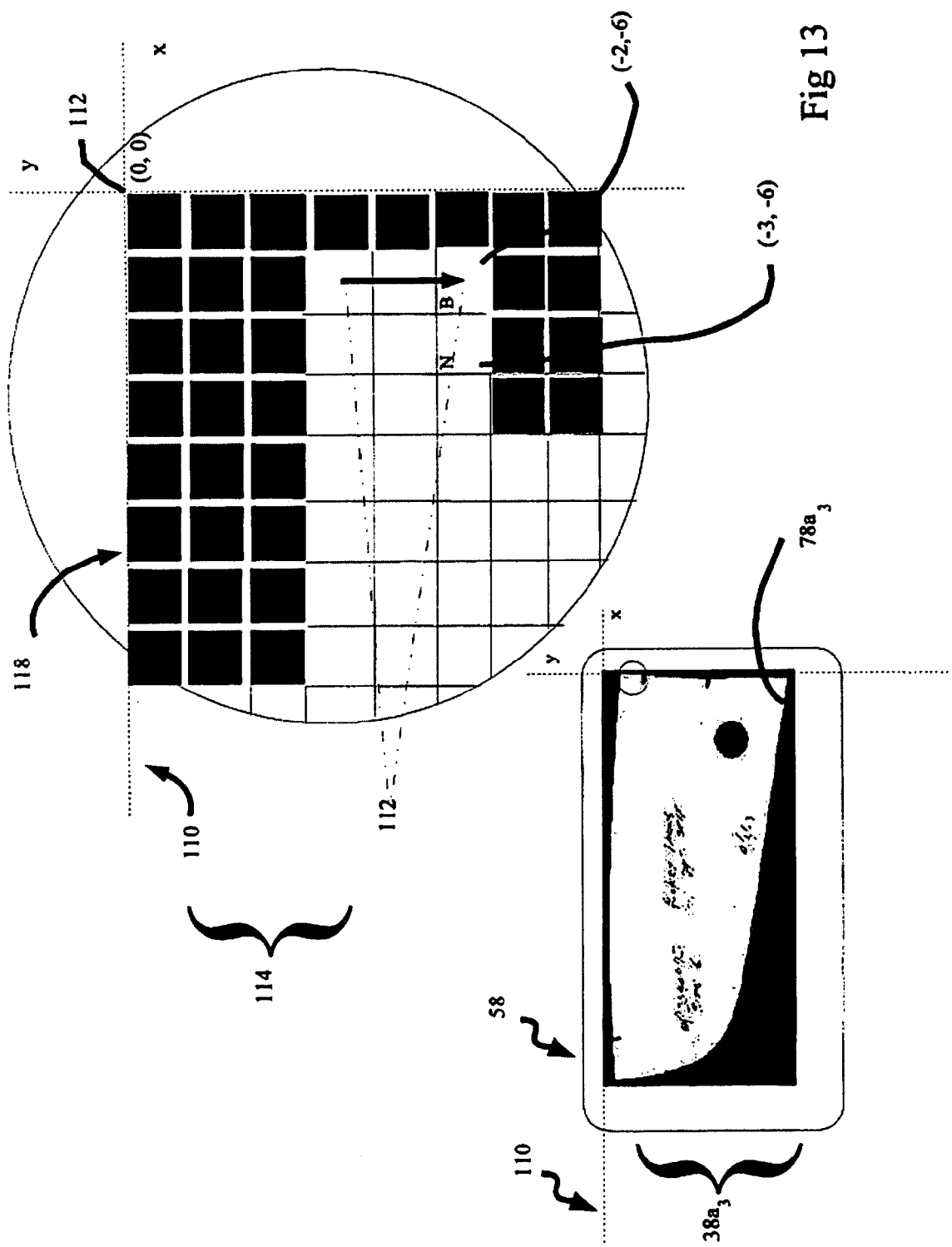
FIG. 13 shows the image of FIG. 7 on an x-y plane, with a base pixel being selected at position (−2, −6) and a neighbor pixel being selected at position (−3, −6)
Figure 14:
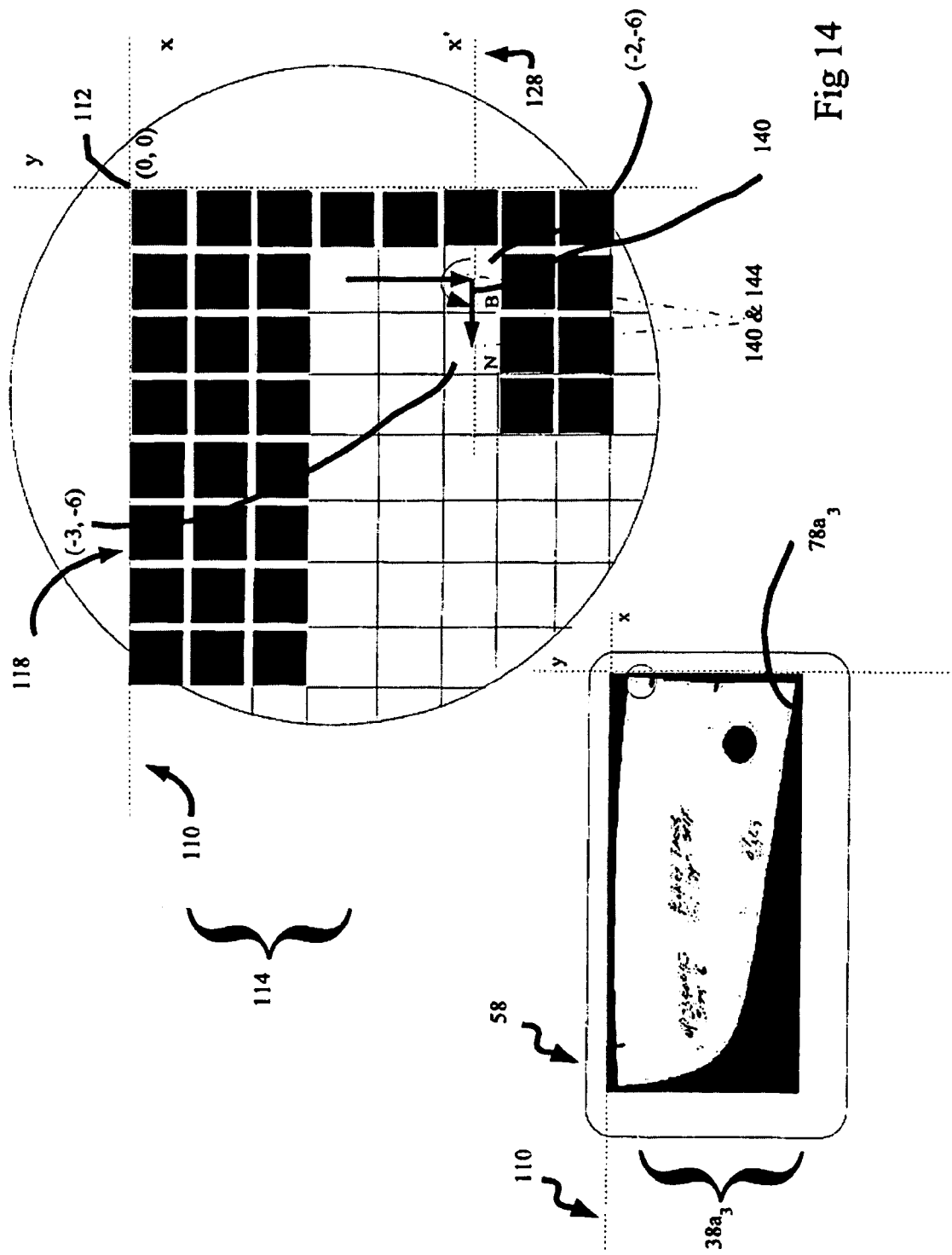
FIG. 14 shows the image of FIG. 7 on an x-y plane, with a vector being formed from the base pixel in FIG. 13 to the neighbor pixel in FIG. 13.

Next, at step 231a, and referring now FIG. 13, it should be apparent that pixel B is once again moved to the position of pixel N, i.e., to position (−2, −6), and that the method goes back to step 223a, and from there to steps 224a and 227a, as a new neighbor is found just left of pixel B, at position (−3, −6), and labeled pixel N. The method then advances to step 228a, where it is determined whether pixel N is suitable for vector 112. As mentioned above, at step 228a, if pixel N is suitable for vector 112, the method advances to step 229a, where the vector is updated. However, if pixel N is not suitable for vector 112, the method advances to step 225a, where the uncompleted vector is saved (i.e., deemed complete). In the present example, and referring now to FIG. 14, it should now be apparent that an arrow 140 is drawn from the center of pixel B to the center of pixel N, and that the direction between arrow 140 and x' axis 128 is determined to be one hundred and eighty degrees. Since this direction is different than the direction of vector 112, pixel N is deemed not suitable for vector 112. Method 220a, thus, advances to step 225a, where, as demonstrated in Table IV, the co-ordinates of pixel B are entered in column two, under the sub-column labeled "End Point", and a "yes" is entered in the fifth column indicating that the vector is now complete.

TABLE V (Updated from Table IV at step 228a)

| Index | Vector | Rectangular Co-ordinates | | Polar Co-ordinates | Complete? |
|---|---|---|---|---|---|
| | | Initial Point | End Point | | |
| 1. | 112 | (−2, −4) | (−2, −6) | (2, 270°) | Yes |
| 2. | 144 | (−2, −6) | | (1, 180°) | No |

By now it should be apparent that the process described above keeps repeating around element 78a3 until Table V is populated with a complete set of vectors that define the entire boundary of element 78a3.

Figure 15:
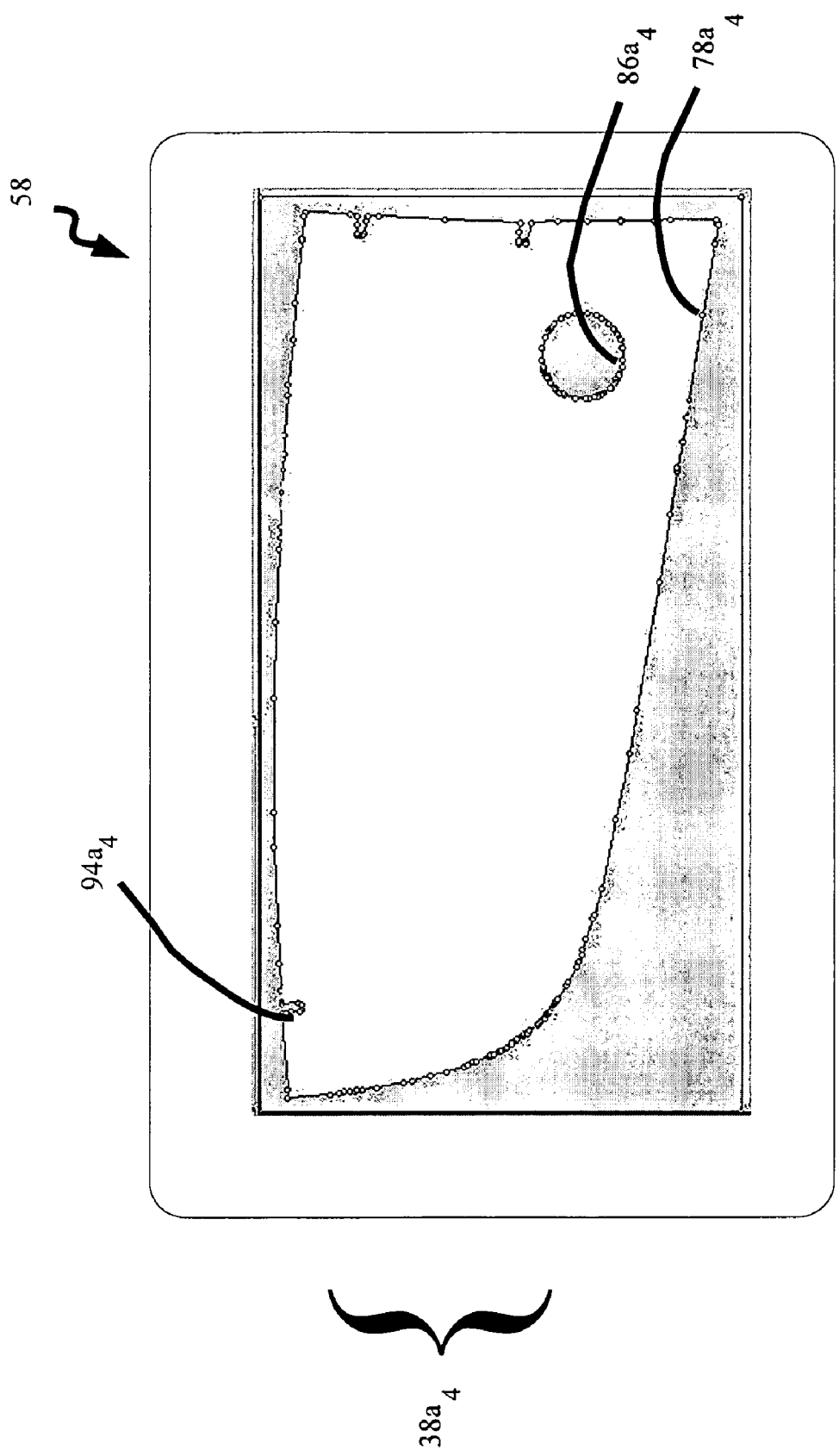
FIG. 15 shows the image of FIG. 7, on an x-y plane, with its entire pattern boundary having been vectorized and being represented by initial and end points of vectors.

In the present example, it is assumed that the vectorization process results in the generation of the vector space in FIG. 15, which consists of a vectorized image 38a4 of image 38a3. As illustrated in FIG. 15, image 38a4 includes pattern elements similar to those of image 38a3 in FIG. 7, and, like elements in image 38a4 bear the same reference as their counterparts in image 38a3, except followed with the suffix "a4".

Figure 4:
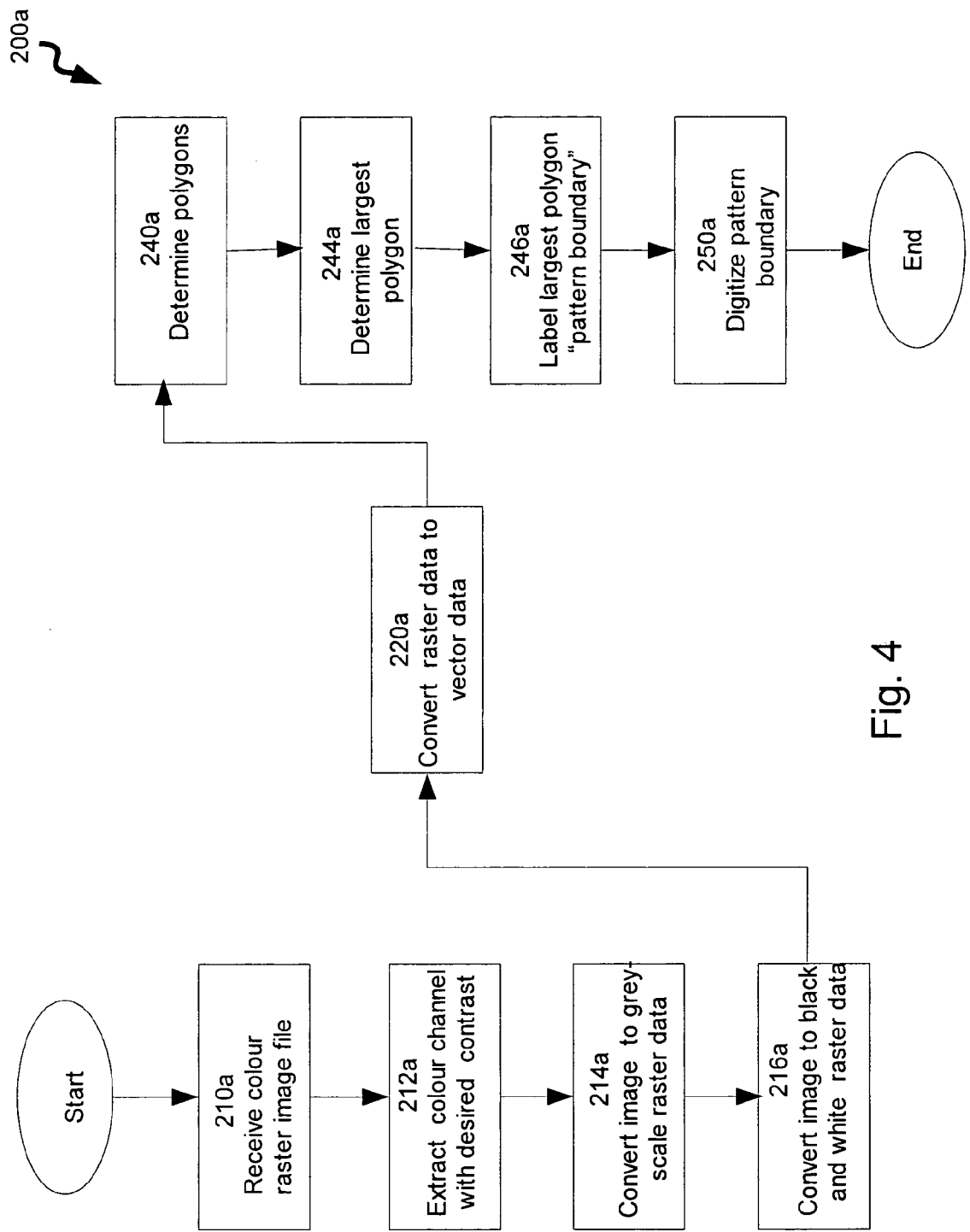
FIG. 4 shows a flow chart of a method for finding the boundary of a garment pattern in accordance with another embodiment of the invention.

Referring now back to FIG. 4, method 200a advances to step 240a, where all polygons formed by vectors in step 220a are determined. In a present embodiment of the invention, a polygon is determined by a set of vectors that form a closed two dimensional geometric shape, such that the starting point of each vector is also an end point of another vector in the set. In the present example, the only sets of vectors that satisfy these criteria are the set of vectors forming element 86a4 and the set of vectors forming element 78a4.

Method 200a then advances to step 244a, where the largest polygon is determined. In a present embodiment of the invention, the largest polygon can be determined by finding the polygon with the largest perimeter. The perimeter of each polygon can be found by adding the magnitude of all vectors forming the polygon. In variation to the present embodiment, the largest polygon can also be determined by finding the polygon with the largest surface area, or with a surface area large enough to include all other polygons that are formed by step 220a. In the present example, the largest polygon is the polygon formed by vectors forming pattern element 78a4.

Method 200a then advances to step 246a, where the largest polygon is labeled as a "pattern boundary". In the present example, since the largest polygon is the polygon formed by vectors forming element 78a4, pattern element 78a4 is labeled "pattern boundary". Method 200a then proceeds to step 250a, where the pattern boundary is digitized in a predetermined format. In the present example, pattern element 78a4 is digitized as a pattern boundary, in a format compatible with various CAD and/or CAM systems such as Gerber, Lectra, Investronica, ASTM/AAMA-DXF, Optitex, Polygon and PAD.

Figure 16:
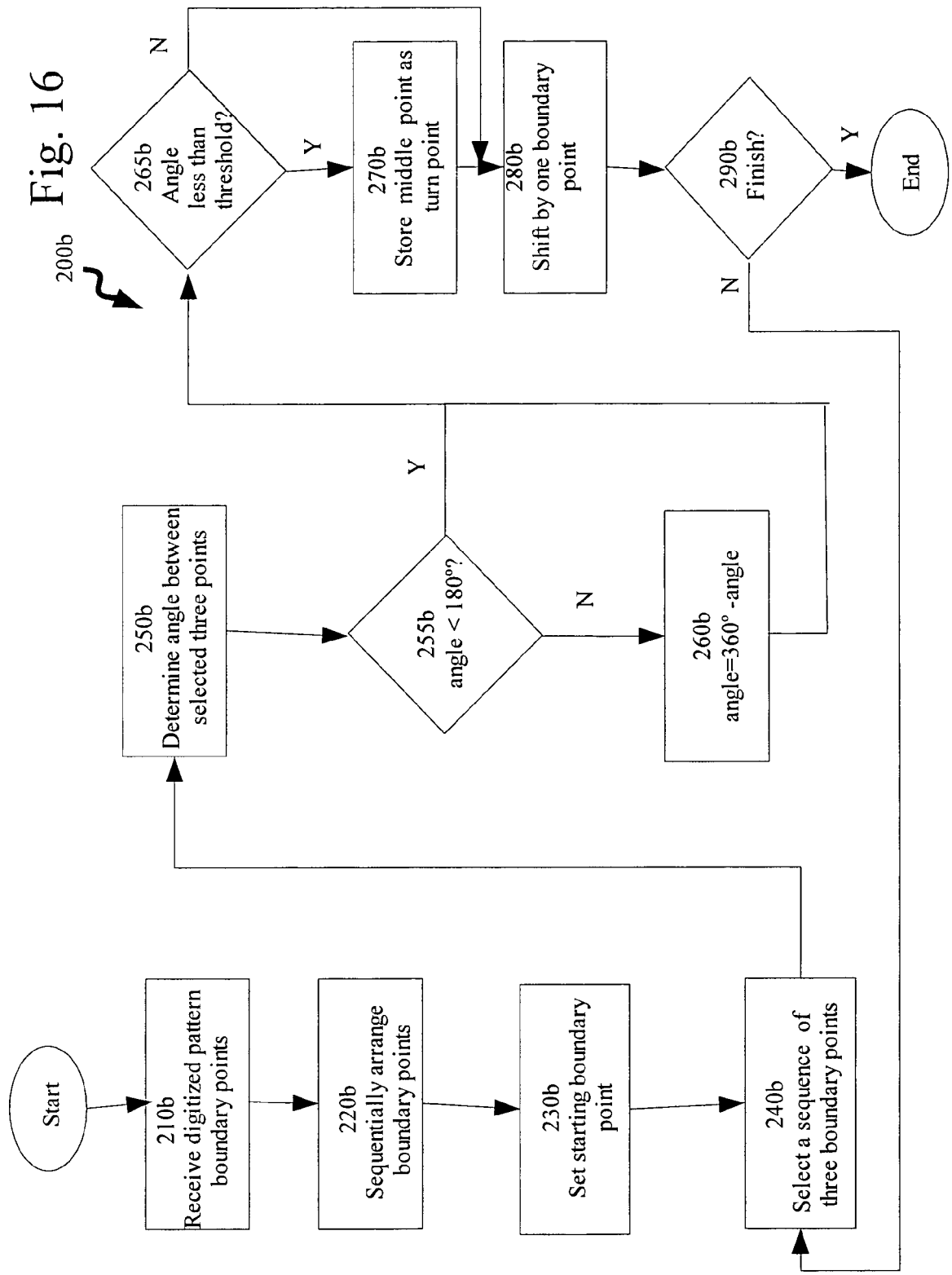
FIG. 16 shows a flow chart of a method for finding turn points of a pattern boundary in accordance with another embodiment of the invention.

Referring now to FIG. 16, another specific implementation of method 200, the recognition of turn points, is indicated generally at 200b. A handmade pattern can have sharp corners at specific points, which are represented in a CAD program as turn points, which usually segregate one line from another. In order to assist in the explanation of the method, it will be assumed that method 200b is operated using system 30. Furthermore, the following discussion of method 200b will lead to further understanding of system 30 and its various components. However, it is to be understood that system 30 and/or method 200b can be varied, and need not work exactly as discussed herein in conjunction with each other, and that such variations are within the scope of the present invention. By way of example, it is assumed that devices 42 have captured image 38a1 of pattern 38 placed on table 34 as shown in FIG. 1, and that the pattern 38 has been recognized and digitized in accordance with method 200a, described above.

Figure 17:
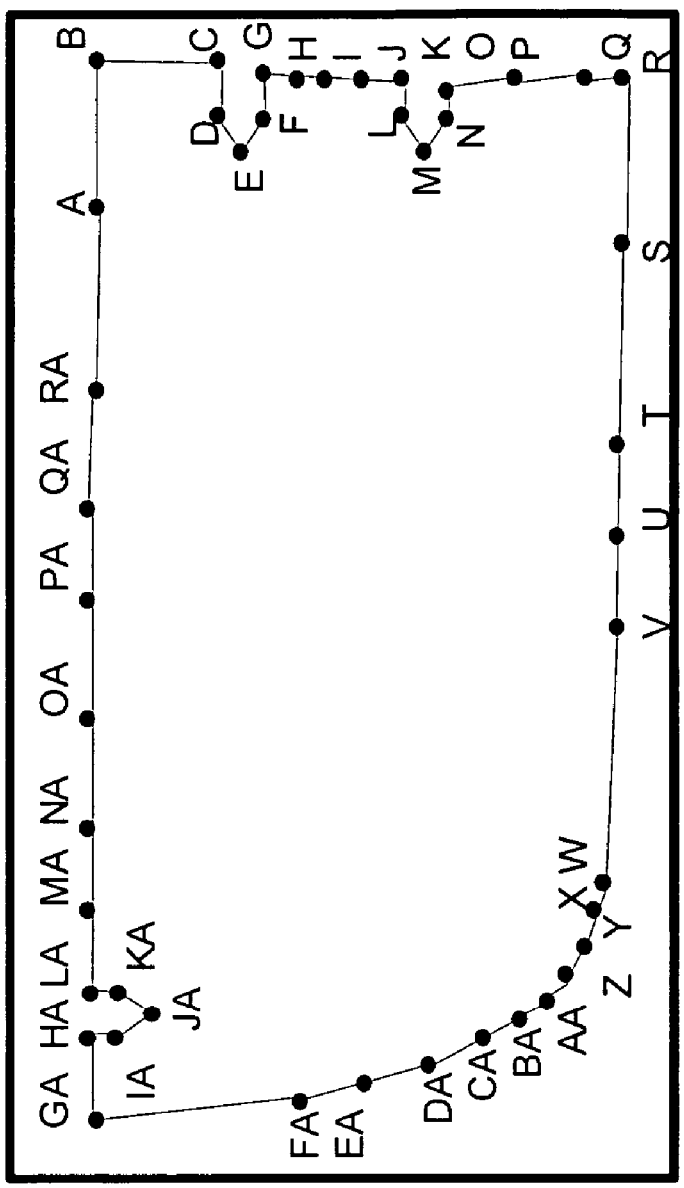
FIG. 17 shows the image of FIG. 15, the initial and end points representing vectors having been reduced and simplified for the purposes of another embodiment of the invention.
Figure 18:
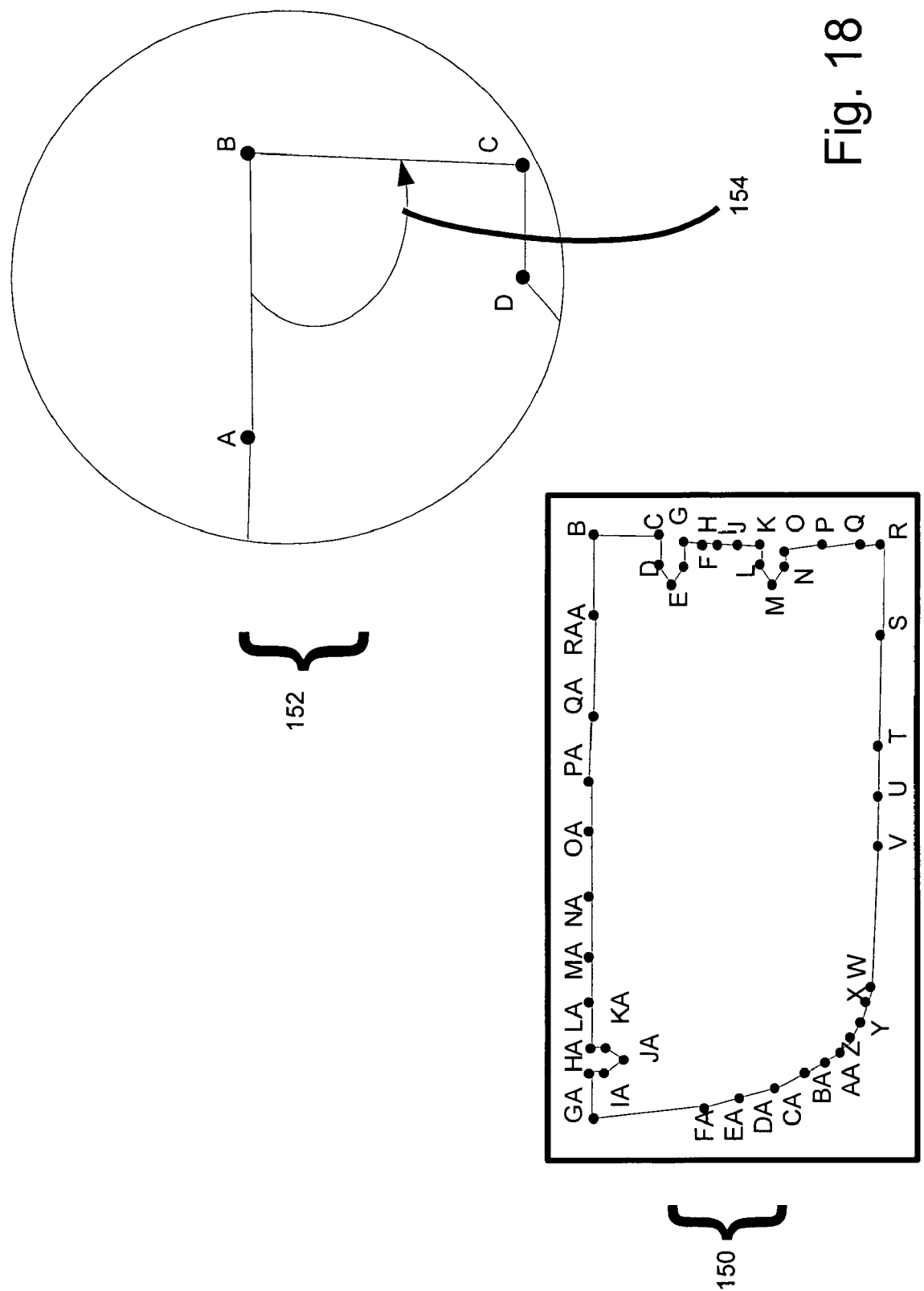
FIG. 18 shows the image of FIG. 17, with points A, B and C having been selected and the angle between them being calculated with the angle between points A, B and C being selected and calculated.

At step 210b, digitized and vectorized pattern boundary points are received. Each of these boundary points represent the initial and end points of each vector. In the present example, boundary points making up pattern element 78a4, as shown in FIG. 15, are received. For purposes of simplifying the explanation of method 200b, these boundary points have been reduced to points 150 as shown in FIG. 17. Next, at step 220b, boundary points are sequentially numbered. In the present example, and referring again to FIG. 17, boundary points 150 are numbered sequentially from A-RA. Next, at step 230b, a starting boundary point is selected. In the present example, point A, as demonstrated in FIG. 17, is selected as the starting boundary point. Next, at step 240b, a sequence of three boundary points is selected. In the case of the present example, and referring now to FIG. 18, points A, B and C are selected and blown up in image 152. Next at step 250b, the angle between these three points is determined. In the present example, and referring again to FIG. 18, an angle 154 is shown between points A, B and C and is calculated to be eighty five degrees.

Next, at step 255b, it is determined whether angle 154 is bigger or smaller than one hundred and eighty degrees. If the angle is greater than one hundred and eighty degrees, method 200b advances to step 260b, where angle 154 is changed to a value equal to three hundred and sixty less the value of angle 154. However, if angle 154 is smaller than one hundred and eighty degrees, method 200b advances to step 265b where it is further determined whether angle 154 is less than a predetermined threshold. In the present example, since angle 154 is eighty nine degrees and is less than one hundred and eighty degrees, method 200b advances to step 265b. At step 265b, if angle 154 is found to be less than threshold, the method advances to step 270b, where the middle point is stored as a turn point. However, if angle 154 is found not to be less than threshold, the method advances to step 280b (i.e., skips step 270b), where there is a shift of one boundary point (i.e., the starting point is shifted by one). In the present example, it is assumed that the threshold for a turn point is one hundred and seventy five to one hundred and eighty degrees. As such, since eighty nine degrees is less than one hundred and seventy five, method 200b proceeds to step 270b, where the middle point, i.e., point B, is stored as a turn point. The method then proceeds to step 280b, where, as stated previously, there is a shift of one boundary point. In the present example, the starting point shifts from point A to point B. Next, method 200b advances to step 290b, where it is determined whether all boundary points 150 are finished. If all boundary points are finished, method 200b ends. However, if there are boundary points 150 that have not been considered by method 200b, method 200b returns to step 240b, where a new sequence of three boundary points is selected. In the present example, since points D-RA have not yet been considered, the method returns to step 240b, where a sequence of three boundary points, starting from point B, are selected. The method 200b repeats in this way until all boundary points 150 have been considered.

Figure 19:
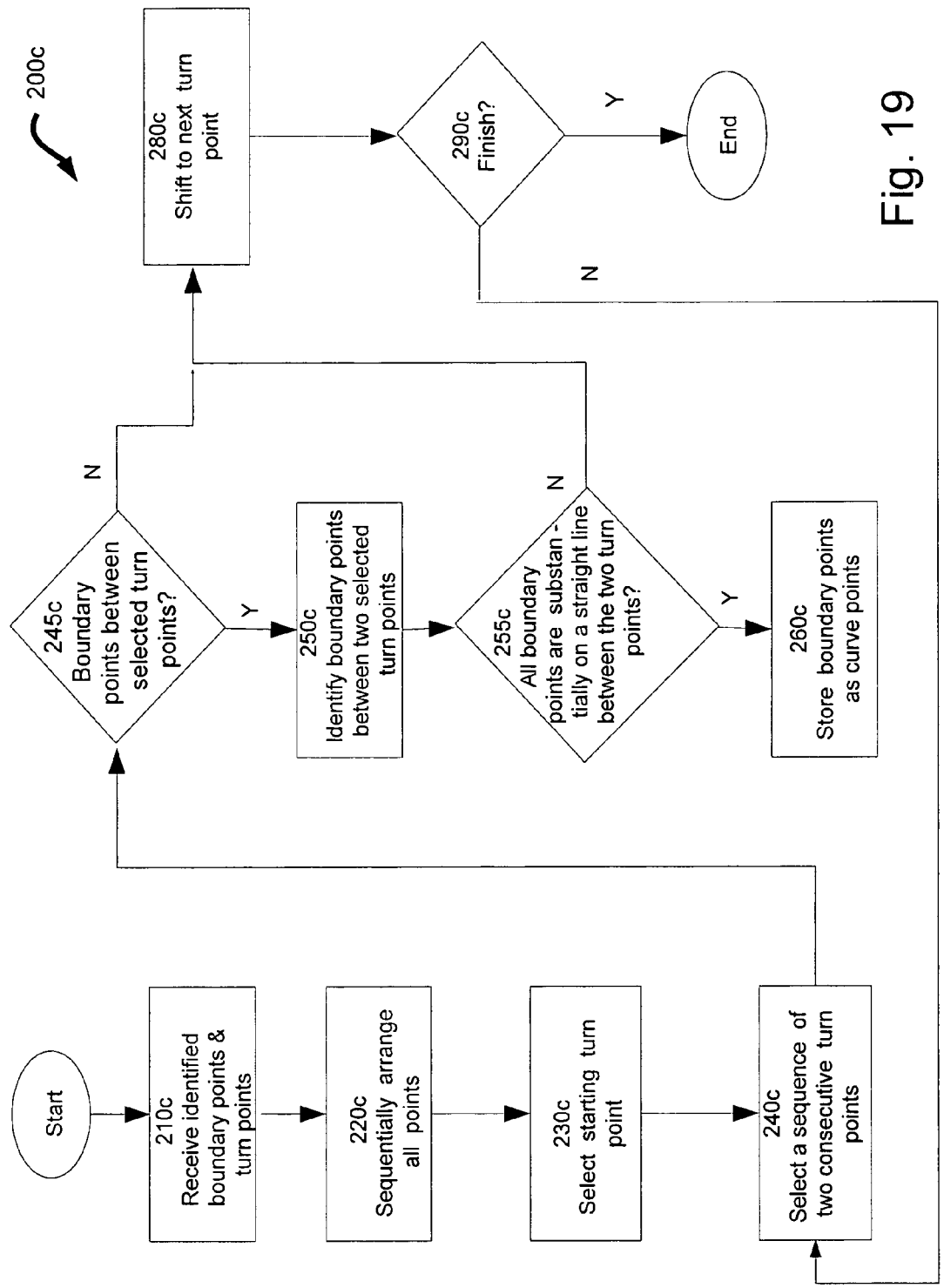
FIG. 19 shows the flow chart of a method for finding curve points of a pattern boundary in accordance with another embodiment of the invention.

Referring now to FIG. 19, another specific implementation of method 200, the recognition of turn points, is indicated generally at 200c. Curve points are points that are placed along a curved line on digitized patters, but do not segregate it. Some garment CAD programs can create curves through a continuous string of very small line segments connected by curve points to give the "look" of a smooth curve. Other programs do not necessarily string these line segments together, but rather can use what is called a "Bezier curve". A Bezier curve still uses curve points but the line is actually arced at each point so there is no need for short line segments. As a result, a fewer number of points is needed to create a fluid looking line. A CAD system can include algorithms to calculate the need to generate extra curve points, referred to as curve interpolation points, to allow for a smoother looking curve. In theory, it is preferable that the pattern be digitized with as few points as possible. For example, it is preferred that a straight line have only two points, the beginning and the end point, construction it. Similarly, it is preferred that a curved line have as few points as possible to obtain a fluid appearance. In theory, it is preferred that a curved line have an odd number of points. For example, it is preferred that on the side piece for a jacket, a pattern shaped similar to an hour glass have less than two dozen points along its premiter.

In order to assist in the explanation of method 200c, it will be assumed that method 200c is operated using system 30. Furthermore, the following discussion of method 200c will lead to a further understanding of system 30 and its various components. However, it is to be understood that system 30 and/or method 200c can be varied, and need not work exactly as discussed herein in conjunction with each other, and that such variations are within the scope of the present example. By way of example, it is assumed that devices 42 have captured image 38a1 of pattern 38 as shown in FIG. 1, and that the pattern 38 has been recognized, digitized and vectorized in accordance with method 200a, and that its turn points have been identified in accordance with method 200b, described above.

Referring now to FIG. 19, at step 210c, identified boundary points and turn points are received. In the present example, and referring now to FIG. 20, image 38a5 is shown, representing pattern boundary 38, outlined by boundary points 156. Each of these boundary points 156 represents an initial and/or end point of a vector that can be derived from method 200a. Referring again to FIG. 20, specific turn points within boundary points 156, i.e., points B, C, D, E, F, G, K, L, M, N, 0, R, W, AA, DA, FA, GA, HA, IA, JA, KA and LA, are indicated by white circles. These turn points can be identified by method 200b. At step 220c, all boundary points 156 are sequentially arranged. In the present example, and referring again to FIG. 20, all points are sequentially arranged from A to RA. Next, at step 230c, a starting turn point is selected. In the present example, and referring again to FIG. 20, the first turn point, point B, is selected as starting point 158. Next, at step 240c, a sequence of two consecutive turn points is selected. In the present example, a sequence 162, consisting of turn points B and C, is selected.

Figure 21:
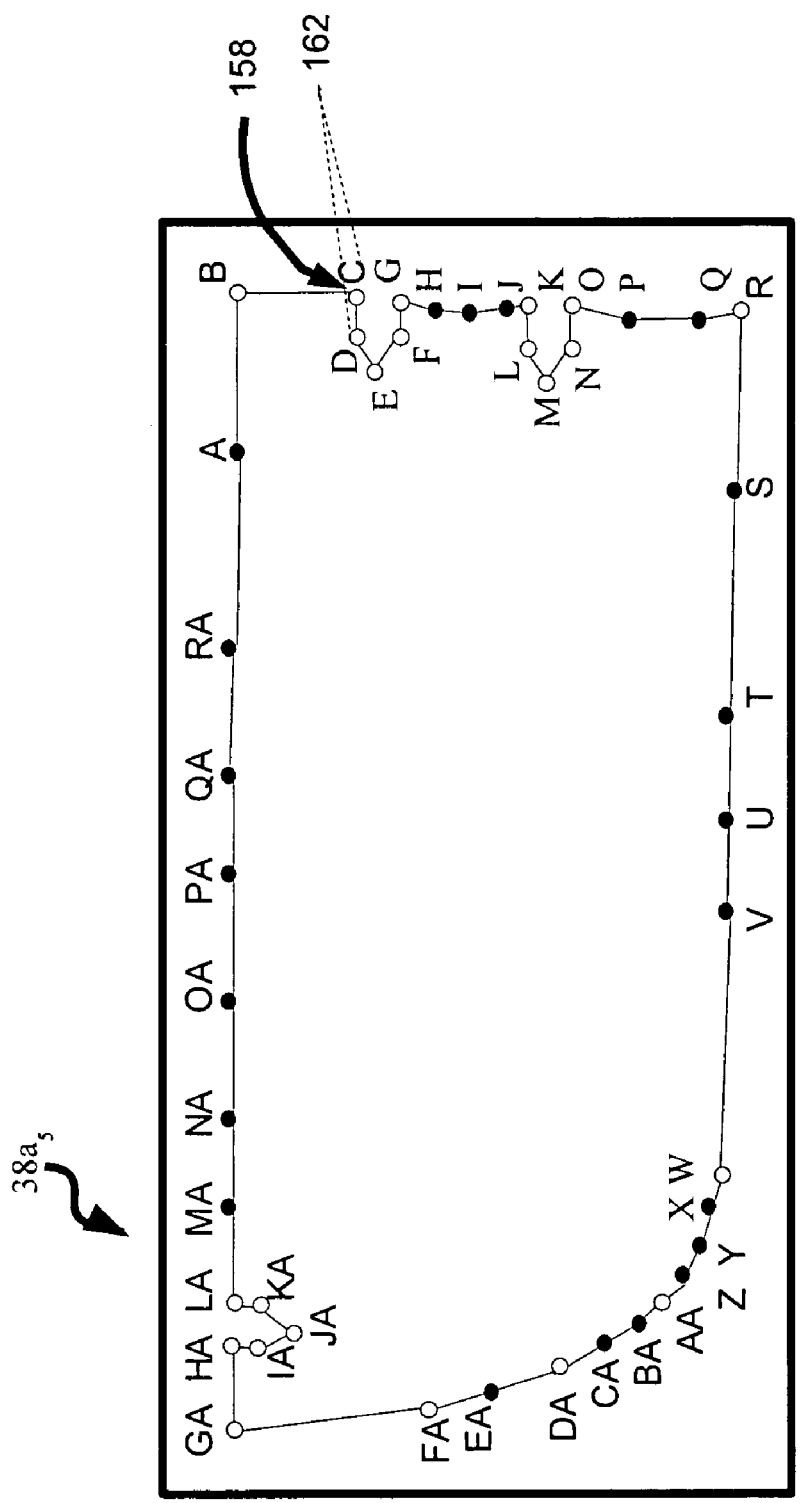
FIG. 21 shows the image of FIG. 17, with point C as the selected starting turn point and the sequence of points C and D as the selected sequence of turn points; and, FIG. 22 shows the image of FIG. 17, with point G as the selected starting turn point and the sequence of points G and K as the selected sequence of turn points.
Figure 22:
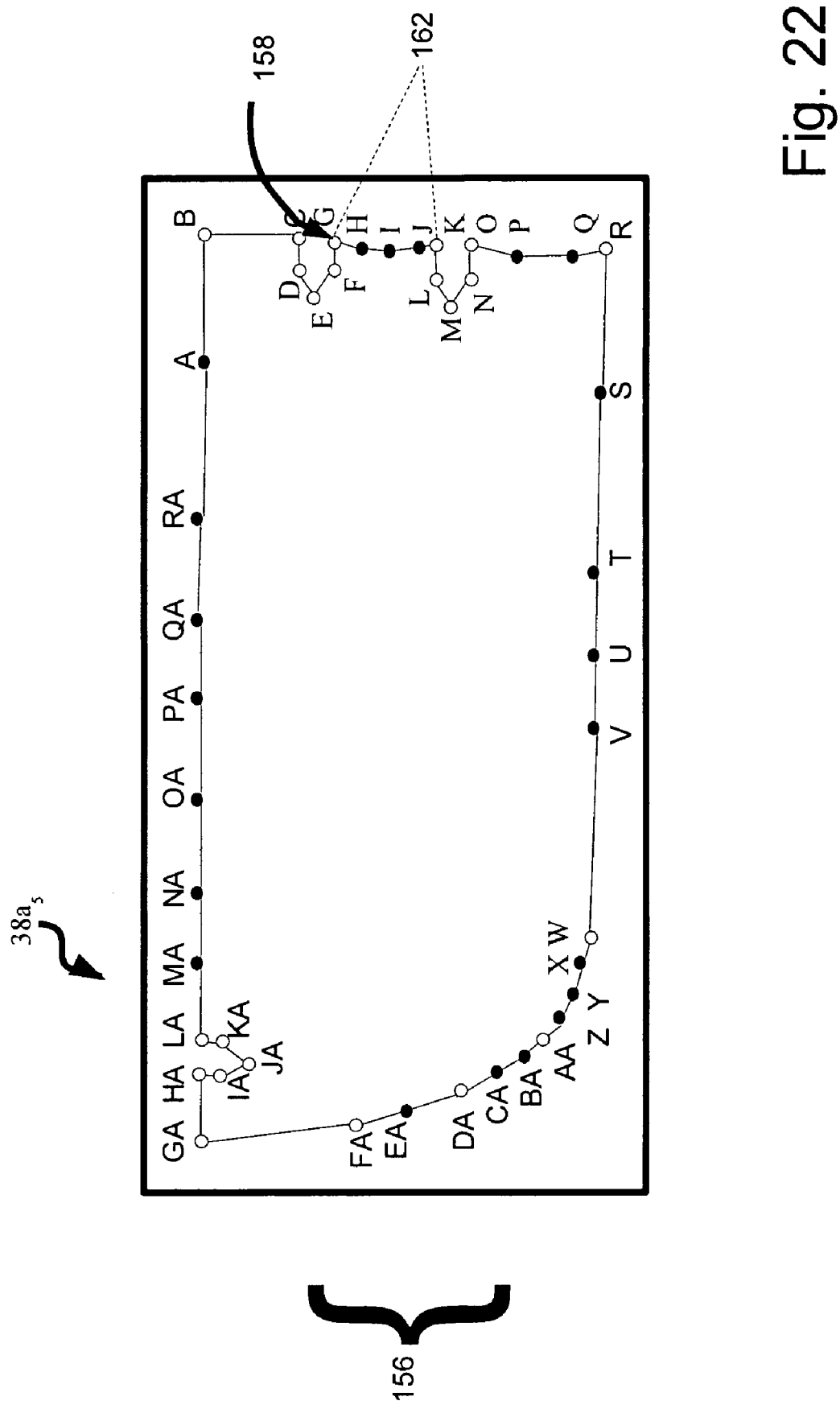

Next, at step 245c, it is determined whether there are any boundary points between selected turn points. If such boundary points exist between selected turn points, method 200c proceeds to step 250c, where those boundary points are identified. However, if there are no such boundary points, the method proceeds to step 280c, where there is a shift to the next turn point. In the present example, since there are no other boundary points between points B and C, method 200c proceeds to step 280c, where, referring now to FIG. 21, there is a shift to the next turn point, i.e., starting turn point 158 shifts to point C. Next, at step 290, it is determined whether all boundary points 156 have been examined. If all such points have been examined, the method ends. However, if there are still some boundary points 156 left that have not yet been examined, method 220c goes back to step 240c, where a new sequence of two consecutive turn points is selected. In the present example, since points D-RA have not yet been examined, the method goes back to step 240c, where a new sequence of two turn points is selected. Referring again to FIG. 21, a sequence of turn points 162, made up of turn points C and D, is selected. Method 200c proceeds next to step 245c, where it is once again determined that there are no boundary points 156 between sequence of turn points 162 (i.e., points C and D). Method 200c, thus, advances to step 280c, where start point 158 shifts to the next turn point, i.e., point D. Next, method 200c advances to step 290c, where method 220c gets redirected to step 240 and selects the sequence of turn points D and E. By now, it should also be apparent that since there are no boundary points between turn points D and E, and similarly between turn points E and F and points F and G, method 220c repeats as it did in the case of points B and C, and C and D, until, referring now to FIG. 22, at step 280c, starting turn point 158 shifts to turn point G. Next, method 220c proceeds to step 290c and returns to step 240c, where the sequence of turn points 162, made of points G and K, are selected. Next, method 200c advances to step 245c, where it is determined that there are three boundary points between turn points G and K. Method 200c, thus, advances to step 250c, where boundary points 156, between points G and K, are identified as points H, I, and J.

Next, method 220c proceeds to step 255c, where it is determined whether all boundary points are substantially on a straight line between the two turn points. If all boundary points are not substantially on a straight line between the two turn points (i.e., are within a predefined number of degrees of each other, e.g., five degrees) method 200c advances to step 260c, where such boundary points are stored as curve points. However, if all boundary points are substantially on a straight line between the two turn points, the method proceeds to step 280c, where, as stated before, there is a shift to the next turn point. In the present example, since points H, I and J are not all substantially on a straight line between turn points G and K, the method proceeds to step 260c, where boundary points H, I and J are stored as curve points.

Next, method 200c proceeds, once again, to step 280c, where there is a shift to the next turn point. In the present example, there is a shift from point G to point K. Next, method 200c proceeds to step 290c, where it is determined whether all boundary points and turn points have been examined, in which case method 200c ends. Since points L-RA have not yet been considered, method 200c, once again, returns to step 240c, where another sequence of two turn points is selected. Method 200c repeats in this way until all turn points and boundary points have been considered, and all curve points are identified.

While the embodiments discussed herein are directed to specific examples, it will be understood that subsets and variations of the embodiments are within the scope of the invention. For example, it should now be understood that the teachings herein can also be combined with known manual digitizing techniques. Such manual digitizing techniques can be used to ask the user to verify that the automatic recognition procedures correctly identified pattern elements, and/or or to have the user enter in any pattern elements that were not recognized by the automatic recognition procedures. As another example, it is to be understood that many different methods can be used to detect pattern boundary, one of which is the "Active. Contours" or "Snakes" algorithm discussed in "Active Contours and Gradient Vector Flow", written by C. Xu and J. L. Prince, online: Image Analysis and Communication Lab Homepage, John Hopkins University <http://iacl.ece.jhu.edu/projects/gvf/> (last visited on Feb. 24, 2004), the contents of which are hereby incorporated by reference. Other methods can be used to detect other elements, as desired.

Figure 23:
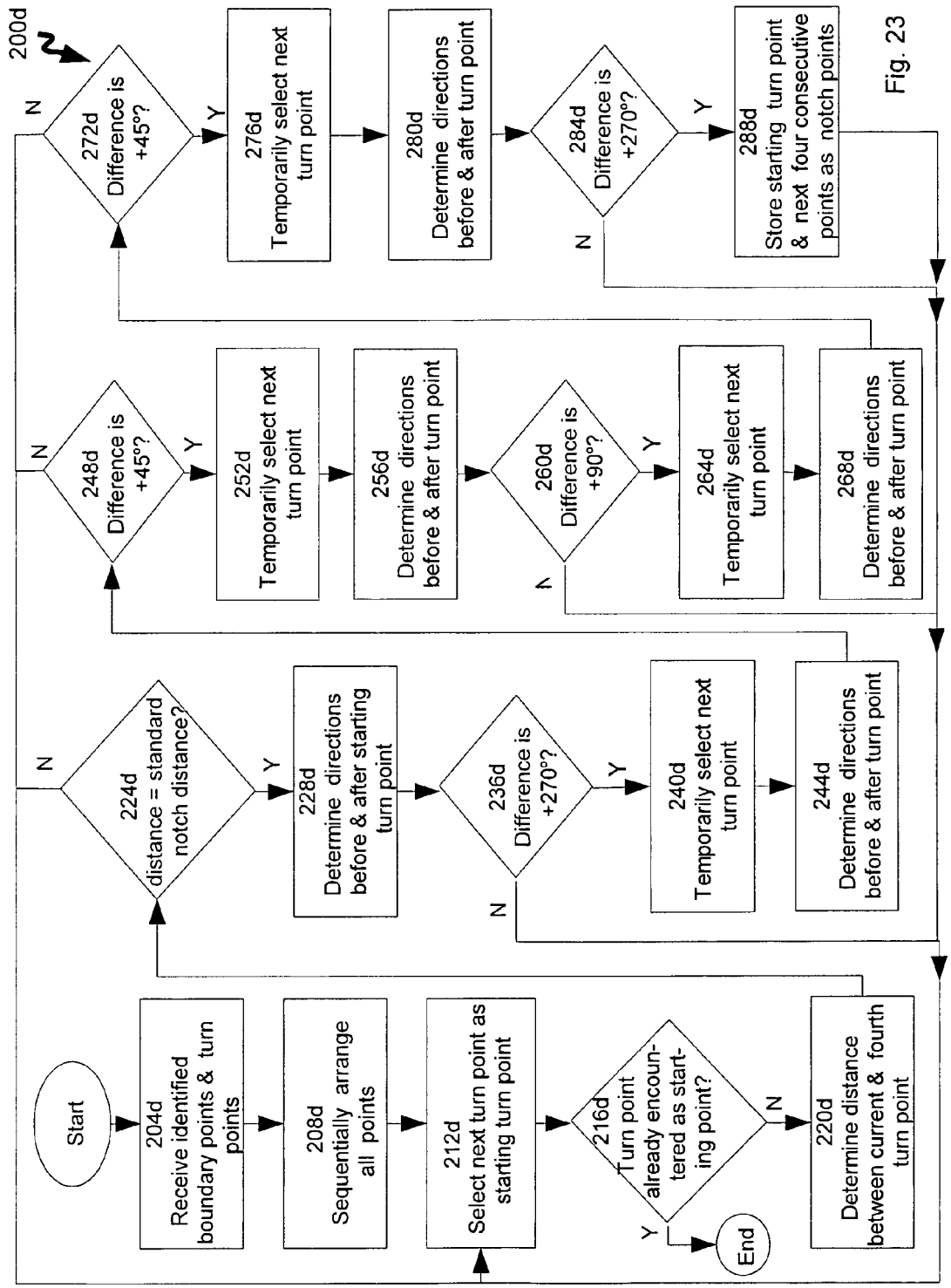
FIG. 23 shows a flow chart of a method for finding notch points of a pattern boundary in accordance with another embodiment of the invention.

Referring now to FIG. 23, another specific implementation of method 200, the recognition of pattern notches, is indicated generally at 200d. Notches are matching points placed along the edge of a pattern piece, used to align the pattern piece with other, related pattern pieces. They are placed at specific locations along a pattern edge by the pattern maker and used to align the pattern piece with other related pattern pieces". Five types of notches include rectangular notches, "U" shaped notches, slit notches, and "T" notches. They can be either cut or drawn into the fabric or paper. A digitized notch can have the same structural qualities as a point but has the added ability to represent a notch.

In order to assist in the explanation of method 200d, it will be assumed that method 200d is operated using system 30. Furthermore, the following discussion of method 200d will lead to further understanding of system 30 and its various components. However, it is to be understood that system 30 and/or method 200d can be varied, and need not work exactly as discussed herein in conjunction with each other, and that such variations are within the scope of the present example. For the purposes of an example, it is assumed that devices 42 have captured image 38a1 of pattern 38 as shown in FIG. 2, that the pattern boundary of device 38 has been recognized, digitized and vectorized in accordance with method 200a, that its turn points have been identified in accordance with method 200b and that its curve points have been identified in accordance with method 200c, described above.

Figure 20:
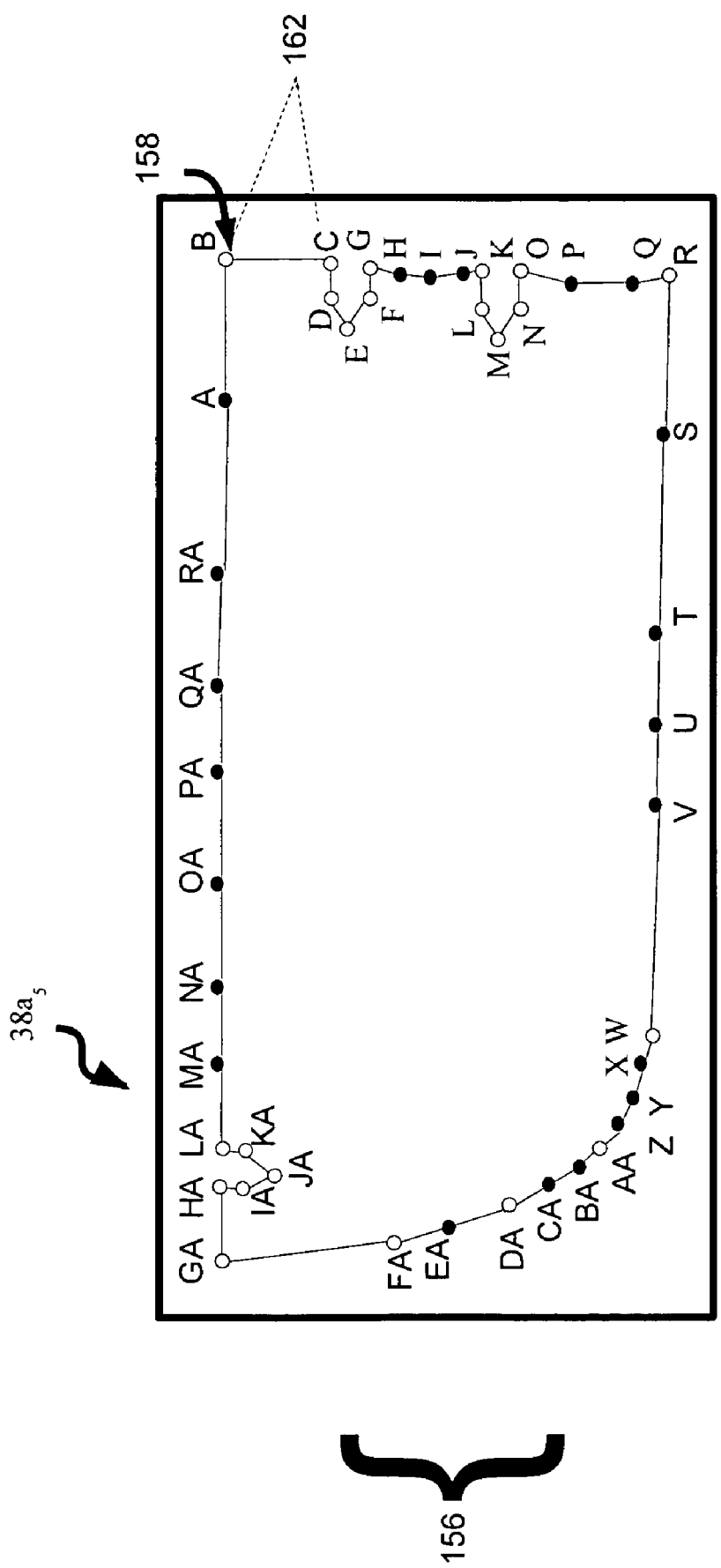
FIG. 20 shows the image of FIG. 17, with point B as the selected starting turn point and the sequence of points B and C as the selected sequence of turn points.

At step 204d, identified boundary points and curve points are received. In the case of the present example, it is assumed that boundary points 156 in FIG. 20 are received at step 204d of method 200d. As mentioned before, each of these points 156 represents an initial and/or an end point of a vector that can be derived from a method such as that of method 200a. For purposes of the present example, Table VI below shows information regarding boundary points 156, which would have been collected during a vectorization process such as the one described in method 200a. Table VI is similar to Tables I-V, in that it includes columns labeled "Index", "Vector", "Rectangular Co-ordinates", "Magnitude and Direction" and "Complete?". Each column describes substantially the same information as its corresponding column in Tables I-V, except, that initial and end points of each vector in the column labeled "Rectangular Co-ordinates" are labeled alphabetically in accordance with their corresponding labels A-RA in FIG. 22. Referring again to Table VI, each point 156 appears twice, once as an end point and the second time as an initial point. For example, point B appears twice, once as end point to vector 112, and a second time, as an initial point to vector 144. Similarly, point C appears twice, once as an end point to vector 144, and a second time, as the initial point to vector 145. Referring now to rows 1 and 2 and column 4 of Table VI, the magnitude and direction of vector 112 is six units and zero degrees, and the magnitude and direction of vector 144 is one unit and two hundred and seventy degrees respectively. This information can be used to determine that, at point B, there is a directional shift of two hundred and seventy degrees (i.e. two hundred and seventy minus zero) in the pattern boundary. Similarly, and referring now to rows 2 and 3 and column 4 of Table VI, the magnitude and direction of vector 144 is one unit and two hundred and seventy degrees, while the magnitude and direction of vector 145 is two units and one hundred and eighty degrees. This information can be used to determine that at point C, there is a shift of one hundred and eighty minus two hundred and seventy degrees, which is equal to negative ninety degrees (or as otherwise known to those skilled in the art, positive two hundred and seventy degrees).

TABLE VI

| Index | Vector | Initial Point | End Point | Rectangular Co-ordinates Magnitude and Direction | Complete? |
|---|---|---|---|---|---|
| 1. | 112 | A (−8, −4) | B (−2, −4) | (3, 0°) | Yes |
| 2. | 144 | B (−2, −4) | C (−2, −6) | (2, 270°) | Yes |
| 3. | 145 | C (−2, −6) | D (−4, −6) | (2, 180°) | Yes |
| 4. | 147 | D (−4, −6) | E (−5, −7) | (1, 225°) | Yes |
| 3. | 149 | E (−5, −7) | F (−4, −8) | (1, 315°) | Yes |
| 4. | 151 | F (−4, −8) | G (−2, −8) | (1, 0°) | Yes |
| 5. | 153 | G (−2, −8) | H (−3, −10) | (5, 270°) | Yes |
| . | . | . | . | . | . |
| . | . | . | . | . | . |
| . | . | . | . | . | . |

Figure 24:
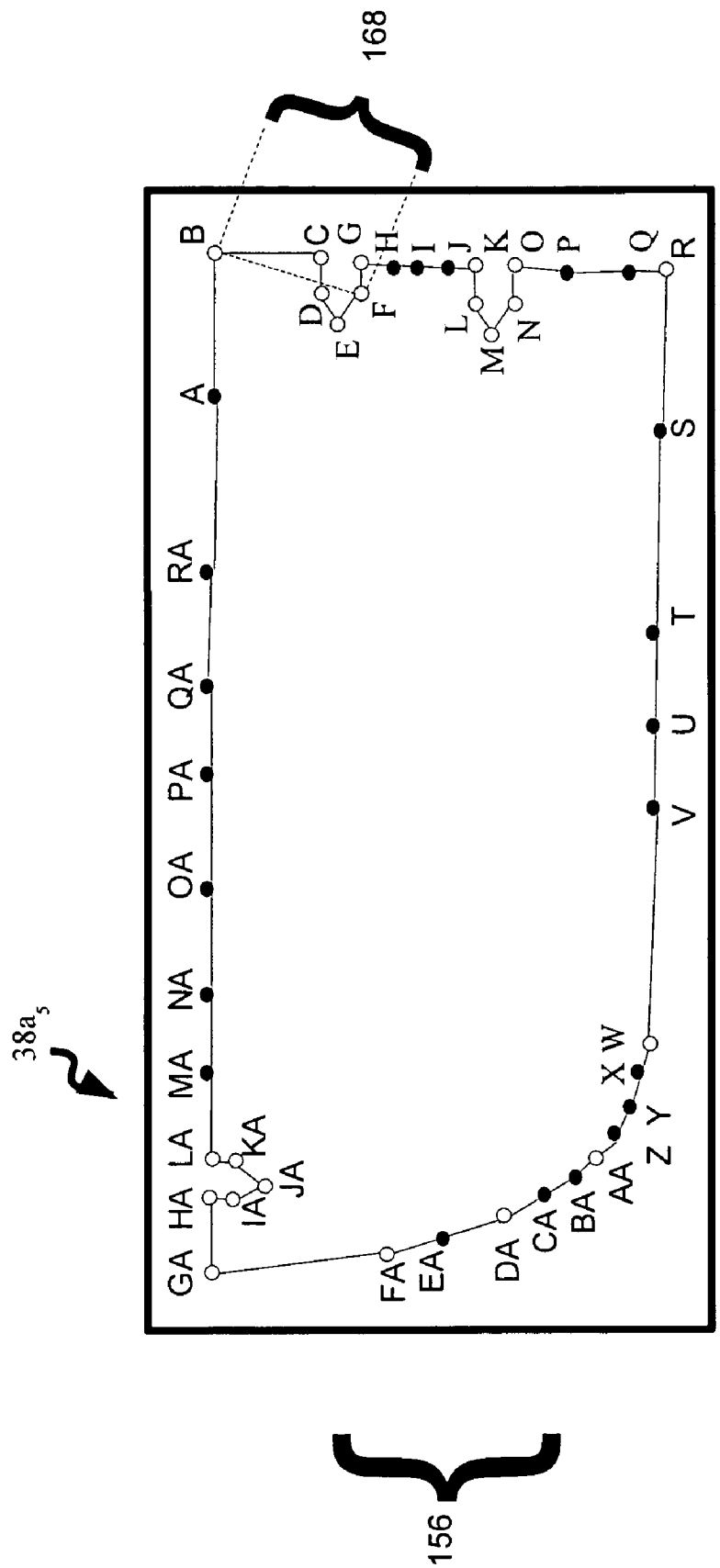
FIG. 24 shows the image of FIG. 17 with the distance between point B and point F being determined.
Figure 25:
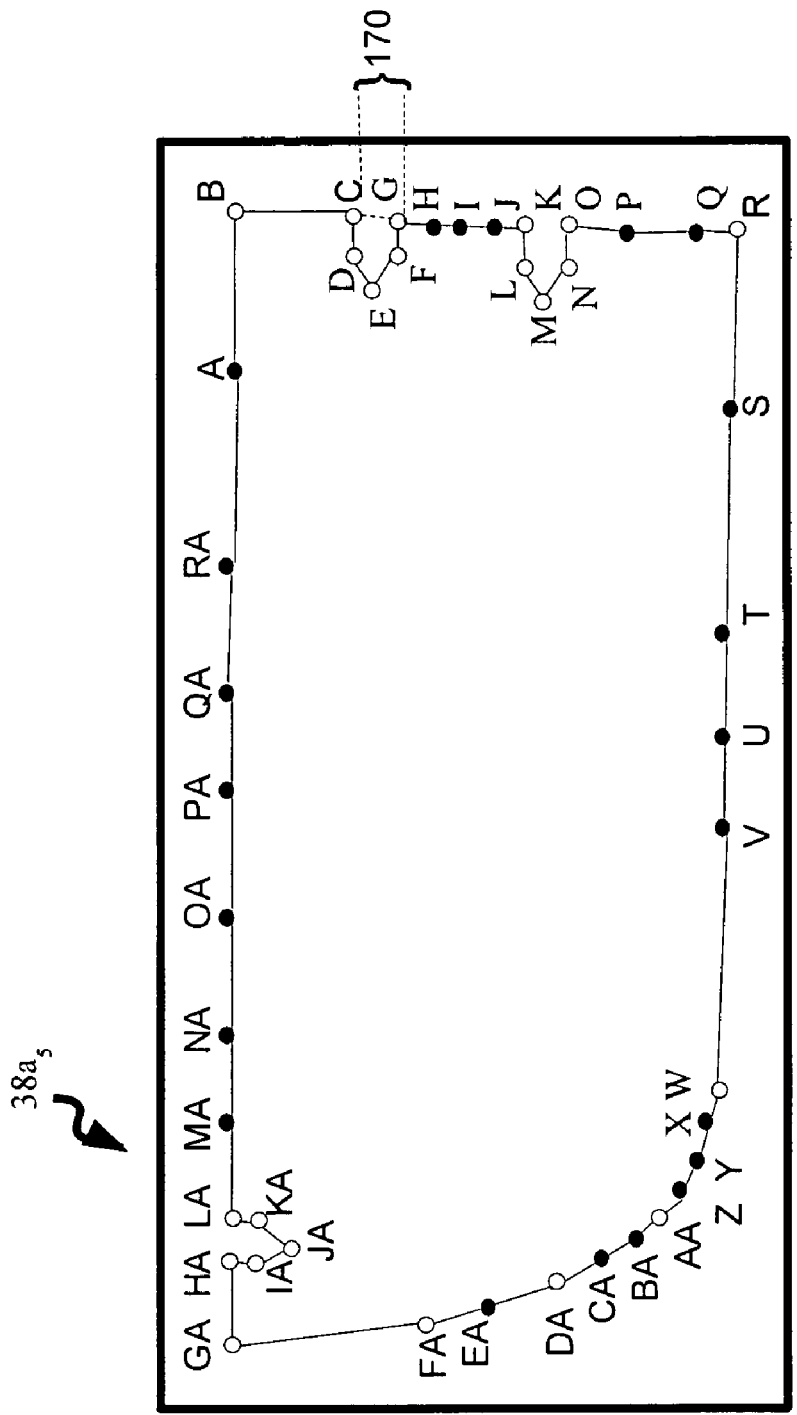
FIG. 25 shows the image of FIG. 17 with the distance between point C and point G being determined.

Next, at step 208d, such points are sequentially arranged. In the case of the present example, points 156, are already sequentially arranged from A-RA, in FIG. 22. Next, at step 212d, the next turn point is selected as the next starting point. In the case of the present example, starting from the beginning of the sequence of points 156, turn point B is the first turn point, and as such, it is selected as the starting point. Next, method 200d proceeds to step 216d, where it is determined whether the selected turn point has already been examined as a starting point. If the selected turn point has already been examined as a starting point, the method ends. However if the selected turn point has not been examined as a starting point, the method proceeds to step 220d, where the distance from the starting turn point and the fourth turn point from the starting turn point is determined. In the case of the present example, at step 216d, since turn point B has not been encountered as a starting turn point, the method proceeds to step 220d, where, referring now to FIG. 24, a distance 168 between turn point B to the fourth turn point, i.e., point F, is determined to be three units of magnitude. Next the method proceeds to step 224d, where it is determined whether distance 168 is equal to the standard notch distance. If distance 168 is equal to the standard notch distance, the method proceeds to step 228d, where the direction immediately before and after the starting turn point is determined. However, if the distance is not equal to the standard notch distance 168, the method returns to step 212d, where the next turn point is selected as the starting turn point. In the case of the present example, assuming that the standard notch distance is one unit of magnitude, it is determined that distance 168 is not equal to the standard notch distance and the method goes back to step 212d, where point C is selected as the starting turn point. Next, method 200d advances to step 216d, and from there, since point C has not been examined as a starting point, method 200d proceeds to step 220d, where, referring now to FIG. 25, another distance 170 between point C and the fourth turning point, i.e., point G, is determined to be one unit of magnitude.

Next the method proceeds to step 224d, where it is determined that distance 170 is equal to the standard notch distance. Method 200d, hence, proceeds to step 228d, where the directions immediately before and after the starting turn point are determined. In the case of the present example, and referring again to Table VI and FIG. 25, it is apparent to those skilled in the art that the direction immediately before point C is the direction of the vector for which point C is the end point, i.e., positive two hundred and seventy degrees. Similarly, the direction immediately after point C is the direction of the vector for which point C is the initial point, i.e., positive one hundred and eighty degrees. Next the method proceeds to step 236d, where the difference between the direction immediately before and after the turn point is determined. In the case of the present example, the difference immediately before and after the turn point is determined to be positive one hundred and eighty minus positive two hundred and seventy, which is equal to negative ninety degrees, or as otherwise known to those skilled in the art, positive two hundred and seventy degrees. Accordingly, since the difference between directions immediately before and after point C is positive two hundred and seventy degrees, the method proceeds to step 240d, where the next turn point is temporarily selected. In the case of the present example, that turn point is point D.

Next, method 200d proceeds to step 244d, where the direction before and after the temporarily selected turn point is determined. In the case of the present example, and referring now to lines 3 and 4 of Table VI, the direction of the vector immediately before point D is positive one hundred and eighty degrees, while the direction of the vector immediately after point D is positive two hundred and twenty-five degrees. Next, the method proceeds to step 248d, where it is determined whether the difference between the direction before and after the temporarily selected turn point is equal to positive forty-five degrees. If the difference is equal to positive forty-five degrees, method 200d proceeds to step 252d where the next turn point is temporarily selected. However, if the difference is not positive forty-five degrees, method 200d returns to step 212d, where the next turn point is selected as the starting turn point. In the case of the present example, the difference between the direction of the vector before and after point D is positive two hundred and twenty-five minus positive one hundred and eighty, which is equal to positive forty-five degrees. Accordingly, method 200d proceeds to step 252d, where the next turn point, i.e., point E, is temporarily selected.

Method 200d then proceeds to step 252d, where the direction of vectors before and after the temporarily selected turn point are determined. In the case of the present example, and referring now to Table VI, the direction immediately before point E is positive two hundred and twenty-five degrees, while the direction immediately after point E is positive three hundred and fifteen degrees. Next the method proceeds to step 260d, where it is determined whether the difference between the direction before and after the temporarily selected point is equal to positive ninety degrees. If the difference is positive ninety degrees, method 200d proceeds to step 264, where the next turn point is selected. Otherwise, method 200d returns to step 212d, where the next turn point is selected as the starting point. In the case of the present example, the difference between the direction of the vector immediately before and after point E is positive three hundred and fifteen degrees minus positive two hundred and twenty-five degrees, which is equal to positive ninety degrees. Accordingly, since the difference is equal to positive ninety degrees, the method proceeds to step 264d, where the next turn point, i.e., point F, is temporarily selected.

It will now be apparent that method 200d next proceeds to step 268d, where the direction before and after turn point F is determined to be positive three hundred and fifteen degrees and zero degrees, as in Table VI. Next method 200d proceeds to step 272d, where it is determined whether the difference between the direction before and after point F is positive forty-five degrees. If the difference is not positive forty-five degrees, the method, once again, returns to step 212d where a new starting turn point is selected. However, if the difference is positive forty-five degrees, the method proceeds to step 276*d*, where the next turn point (after point F) is selected. In the case of the present example, the difference before and after point F is zero degrees minus positive three hundred and fifteen degrees, which is equal to negative three hundred and fifteen degrees (i.e., positive forty-five degrees). Method 200*d* thus proceeds to step 276*d*, where the next turn point, i.e., point G, is selected.

It will now be apparent that method 200*d* proceeds next to step 280*d*, where the direction before and after turn point G is determined to be zero degrees and positive two hundred and seventy degrees. Next method 200*d* proceeds to step 284, where it is determined whether the difference between the direction before and after the turn point is positive two hundred and seventy degrees. If the difference is positive two hundred and seventy degrees, the method proceeds to step 288*d*, where the starting turn point, and the next four consecutive turn points, are stored as notch points. Otherwise, if the difference is not positive two hundred and seventy degrees, method 200*d* returns to step 212*d* once again, where the next turn point is selected as the starting point. In the case of the present example, since the difference between the direction before and after point G is positive two hundred and seventy degrees minus zero degrees, method 200*d* proceeds to step 288*d*, where turn points C, D, E, F and G are stored as notch points.

While the specific angles of a) positive two hundred and seventy, b) positive forty-five and c) positive ninety degrees were specifically mentioned in steps 236*d*, 248*d*, 260*d*, 272*d* and 284*d* of method 200*d*, the actual angles used in each of these steps may vary and need not be exactly the angles mentioned above. Similarly, while the fourth turn point was specifically mentioned in step 220*d* of method 200*d*, the number of turn points in a notch can vary depending on the size and shape of the notch. Alternatively, if a notch includes an undetermined number of curve points, then at step 220*d*, the distance between the starting turn point and the next turn point that was not also a curve point could be determined. In general, method 200*d* can be modified to search for any cluster of turn points that are at a set of angles (or a range of angles) in relation to each other that characterize a notch.

Figure 26:
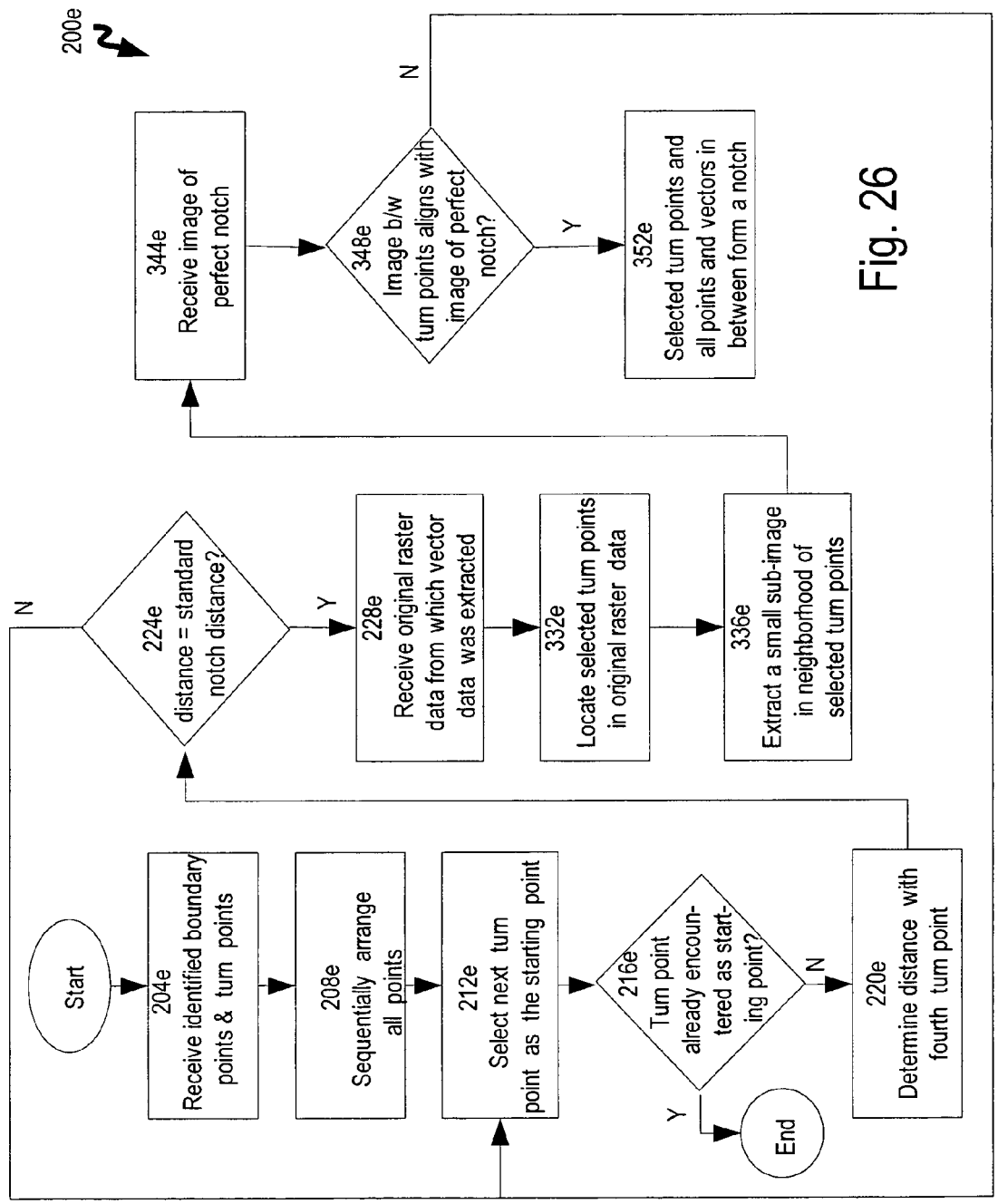
FIG. 26 shows a flow chart of a method for finding notch points of a pattern boundary in accordance with another embodiment of the invention.

Furthermore, method 200*d* is only an example of a method that can be used to extract notch points on the pattern boundary. Another example of detecting pattern notches is the use of a normalized cross-correlation process in method 200*e*, as demonstrated in FIG. 26. At step 204*e*, boundary points and turn points are received. At step 208*e*, all points are sequentially arranged. At step 212*e*, the next turn point is selected as the starting turn point. At step 216*e*, it is determined whether the turn point selected has already been encountered by method 200*e* as starting point. At step 220*e*, the distance between the starting turn point and its fourth turn point is determined. At step 224*e*, it is determined whether the distance between the starting turn point and the selected turn point is equal to the standard notch distance. Next at step 228*e*, the original raster data, from which vector data was extracted, is received. At step 332*e*, selected turn points in the original raster data are located. At step 336*e*, a small sub-image in neighborhood of selected turn points is extracted. At step 344*e*, an image of a perfect (known) notch is received. At step 348*e*, it is determined whether the image of a perfect notch substantially matches the sub-image selected at step 336*e*. One way to make this determination is to perform a normalized cross-correlation between a perfect notch and the image between the two selected turn points. If the result of the cross-correlation is higher than a pre-determined threshold (for example, ninety percent), the image between the two selected turn points is deemed to align with the image of a perfect notch, and method 200*e* proceeds to step 352*e* where the selected turn points in steps 212*e* and 220*e*, and the image between the selected turn points, is stored as a notch. If on the other hand the result of the cross-correlation is not higher than a pre-determined threshold (for example, ninety percent), the image between the two selected turn points is deemed not to align with the image of a perfect notch, and method 200*e*, thus, returns to step 212*e* where the next turn point is selected as the starting point and the process repeats for another set of points.

While, at step 344*e* of method 200*e*, the image of only one perfect notch was received, at step 344*e*, a library of various images of known notches can be received instead. As such at step 348*e*, instead of determining whether the selected image in step 336*e* matches the one image received in step 344*e*, it can be determined whether the selected image matches any of the images in the library of perfect notches received in the previous step.

Figure 27:
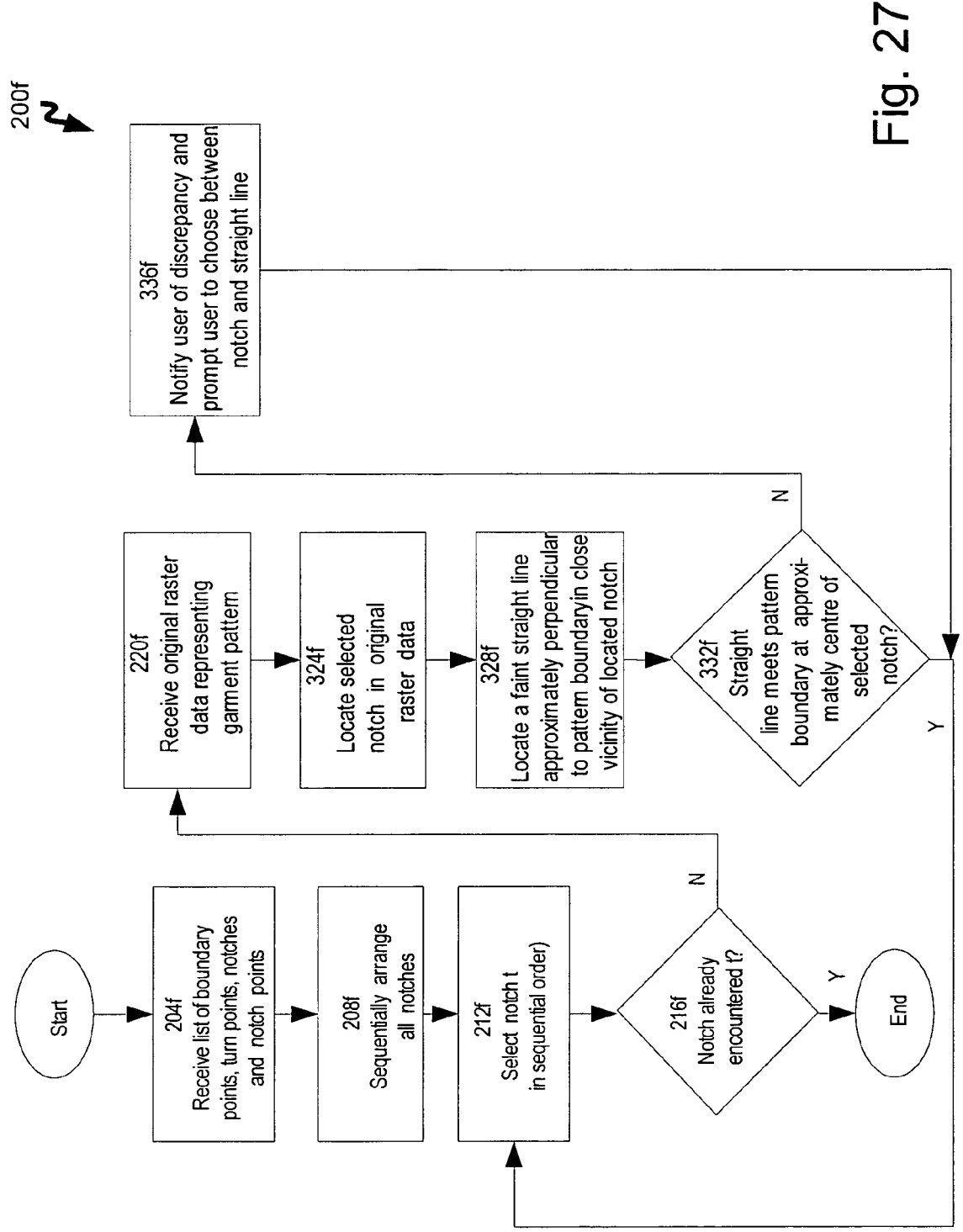
FIG. 27 shows a flow chart of a method for finding notch points of a pattern boundary in accordance with another embodiment of the invention.

Furthermore, any method used to extract notches can further be modified to change the location of the extracted notch. Referring now to FIG. 27, method 200*f* is an example of a method that can be used to modify the location of an extracted notch. At step 204*f*, a list of boundary points, notches and notch points is received. Next, at step 212*f*, all notches are sequentially arranged. Next, at step 216*f*, determine if the selected notch has already been encountered. If the selected notch has already been encountered, the method ends. However, if the selected notch has not been encountered, the method proceeds to step 220*f*, where the original raster data representing the garment pattern is received. This data can be the raster data mentioned previously in method 200*a*. Next, at step 324*f*, the selected notch is located in the original raster data. Next, at step 328*f*, a faint straight line approximately perpendicular to the pattern boundary is located in close vicinity of the located notch. This straight line represents a notch reference mark made by the pattern maker, denoting the location of the notch and it should be located at the centre of the selected notch. Next, at step 332*f*, it is determined whether the located straight line meets the pattern boundary at approximately the centre of the selected notch. If the located straight line meets the pattern boundary at the centre of the located notch, method 200*f* returns to step 212*f* where another notch is selected in sequential order. If, on the other hand, it is determined that the located straight line does not meet the pattern boundary at the centre of the located notch, the user is notified of the discrepancy and the software prompts the user to choose between the notch or the straight line or a location midway between the two.

Figure 28:
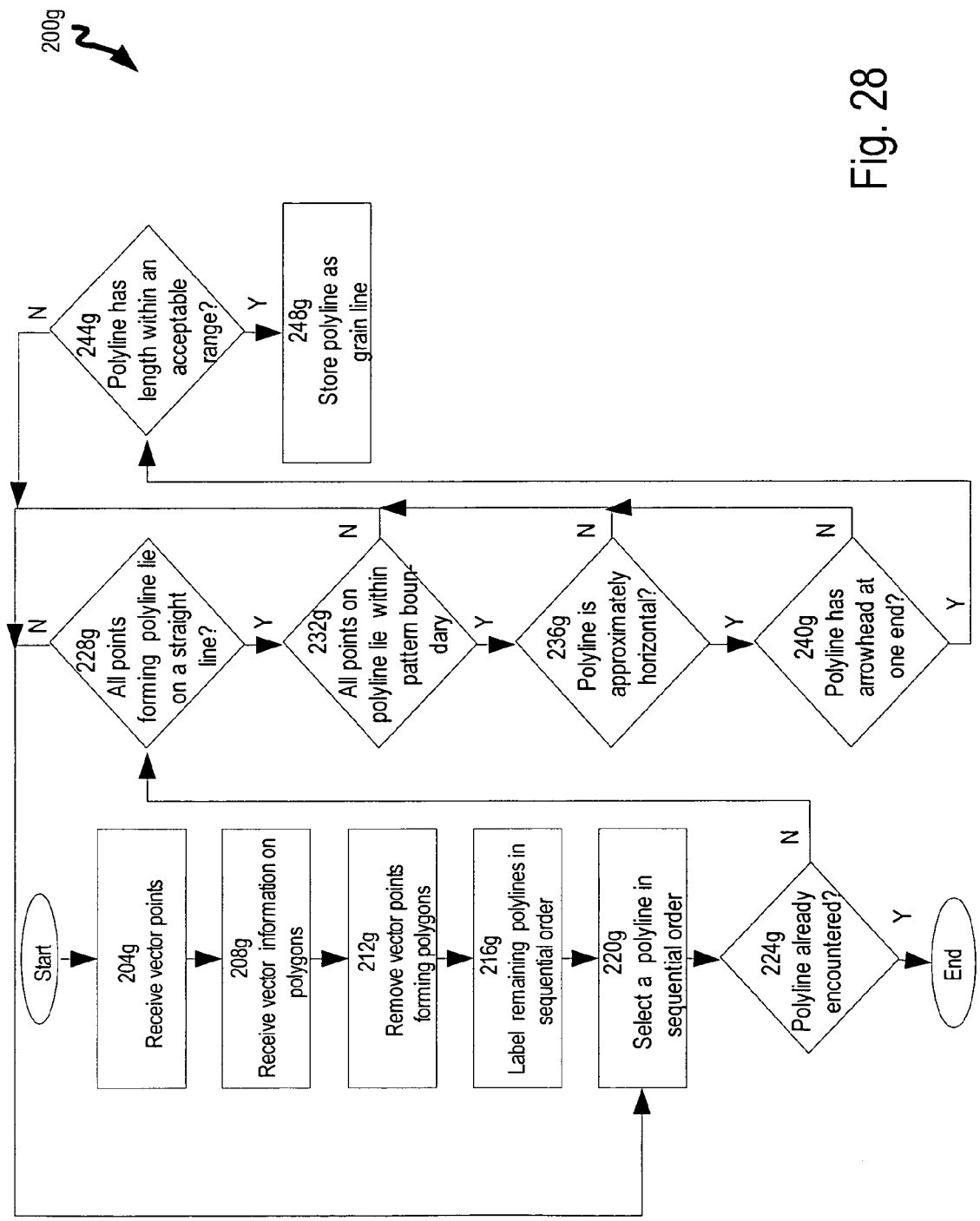
FIG. 28 shows a flow chart of a method for finding the grain line of a pattern boundary in accordance with another embodiment of the invention.

Referring now to FIG. 28, another specific implementation of method 200, the recognition of a grain line, is indicated generally at 200*g*. A grain line provides information on the path of the fabric grain and can show the cutter how to place the pattern on the fabric before cutting. Grain lines also serve as reference markers for grading. Grain lines usually include an arrowhead, which serves as an important reference for the cutter. As demonstrated below, an arrowhead can be used in conjunction with an algorithm to help automatically locate a grain line.

In order to assist in the explanation of method 200*g*, it will be assumed that method 200*g* is operated using system 30. Furthermore, the following discussion of method 200*g* will lead to further understanding of system 30 and its various components. However, it is to be understood that system 30 and/or method 200*g* can be varied, and need not work exactly as discussed herein in conjunction with each other, and that such variations are within the scope of the present example.

Figure 29:
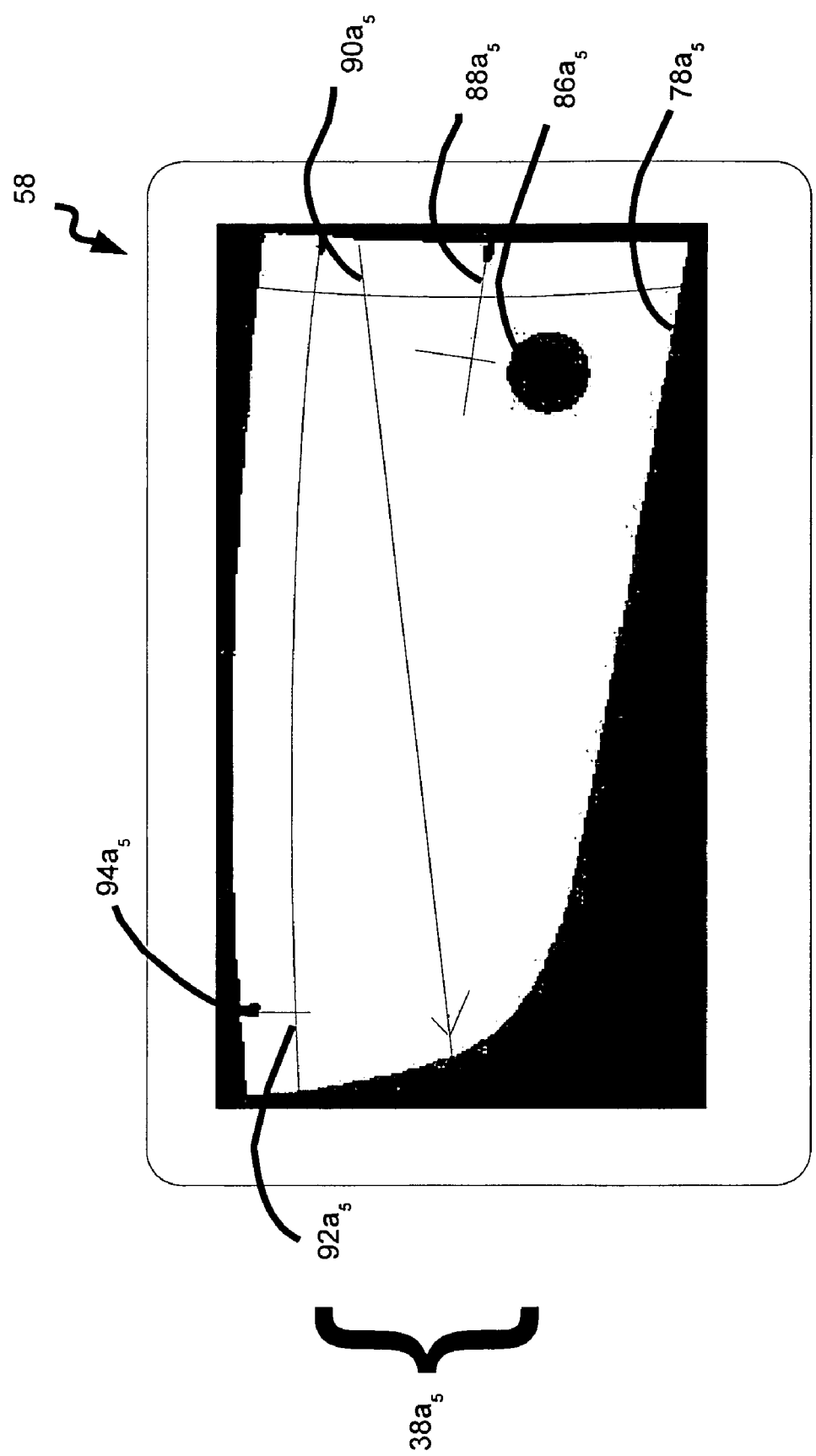
FIG. 29 shows the image of FIGS. 2, after the image is converted to an one-bit monochrome in accordance with another embodiment of the invention.
Figure 30:
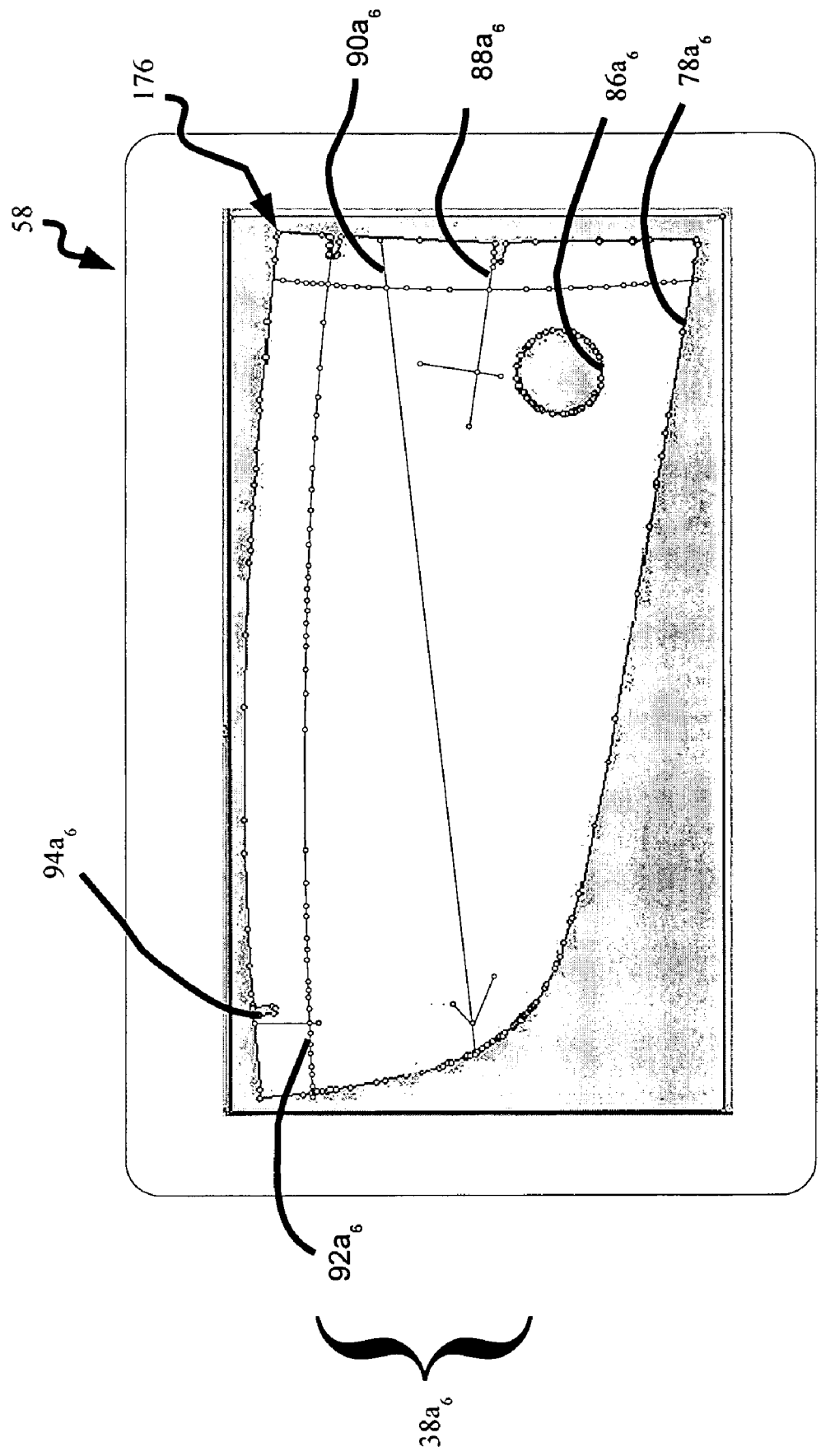
FIG. 30 shows the image of FIG. 29, after the image is converted to vector data.
Figure 31:
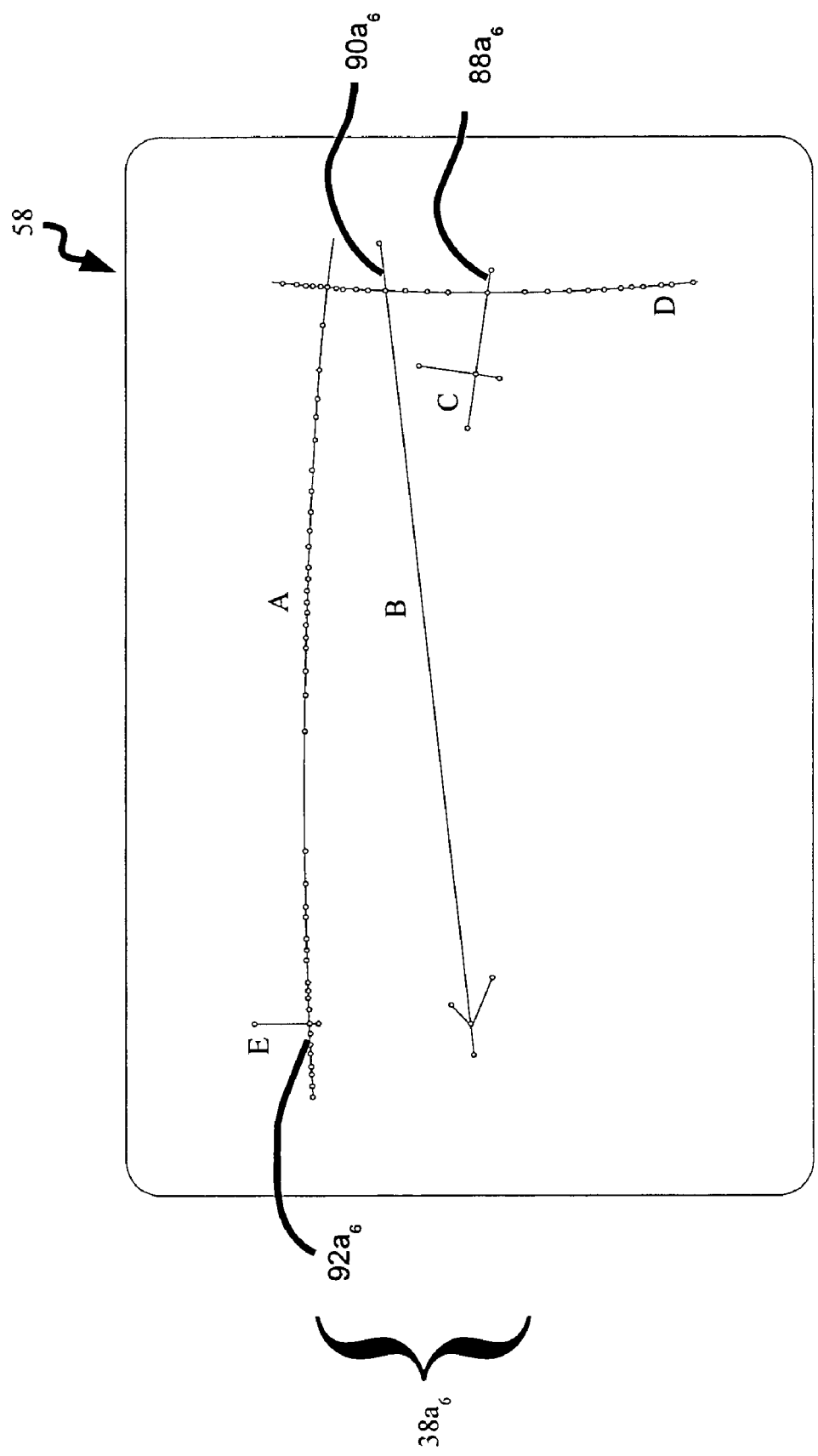
FIG. 31 shows the image of FIG. 30 with the all closed polylines having been removed.
Figure 32:
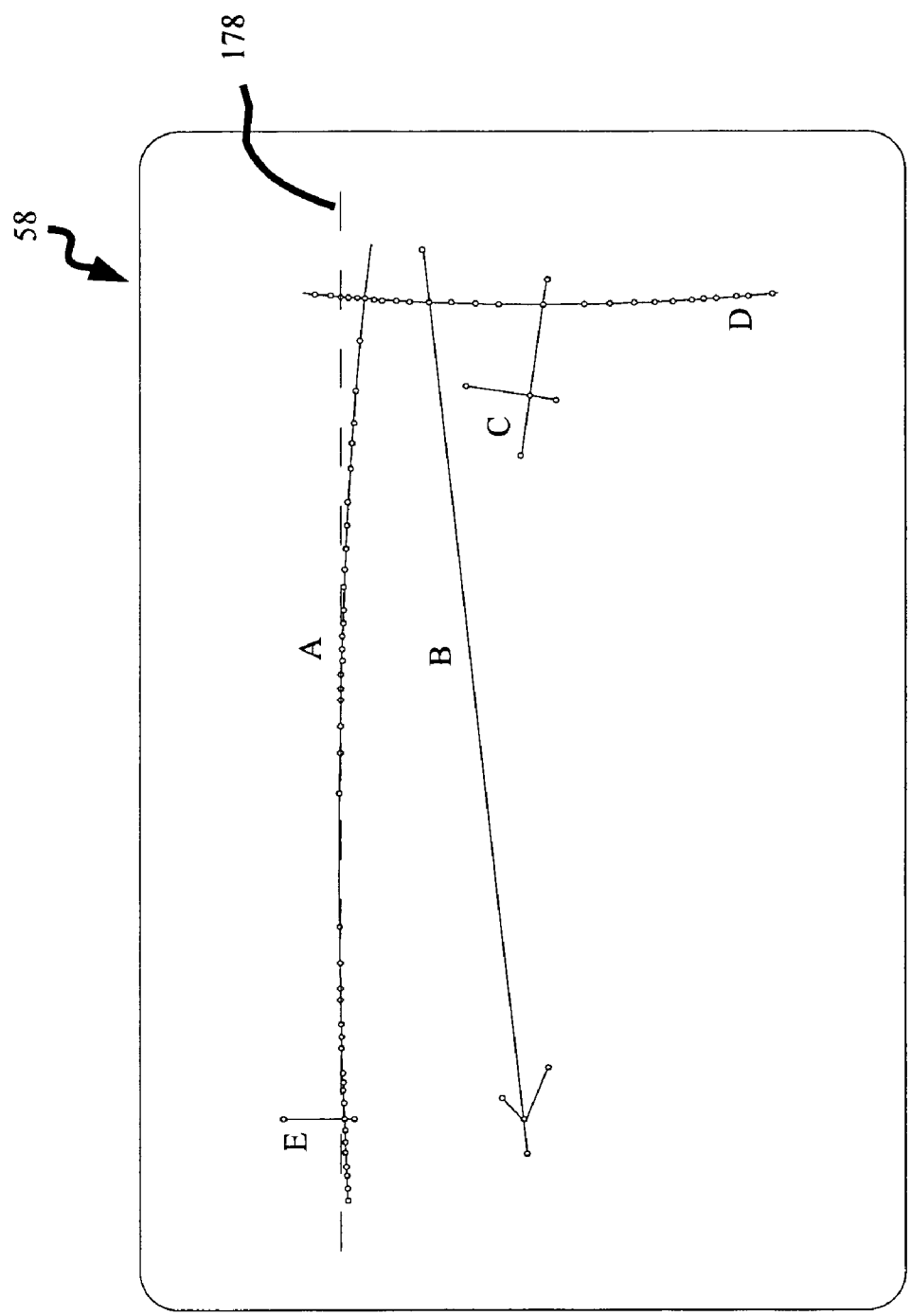
FIG. 32 shows the image of FIG. 31 with polyline A not lining-up with the image of a "perfect straight line"
Figure 33:
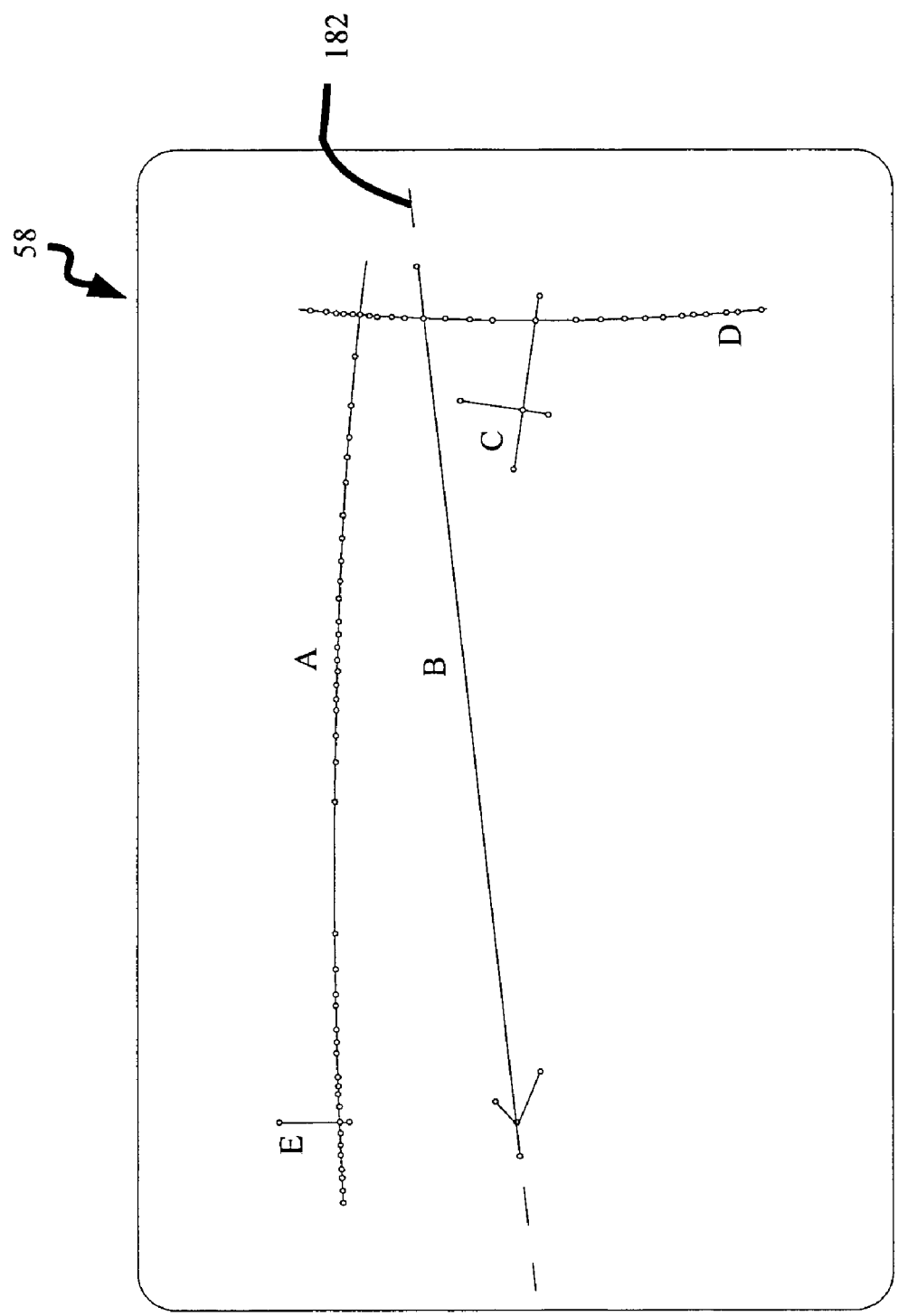
FIG. 33 shows the image of FIG. 31, with polyline B lining-up with the image of a "perfect straight line"
Figure 34:
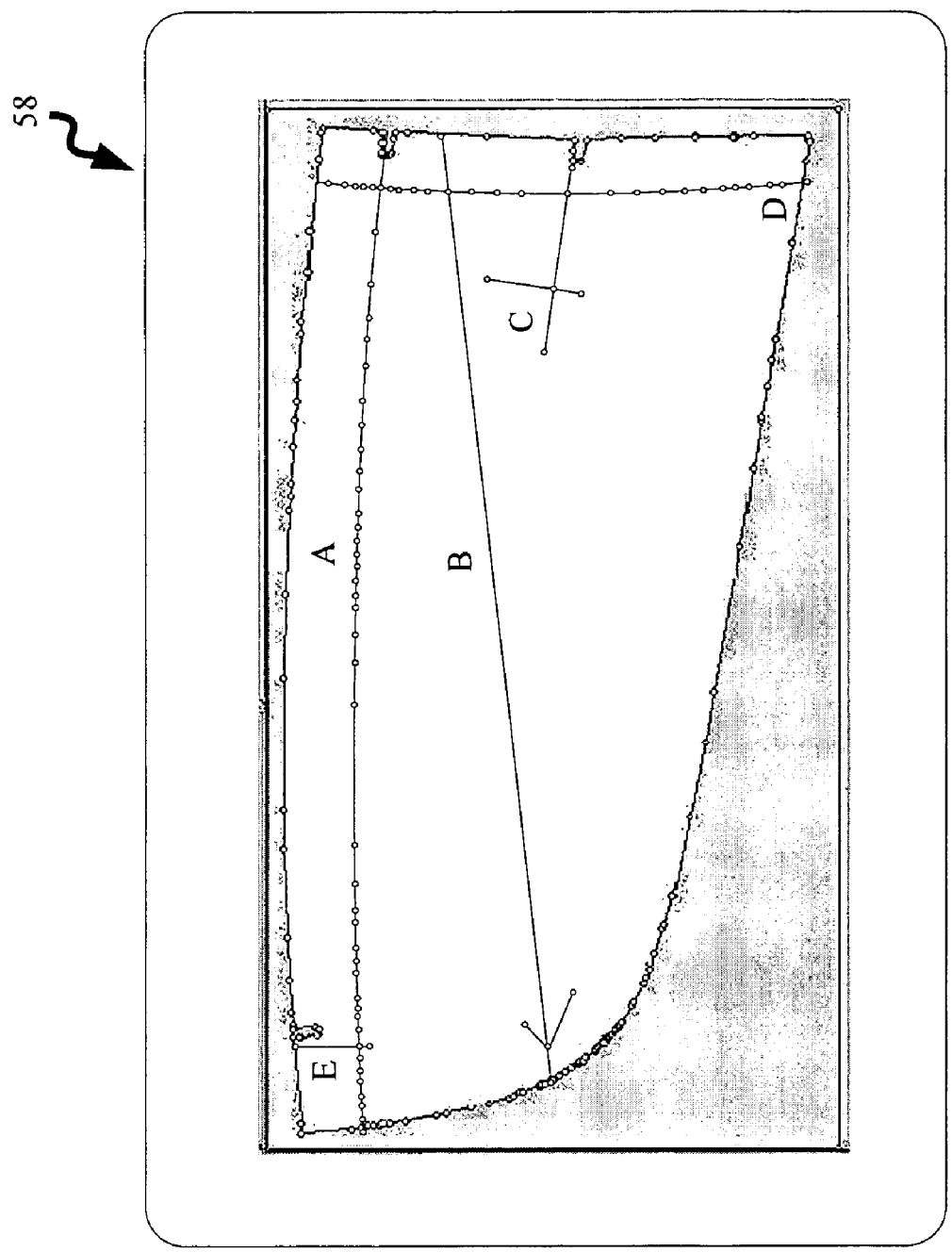
FIG. 34 shows the image of FIG. 31 with the image of the pattern boundary being reinserted into screen 50.
Figure 35:
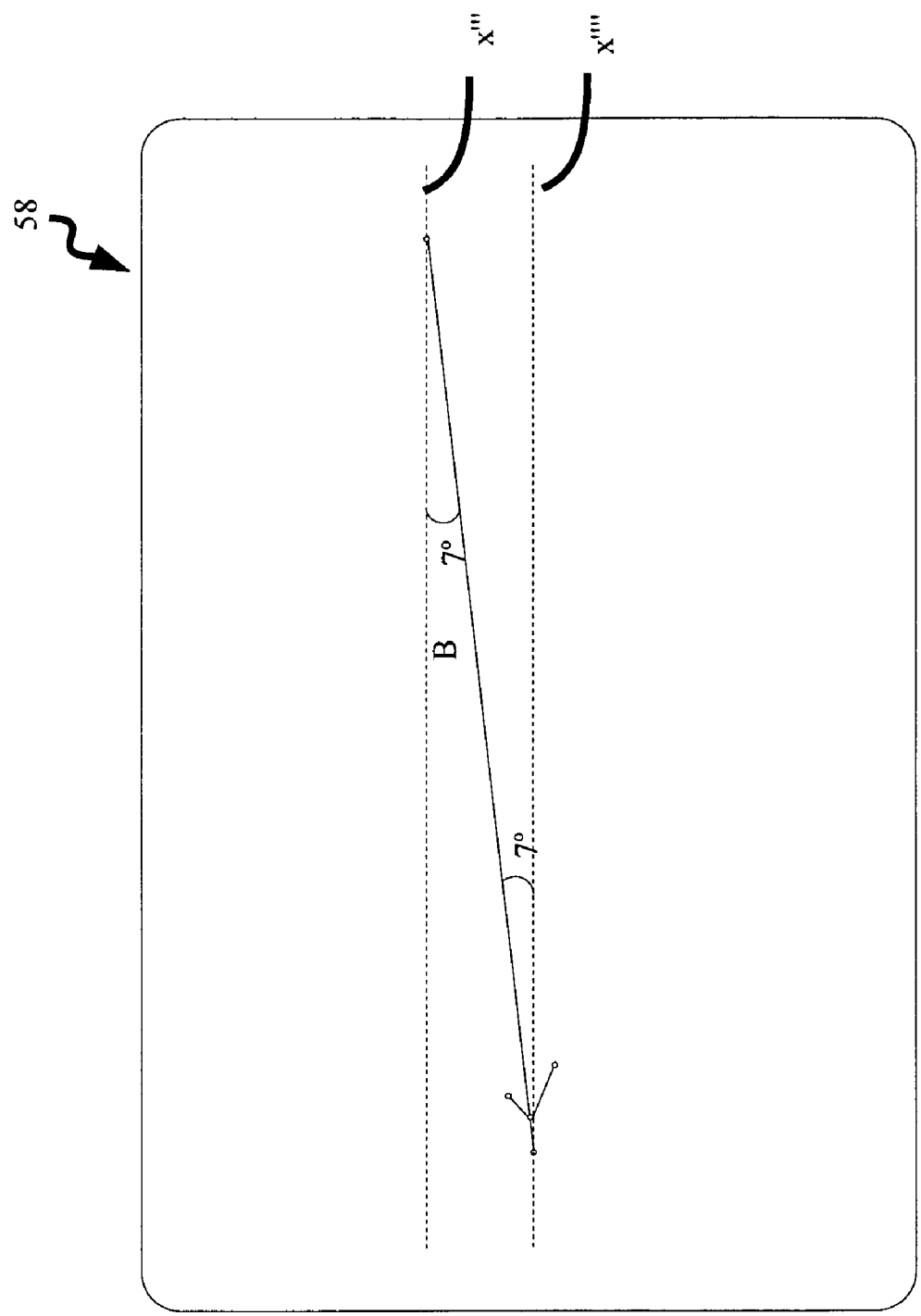
FIG. 35 shows polyline B of FIG. 31 forming an angle of seven degrees with the horizontal axis, x''' and x''''.
Figure 36:
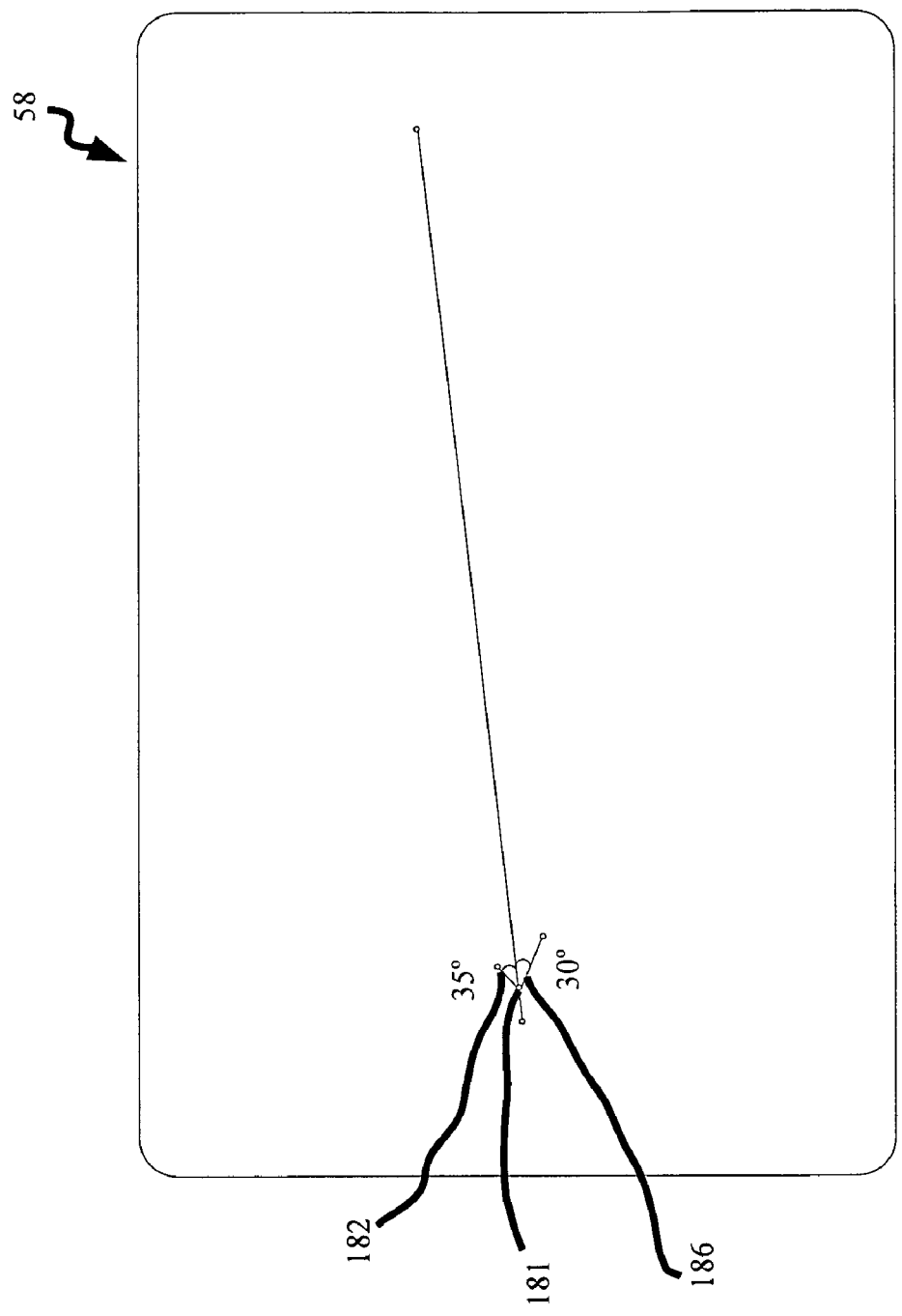
FIG. 36 shows polyline B of FIG. 31 forming an angle of thirty five degrees with line segment 182 and an angle of thirty degrees with line segment 186.

For the purposes of an example, it is assumed that devices 42 have captured image 38*a*1 of pattern 38 as shown in FIG. 2, and that the pattern boundary of device 38 has been digitized, vectorized and recognized in accordance with method 200*a*. It is also assumed that, in this example, a different color filter is used than in the example used to describe method 200*a*. It is also assumed that the color filter in the present example results in elements 88*a*2, 90*a*2 and 92*a*2 appearing darker than they did in FIG. 6, which during the conversion of grey scale raster data to black and white raster data results in elements 88*a*2, 90*a*2 and 92*a*2 being converted to elements 88*a*5, 90*a*5 and 92*a*5, and subsequently vectorized in accordance with method 200*a* to give rise to image 38*a*6 as demonstrated in FIGS. 29 and 30. As illustrated in FIGS. 29 and 30, respectively, image 38*a*5 (in FIG. 29) and image 38*a*6 (in FIG. 30) include pattern elements similar to those of image 38*a*2 in FIG. 2, and like elements in images 38*a*5 and 38*a*6 bear the same reference as their counterparts in image 38*a*2, except are followed with the suffix "a5" and "a6" instead of the suffix Andrew, At step 204*g*, vector points are received. In the case of the present example, and as demonstrated in FIG. 30, initial and end points of vectors, hereinafter "vector points" 176, forming image 38*a*6, are received at step 204*g*. It is understood that vectors form various lines, including straight lines, curve lines and polygons. Next, at step 208*g*, vector information on polygons is received. In the present example, it is assumed that all polygons have already been identified in accordance with method 200*a*, and that information on vector points forming these polygons is received. Next at step 212*g*, all vector points that form polygons are removed. In the case of the present example, vector points forming elements 78*a*6 and 86*a*6 are removed from the vector data received at step 204*g*, leaving only open polylines, as demonstrated at FIG. 31. Next at step 216*g*, the remaining polylines are labeled sequentially. In the case of the present example, all remaining polylines in FIG. 31 are labeled sequentially from A-E. Next at step 220*g*, a polyline is selected in sequential order. In the case of the present example, the first polyline in sequence, i.e., polyline A, is selected. Next the method advances to step 224*g*, where it is determined whether the selected polyline has already been encountered. If the selected polyline has already been encountered, the method ends. However, if the selected polyline has not been encountered, the method proceeds to step 228*g*, where it is determined whether all points forming the selected polyline lie on a straight line. If all points on the selected polyline lie on a straight line, the method proceeds to step 232*g*, where it is determined whether all points on the selected polyline lie within the pattern boundary. On the other hand, if all the points on the selected polyline do not lie on a straight line, the method returns to step 220*g*, where another polyline is selected in sequential order. Various methods can be used to determine whether a plurality of points lie substantially on a straight line. One method is to determine whether the direction of vectors forming the polyline are substantially close in order that they can be considered equal, which would mean they form a straight line. Another method would be to measure the alignment of the polyline with an image of a perfect straight line, through, for example, a normalized cross-correlation technique. In the case of the present example, and referring now to FIG. 32, polyline A does not align with an image of a perfect straight line 178. As a result, the method returns to step 220*g*, where the next polyline is selected in sequential order. In the case of the present example, and referring again to FIG. 31, polyline B is now selected. Next, the method proceeds through step 224*g*, where it is determined that polyline B has not already been encountered. The method then advances to step 228*g*, where it is once again determined whether all points forming the selected polyline lie on a straight line. This time, however, and referring now to FIG. 33, all points on polyline B align substantially with another image of a perfect straight line 180, and the method then advances to step 232*g*, where it is determined whether all points on the selected polyline lie within the pattern boundary. If all points on the selected polyline lie within the pattern boundary, method 200*g* advances to step 236*g*, where it is determined whether the polyline is approximately "horizontal". However, if all points do not lie within the pattern boundary, the method returns to step 220*g*, where the next polyline is selected in sequential order. In the case of the present example, and referring now to FIG. 34, the image of the pattern boundary, previously detected in method 200*a*, is inserted back into screen 58, and it is determined that all points on polyline B lie within the pattern boundary. Method 200*g*, thus, proceeds to step 236*a* (236*g*) where it is determined whether the selected polyline is approximately horizontal. If the selected polyline is approximately horizontal, the method proceeds to step 240*g*, where it is determined whether the selected polyline has an arrowhead at one end. However, if the selected polyline is not approximately horizontal, the method returns to step 220*g*, where another polyline is selected in sequential order. Various methods can be used to determine whether a line is approximately horizontal, an example of which involves measuring the angle between the line and horizontal axis $x'''$ and $x''''$, placed at either ends of the line segment, as shown on FIG. 35. In the present example, it is assumed that a line is approximately horizontal if it is within ten degrees of a horizontal axis. Referring again to FIG. 35, polyline B is within seven degrees of either horizontal axis $x'''$ or $x''''$ and is, thus, considered approximately horizontal. Method 200*g*, thus, advances to step 240*g*, where it is determined whether the polyline has an arrowhead at one end. Once again, various methods can be used to detect an arrowhead. One method includes trying to align any intersecting lines with an image of a perfect arrowhead and determining the results of a normalized cross-correlation of the intersecting lines with the image of a perfect arrowhead. Another method includes determining whether there is a vector point on the selected polyline that is intersected by two other (much shorter) line segments, with predefined maximum lengths, each of which is less than positive ninety degrees on either side of the selected polyline and each of which does not intersect another pattern element or line segment. In the case of the present example, and referring now to FIG. 36 there is a point 181 on polyline B, which is intersected by line segments 182 and 186. Line segment 182 is thirty-five degrees from polyline B, and line segment 186 is thirty degrees from polyline B. Accordingly, each of line segments 182 and 186 are less than ninety degrees on either side of the selected polyline. Accordingly, in the case of the present example, it is determined that polyline B has an arrowhead, and the method advances to step 244*g*, where it is determined whether the selected polyline has a length within an acceptable range. If the selected polyline is found to have a length within an acceptable range, method 200*g* advances to step 248*g*, where the selected polyline is stored as a grain line. However, if the polyline is found not to have a length within an acceptable range, the method returns to step 220*g* where another polyline is selected in sequential order. Various methods can be used to make this determination. For now it is assumed that an acceptable range is 80% of the width of the garment pattern. In the present example, it is assumed that the length of the garment pattern is found to be within an acceptable range. The method, thus, advances to step 248g where the selected polyline is stored as a grain line.

Figure 37:
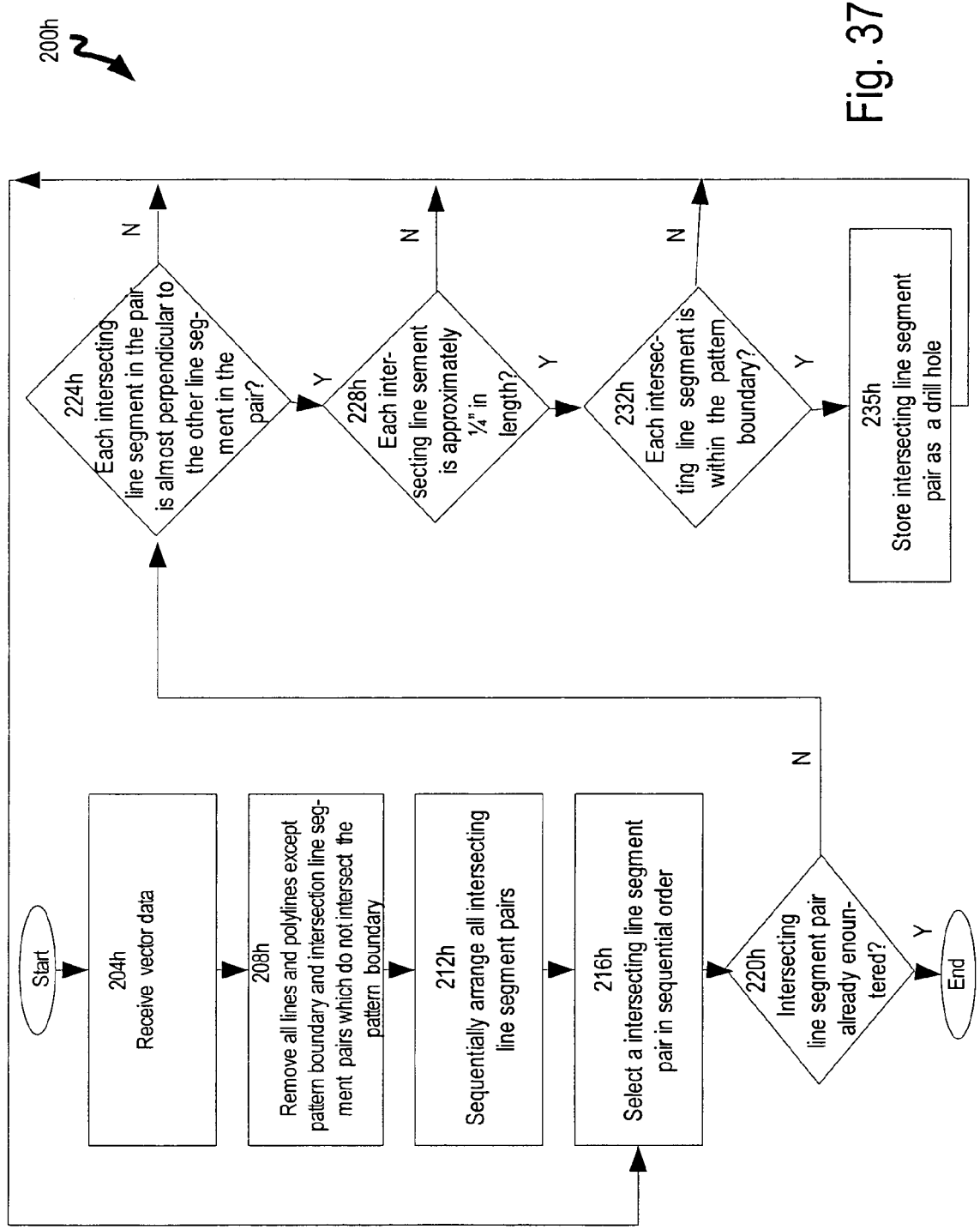
FIG. 37 shows a flow chart of a method for finding drill holes in accordance with another embodiment of the invention.

Referring now to FIG. 37, another specific implementation of method 200, the recognition of drill holes, is indicated generally at 200h, which shall be outlined below. Drill holes can be used to identify the location of buttons, snaps, and the like. They can also be used to signify dart ends. As indicated in FIG. 37, at step 204h of method 200h, vector data is received. Next at step 208h, all polylines, except pattern boundary and intersecting line segment pairs which do not intersect the pattern boundary, are removed. Next at step 212h, all intersecting line segment pairs are sequentially arranged. Next at step 216h, one intersecting line segment pair is selected in sequential order. Next at step 220h, it is determined whether the selected intersecting line segment pair has already been encountered. If the selected intersecting line segment pair has already been encountered, the method ends. If, on the other hand, it is determined that the selected intersecting line segment pair has not been encountered, the method proceeds to step 224h, where it is determined whether each line segment in the pair is approximately perpendicular to the other line segment in the pair. If each line segment in the pair is not approximately perpendicular to the other line segment in the pair, method 200h returns to step 216h, where a new intersecting line segment pair is selected in sequential order. However, if each intersecting line segment pair is approximately perpendicular to the other line segment, method 200h proceeds to step 228h, where it is determined whether each line segment is approximately a quarter of an inch in length. If it is determined that each line segment is not approximately a quarter of an inch in length, method 200h returns to step 216h, where a new intersecting line segment pair is selected in sequential order. However, if it is determined that each line segment is approximately a quarter of an inch in length, method 200h proceeds to step 232h, where it is determined whether each line segment is within the pattern boundary. If it is determined that each line segment is not within the pattern boundary, method 220h returns to step 216h, where a intersecting line segment pair in sequential order is selected. However, if it is determined that each line segment is within the pattern boundary, method 200h proceeds to step 235h, where the intersecting line segment pair is stored as a drill hole.

Figure 38:
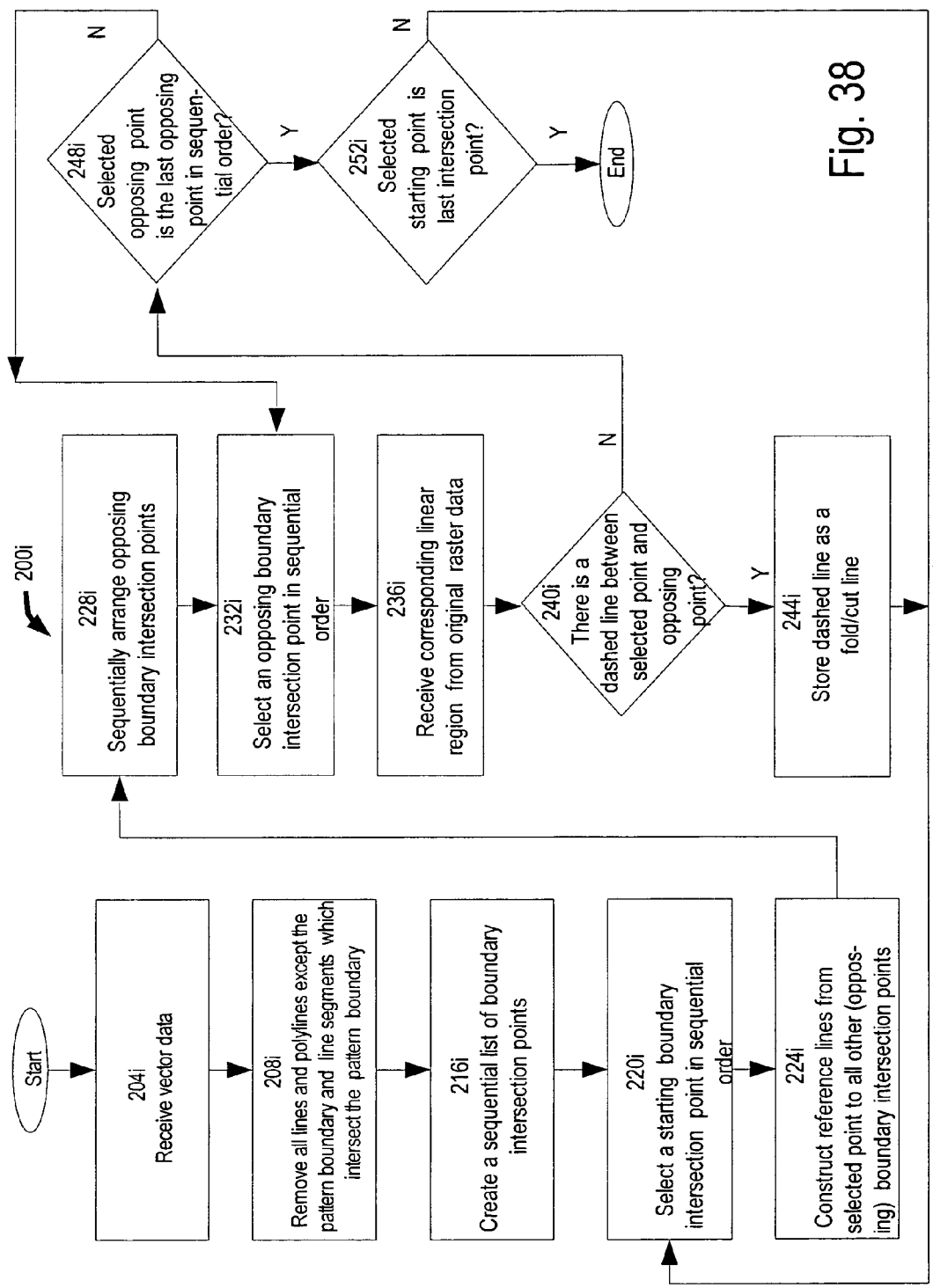
FIG. 38 shows a flow chart of a method for finding fold-cut lines in accordance with another embodiment of the invention.

Referring now to FIG. 38, another specific implementation of method 200, the recognition of fold-cut lines, is indicated generally at method 200i, which shall be outlined below. Fold lines and cut lines both appear as dashed lines in garment patterns and as such look very similar. As a result in the present embodiment of the invention there is a search for a hybrid pattern elements referred to as "fold-cut" lines. As indicated in FIG. 38, at step 204i of method 200i, vector data is received. Next, method 200i proceeds to step 208i, where all lines and polylines except the pattern boundary and line segment which intersects the pattern boundary are removed. Method 200i then proceeds to step 216i, where a sequential list of boundary intersection points is created. Next at step 220i, a starting boundary intersection point is selected in sequential order. Next at step 224i, a plurality of reference lines are constructed from the selected point to all other (opposing) boundary intersection points. Next at step 228i, all opposing boundary intersection points are arranged sequentially. Next at step 232i, an opposing boundary intersection point is selected in sequential order. Next at step 236i, the corresponding linear region from the original raster data is received. Next, method 200i proceeds to step 240i, where it is determined whether there is a dashed line between the selected boundary extraction point and the selected opposing point. If it is determined that the selected opposing point is not intersected by a dashed line, method 200i proceeds to step 248i, where it is determined whether the selected opposing point is the last opposing point in sequential order. If, on the other hand, at step 248i, it is determined that the selected opposing point is the last opposing point in sequential order, the method proceeds to step 252i, where it is determined whether the selected starting point is the last intersection point. If the selected starting point is the last intersection point, the method ends. However, if the selected starting point is not the last intersection point, method 200i returns to step 220i, where a new starting point is selected in sequential order. Referring now back to step 248i, if it is determined that the selected opposing point is not the last opposing point in sequential order, method 200i returns to step 232i, where a new opposing boundary intersection point is selected in sequential order. Referring now back to step 240i, if it is determined that the opposing point is intersected by a dashed line, method 200i proceeds to step 244i, where the dashed line is stored as a fold-cut line. Method 200i then returns to step 220i, where the next starting boundary intersection point is selected in sequential order to find any more potential fold-cut lines.

Figure 39:
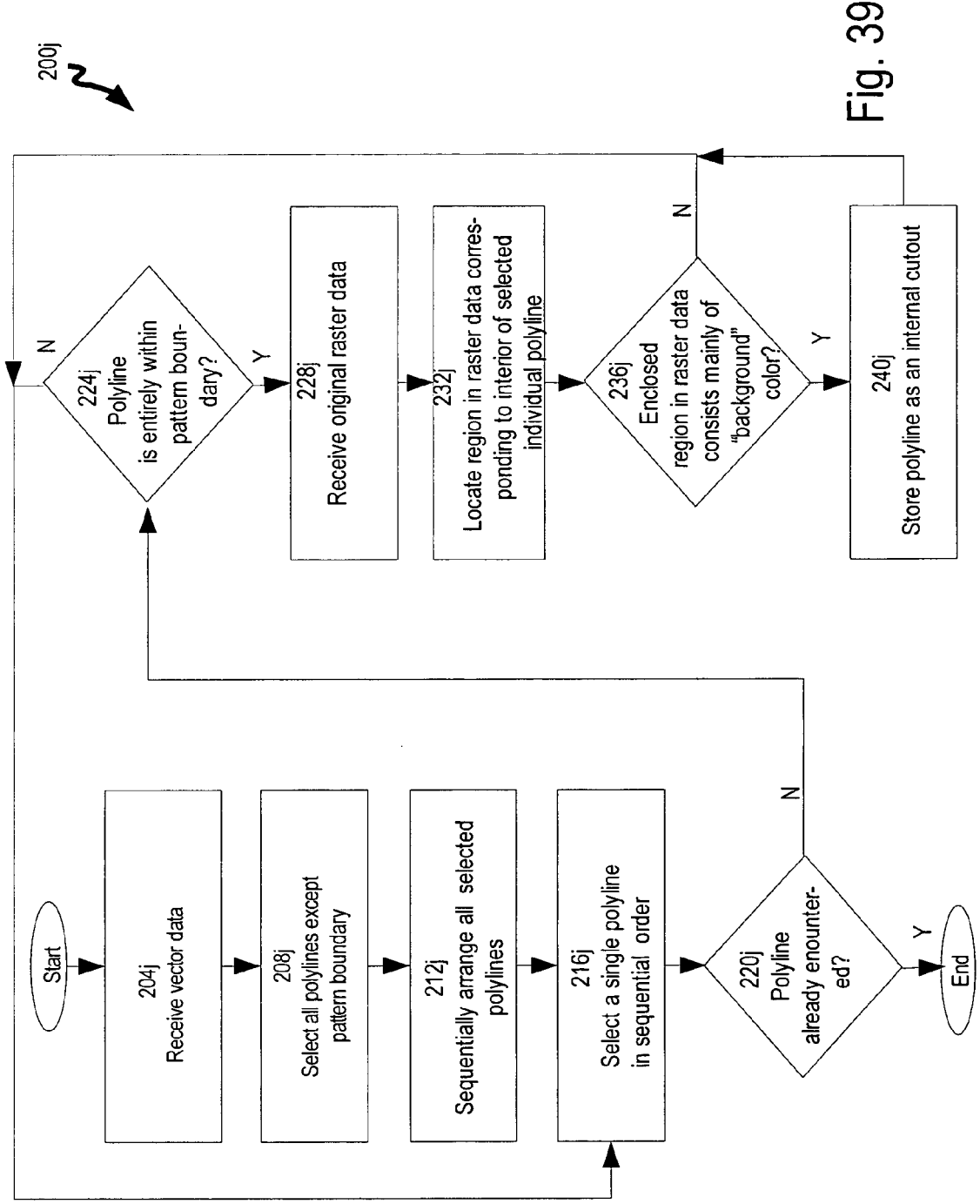
FIG. 39 shows a flow chart of a method for internal cut-outs in accordance with another embodiment of the invention.

Referring now to FIG. 39, another specific implementation of method 200, the recognition of internal cutouts, is indicated generally at 200j, which shall be outlined below. As indicated in FIG. 39, at step 204j vector data is received. Next, at step 208j, all polylines, except the pattern boundary, are selected. Next at step 212j, all selected polylines are sequentially arranged. Next, at step 216j, a polyline is selected in sequential order. Next at step 220j, it is determined whether the selected polyline in step 216j has already been encountered. If the selected polyline has already been encountered, the method ends. On the other hand, if the selected polyline has not already been encountered, method 200j proceeds to step 224j, where it is determined whether the selected polyline is entirely within the pattern boundary. If the selected polyline is not entirely within the pattern boundary, method 200j returns to step 216j, where a new polyline is selected in sequential order. If, however, the selected polyline is entirely within the pattern boundary, method 200j proceeds to step 228j, where the original raster data is received. Next, method 200j proceeds to step 232j, where a region in the raster data corresponding to the interior of selected individual polylines is located. Method 200j next proceeds to step 236j, where it is determined whether the enclosed region in the original raster data consists mainly of the "background color" (of the imaging apparatus. If the enclosed region in the original raster data consists mainly of the background color of the pattern, the method proceeds to step 240j, where the polyline is stored as an internal cutout and the method returns to step 216j, where a new polyline is selected in sequential order. If, on the other hand, the enclosed region in the original raster data does not include the background color of the pattern, method 200j returns to step 216j, where a new polyline is selected in sequential order.

Figure 40:
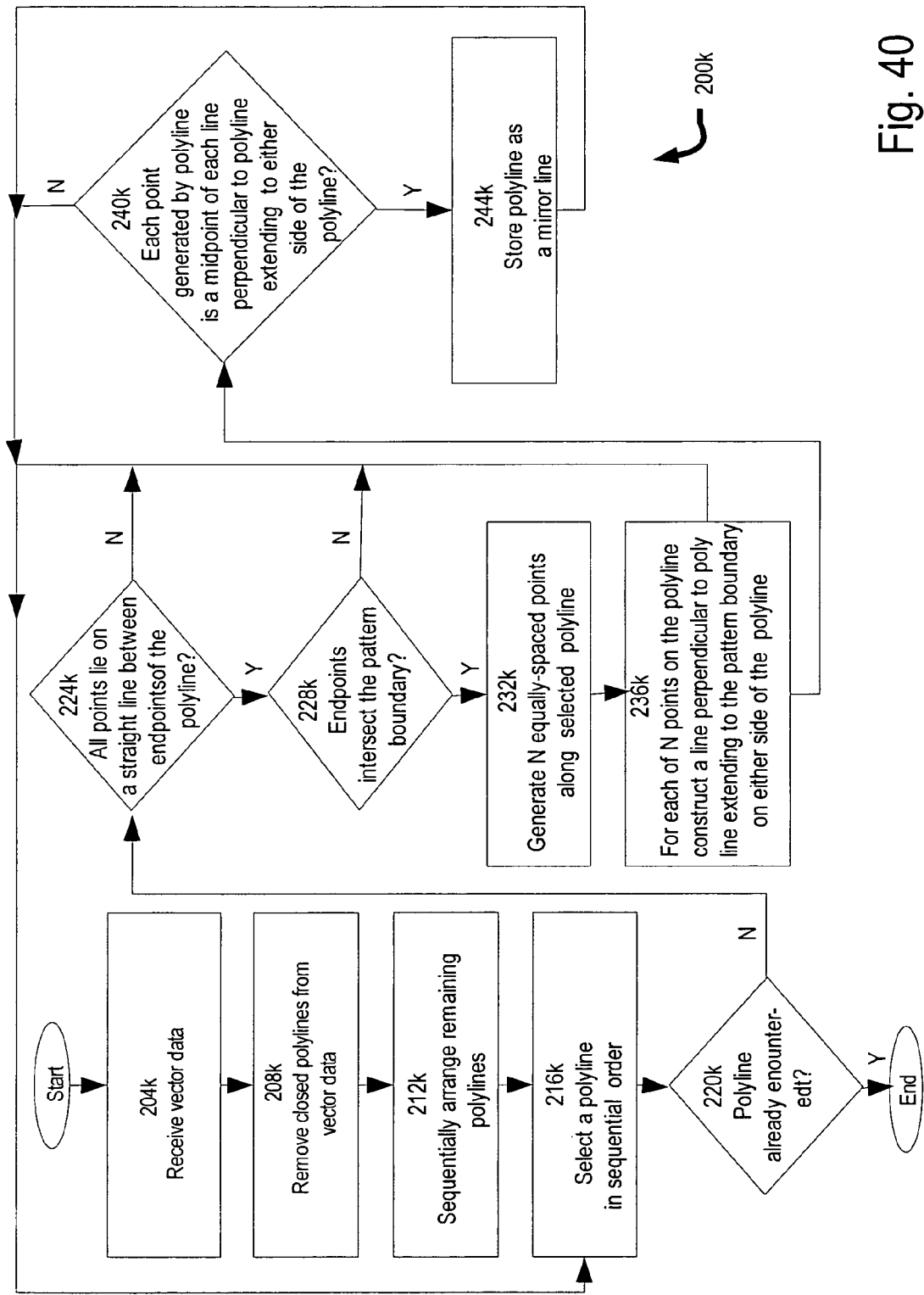
FIG. 40 shows a flow chart of a method for mirror lines in accordance with another embodiment of the invention.

Referring now to FIG. 40 another specific implementation of method 200, the recognition of mirror lines is indicated generally at 200k, which shall be outlined below. Mirror lines signify the center of a piece with symmetrical sides. For example, a shirt collar would have a mirror line at the middle of the pattern piece. As indicated in FIG. 40, at step 204k vector data is received. Next, at step 208k, all closed polylines are removed from the vector data. Next at step 212k, all remaining polylines are sequentially arranged. Next at step 216k, a polyline is selected in sequential order. Method 200k next proceeds to step 220k, where it is determined whether the selected polyline has already been encountered. If the selected polyline has already been encountered, the method ends. However, if the selected polyline has not already been encountered, method 200k proceeds to step 224k, where it is determined whether all points on the selected polyline lie on a straight line between endpoints of the polyline. If all points do not lie on a straight line between endpoints of the polyline, method 200k returns to step 216k, where a polyline is selected in sequential order. If, on the other hand, all points on the selected polyline do lie on a straight line between endpoints of the polyline, method 200k proceeds to step 228, where it is determined whether endpoints of the selected polyline intersect the pattern boundary. If the endpoints of the selected polyline do not intersect the pattern boundary, method 200k returns to step 216k, where a polyline is selected in sequential order. If, on the other hand, the endpoints of the selected polyline do intersect the pattern boundary, method 200k proceeds to step 232k, where N equally-spaced points are generated along the selected polyline. Method 200k next proceeds to step 236k, where for each of the N points, a line is constructed that is perpendicular to the polyline and extends to the pattern boundary on either side of the polyline. Method 200k then proceeds to step 240k, where it is determined whether each point generated by the selected polyline is a midpoint of each line constructed in step 236k. If each point generated by the selected polyline is a midpoint of each line constructed in step 236k, method 200k proceeds to step 244k, where the selected polyline is stored as a mirror line. However, if each point generated by the polyline is not a midpoint of each line constructed in step 236k, method 200k returns to step 216k, where a new polyline is selected in sequential order.

Figure 41:
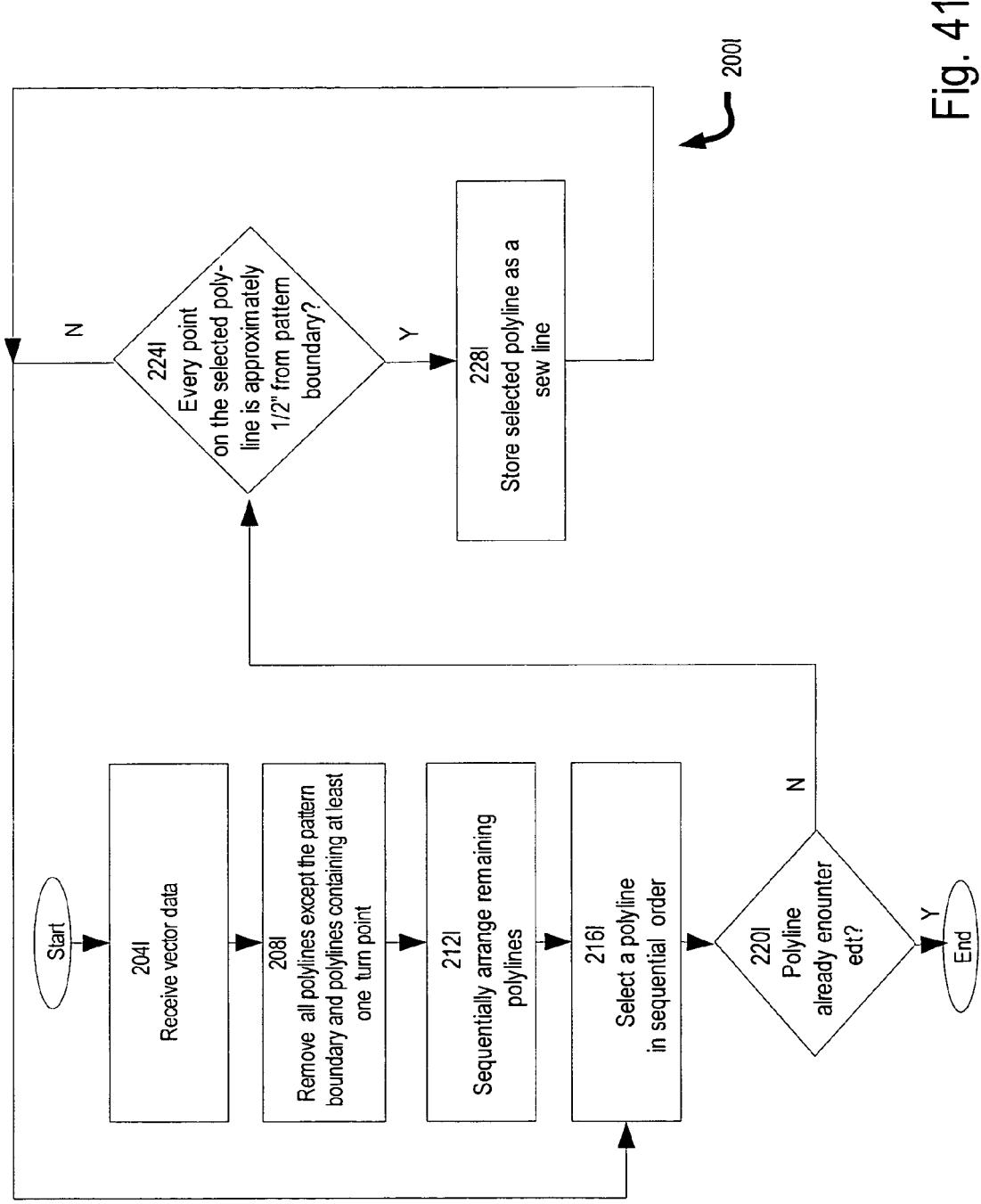
FIG. 41 shows a flow chart of a method for finding sew lines in accordance with another embodiment of the invention.

Referring now to FIG. 41, another specific implementation of method 200, the recognition of sew lines, is indicated generally at 200l, which shall be outlined below. At step 204l, vector data is received. At step 208l, all polylines, except the pattern boundary and polylines containing at least one turn point, are removed. Next, at step 212l, the remaining polylines are sequentially arranged. Next, at step 216l, a polyline is selected in sequential order. Next, at step 220l, it is determined whether the selected polyline in step 216l has already been encountered. If it is determined that the selected polyline has already been encountered, method 200l ends. On the other hand, if it is determined that the selected polyline has not already been encountered, method 200l proceeds to step 224l, where it is determined whether every point on the selected polyline is approximately one-half inch from the pattern boundary (i.e. whether each point on the polyline is within a defined range around one-half inch). If it is determined that every point on the selected polyline is not approximately one-half inch from the pattern boundary, method 200l returns to step 216l, where a new polyline is selected in sequential order. If, on the other hand, every point on the selected polyline is approximately one-half inch from the pattern boundary, the method proceeds to step 228l, where the selected polyline is stored as a sew line, and from there, the method returns to step 216l, where a new polyline is selected in sequential order.

Figure 42:
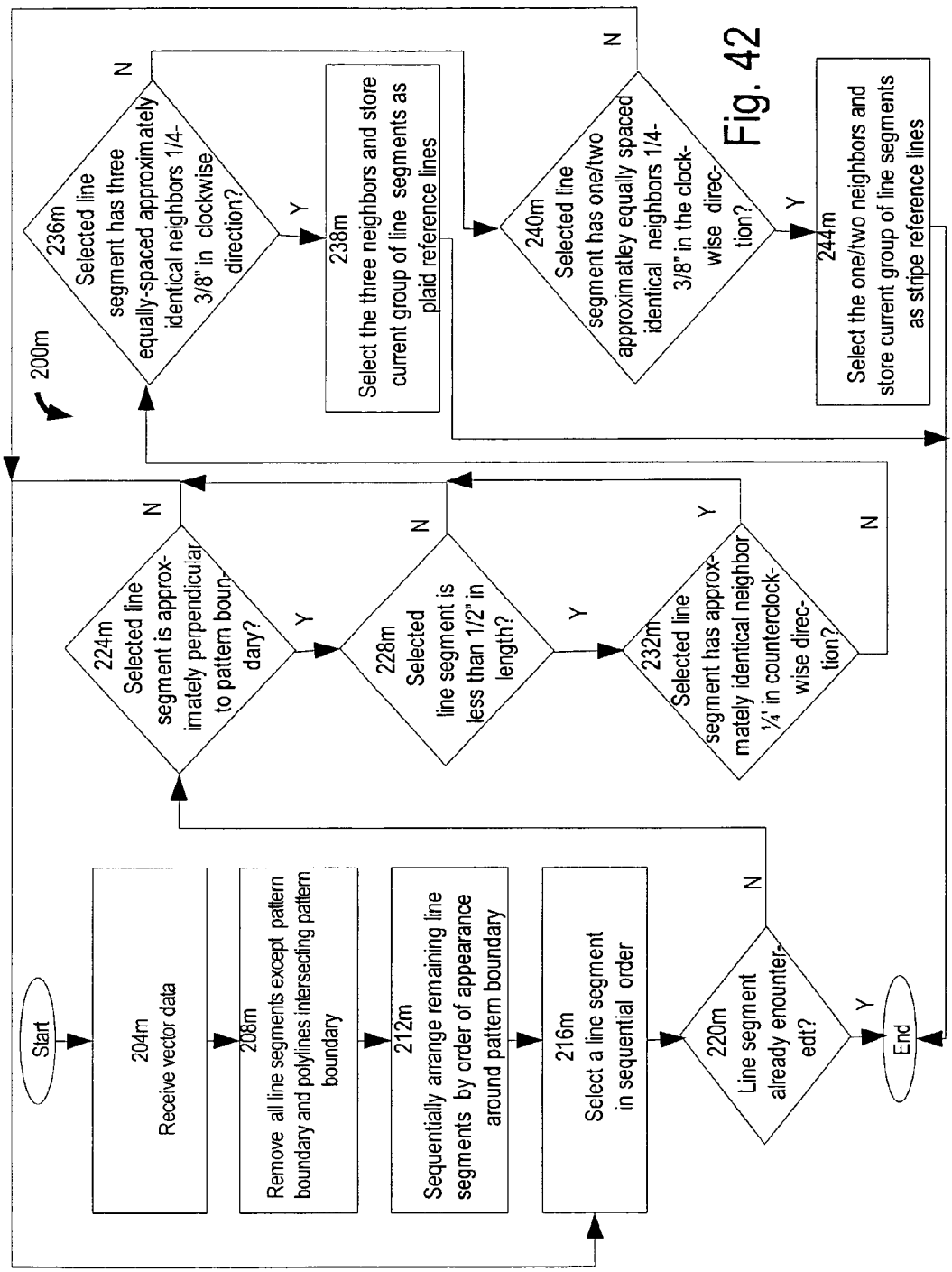
FIG. 42 shows a flow chart of a method for finding plaid reference lines and stripe reference lines in accordance with another embodiment of the invention.

Referring now to FIG. 42, another specific implementation of method 200, the recognition of plaid reference lines and stripe reference lines, is indicated generally at 200m, which shall be outlined below. At step 204m, vector data is received. Next, at step 208m, all polylines except the pattern boundary and polylines intersecting the pattern boundary are received. Next, at step 212m, all remaining polylines are arranged by order of appearance around the pattern boundary. Next, at step 216m, a polyline is selected in sequential order. Next, at step 220m, it is determined whether the selected polyline has already been encountered by method 200m. If the selected polyline has already been encountered, method 200m ends. However, if the selected polyline has not already been encountered, method 200m proceeds to step 224m, where it is determined whether the selected line segment is approximately perpendicular to the pattern boundary. If the selected line segment is not approximately perpendicular to the pattern boundary, method 200m returns to step 216m, where a new line segment is selected in sequential order. However, if the selected line segment is approximately perpendicular to the pattern boundary, method 200m advances to step 228m, where it is determined whether the selected line segment is less than one-half inch in length. If the selected line segment is not less than one-half inch in length, method 200m returns to step 216m were a new line segment is selected in sequential order. If, on the other hand, the selected line segment is less than one-half inch in length, method 200m advances to step 232m, where it is determined whether the selected line segment has an approximately identical neighbor, one-quarter inch in the counter-clockwise direction. If it is determined that the selected line segment has an approximately identical neighbor one-quarter inch in the counter-clockwise direction, the method returns to step 216m where a new line segment is selected in sequential order. If, on the other hand, it is determined that the selected line segment does not have an approximately identical neighbor one-quarter inch in the counter-clockwise direction, the method advances to step 236m, where it is determined whether the selected line segment has three equally-spaced, approximately identical, neighbors in a distance of approximately one-quarter inch to three-eighths inch in the clockwise direction. If the selected line segment has three equally spaced, approximately identical, neighbors in a distance of approximately one-quarter inch to three-eighths inch in the clockwise direction, method 200m advances to step 238m, where the group of line segments (i.e., the selected line segment and the three neighbors described in step 236m), are stored as plaid reference lines and the method ends. If, on the other hand, it is determined that the selected line segment does not have three equally-spaced, approximately identical neighbors, approximately one-quarter inch to three-eighths inch in the clockwise direction, method 200m advances to step 240m, where it is determined whether the selected line segment has one or two approximately equally spaced identical neighbors one-quarter to three-eighths inch in the clockwise direction. If the selected line segment has one or two approximately equally spaced identical neighbors one-quarter to three-eighths inch in the clockwise direction, method 200m advances to step 244m, where the current group of lines (i.e., the selected line segment and the one or two neighbors described in step 240m) are stored as stripe reference lines and the method ends. If, on the other hand, the selected line segment does not have one or two approximately equally spaced identical neighbors one-quarter to three-eighths inch in the clockwise direction, method 200m returns to step 216m, where a new line segment is selected in sequential order.

Figure 43:
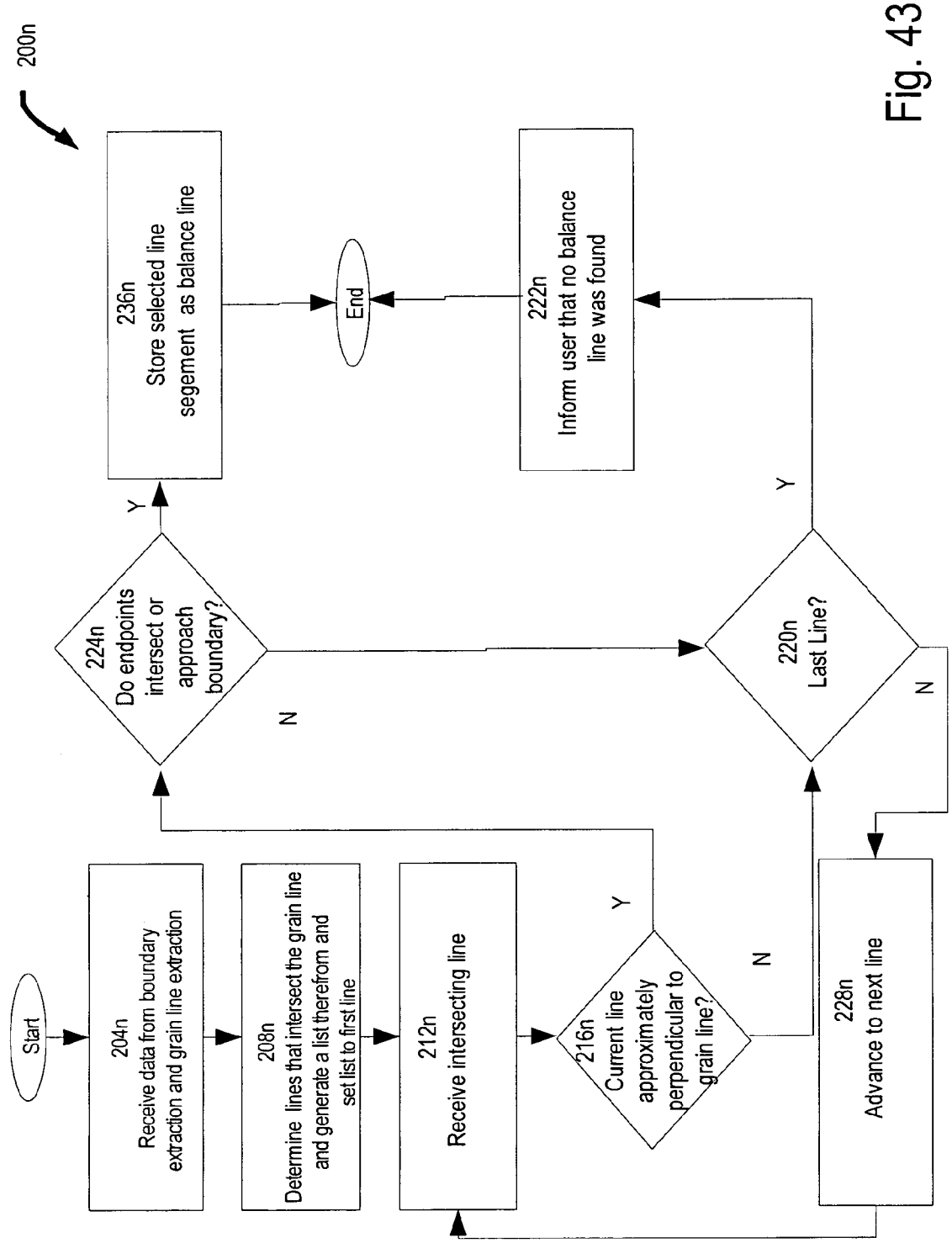
FIG. 43 shows a flow chart of a method for finding a balance line in accordance with another embodiment of the invention.

Referring now to FIG. 43, another specific implementation of method 200, the recognition of the balance line, is indicated generally at 200n. Beginning at step 204n, data is received from the results of performing the boundary extraction method and the grain line extraction method as described herein or using any other desired method. Next, at step 208n, a examination is made of the data from step 204 to determine all lines that intersect the grain line, and a list of all of those intersections is generated therefrom.

At step 212n, an intersecting line is received from the list generated at step 208n. During the first pass through step 212n, the first intersecting line is the first in the list. Next, at step 216n, a determination is made as to whether the current line is approximately perpendicular to the grain line. If no, then it is determined that the current intersecting line is not a grain line and the method advances to step 220n. At step 220n, a determination is made as to whether the last intersecting line from the list generated at step 208n has been examined. If not, the method advances to step 228n, where the list from step 208n is advanced to the next intersecting line, and the method returns to step 212n as previously described.

If, however, at step 216n it is determined that the current intersecting line is approximately, (i.e. substantially) perpendicular to the grain line, then the method advances to step 224n and a determination is made as to whether the endpoints of the current intersecting line approach, or actually intersect with the boundary of the image. (By "approach", it is to be understood that any desired range can be used, such as within about one inch of the boundary.) If it is determined that the current intersecting line does approach the boundary, then the method advances to step 236n, and the current intersecting line is stored as a balance line, and the method ends.

If, at step 224n, however, it is determined that the endpoints do not approach or intersect with the boundary, then the method advances to step 220n and a determination is made as to whether the last line has been reached in the list generated at step 208n, as previously described. If there are further lines to be examined, then method 200n cycles back to step 212n and proceeds thereafter as previously described until either a balance line is reached, or all lines in the list from step 208n are exhausted without having found a balance line. If no balance line is found, then the method advances to step 222n from step 220n and the user is advised that no balance line was found.

Figure 44:
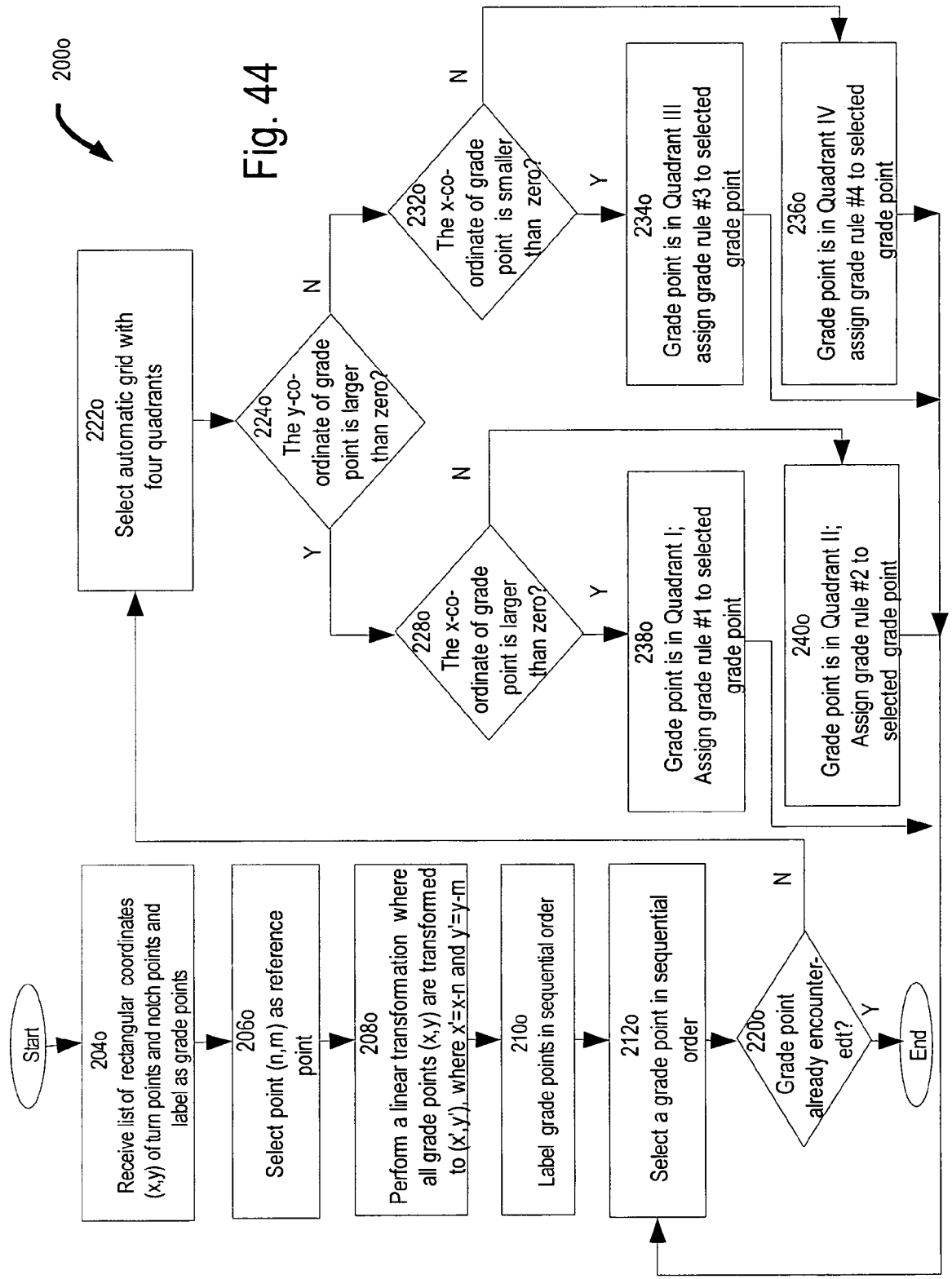
FIG. 44 shows a flow chart of a method for conducting a fully-automatic grade rule number assignment in accordance with another embodiment of the invention.

Referring now to FIG. 44, another specific implementation of method 200, the performance of an a fully-automatic grade rule number assignment function is indicated generally at 200o, which is outlined below. Of note, part of the automated grade point number assignment process, an algorithm automatically analyzes and tags all turn points and notches about the pattern as potential grade points to be acted on. Moreover, in the explanation of this method, it is assumed that a grading grid layout with pre-defined reference points has already been assigned to the pattern piece. One method of assigning such grading grid layouts shall be further explained below in method 200p. At step 204o a list of rectangular coordinates (x,y) of turn points and notch points is received and labeled as grade points. The list of turn points and notch points can be obtained from a variety of methods such as method 200b and 200d discussed above. Next, at step 206o, a point (n, m) is selected as reference point. Various methods can be used to determine a reference point. One such method includes choosing the reference point (n, m) as the center mass point of the pattern piece.

Next at step 208o, a linear transformation is performed where all grade points (x,y) are transformed to points (x', y'), where x'=x−n and y'=y−m. Next, at step 210o, the grade points are labeled in sequential order. Next, at step 212o, a grade point is selected in sequential order. Next, at step 220o, it is determined whether the selected grade point has already been encountered. If it is determined that the selected grade point has already been encountered, method 200o ends. However, if it is determined that the selected grade point has not been already been encountered, method 200o advances to step 222o, where an automatic grid is selected. An example of a method that can be used to select an automatic grid will be discussed in method 200p below. In the present example, the automatic grid that is selected has four quadrants. However, as will be apparent in the explanation of method 200p below, an automatic grid selected in method 200p can have a variety of different quadrants, which will in turn modify steps 224o-240o discussed below. Next, at step 224o, it is determined whether the y-coordinate of the selected grade point is larger than zero. If it is determined that the y-coordinate of the selected grade point is larger than zero, method 200o advances to step 228o, where it is determined whether the x-coordinate of the selected grade point is larger than zero. At step 228o, if the x-coordinate of the selected grade point is larger than zero, the method advances to step 238o, where the selected grade point is stored as being in Quadrant I, and grade rule #1 is assigned to the selected grade point, and method 200o advances to step 212o where a new grade point is selected in sequential order. If, on the other hand, at step 228o, it is determined that the x-coordinate of the selected grade point is not larger than zero, method 200o advances to step 240o, where the selected grade point is in Quadrant II, and grade rule #2 is assigned to the selected grade point. Next, from step 240o, method 200o returns to step 212o, where a selected grade point is selected in sequential order. However, if at step 224o, it is determined that the y-coordinate of the selected grade point is not bigger than zero, method 200o advances to step 232o, where it is determined whether the x-coordinate of the grade point is smaller than zero. If, at step 232o, it is determined that the x-coordinate of the selected grade point is smaller than zero, method 200o advances to step 234o, where the selected grade point is determined to be in Quadrant III, and grade rule #3 is assigned to the selected grade point, and method 200o returns to step 212o where a new grade point is selected in sequential order. On the other hand, if at step 232o, the x-coordinate of the selected grade point is determined to be not smaller than zero, method 200o advances to step 236o, where the selected grade point is determined to be in Quadrant IV, and grade rule #4 is assigned to the selected grade point. Next, from step 236o, the method returns to step 212b, where a new grade point is selected in sequential order.

The coordinate system describing each grade point mentioned above can be relative to a point on the grain line of the pattern. However, while the main grain line is the primary reference for grading the entire pattern piece, other grade reference lines can also be used as a grade reference for a specific area of the piece. For example, an alternate grading reference is commonly applied to garment tops that have an attached sleeve. The grain line is the grade reference for the main body and the alternate grade reference is applied to the sleeve.

Figure 45:
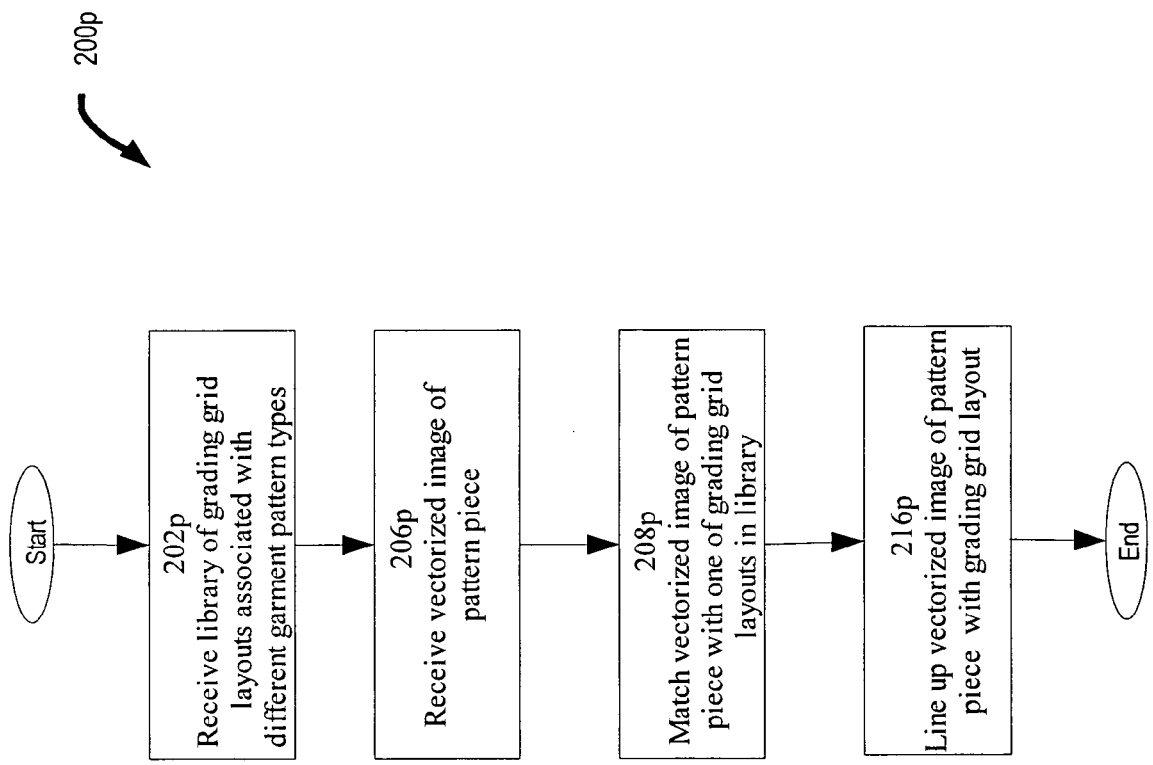
FIG. 45 shows a flow chart of a method for assigning a grading grid layout to a pattern piece in accordance with another embodiment of the invention.

Referring now to FIG. 45, another specific implementation of method 200, the assignment of a grading grid layout to the pattern piece is indicated generally at 200p, which shall be outlined below. Grading grid layouts provide a specific layout of quadrants, with specific grade rule numbers for each particular pattern piece type. As such, a library of pre-arranged quadrant layouts and their respective grade rule numbers can be assembled to accommodate a practical variety of pattern piece types. For example, the library might contain a pre-arranged quadrant layout that could appropriately be applied to a jacket front piece. Another pre-arranged quadrant layout in the library can exist to appropriately fit a jacket back piece. A multiple plurality of independent libraries could be assembled and applied to the described process.

Referring again to FIG. 45, at step 202p, a library of grading grid layouts associated with different garment pattern types is received. Next, at step 206p, the vectorized image of the pattern piece is received. The vectorized image of the pattern piece can be obtained from a variety of methods such as method 220 described previously. Next, at step 208p, the vectorized image of the pattern piece is matched with one of the grading grid layouts associated with different pattern types. Various methods can be used to make this match. For example, an algorithm can be used to analyze the shape of the pattern piece to be processed and find a match within library of quadrant layouts. Another example, is to determine the grading grid layout associated with a pattern type that provides the most favorable cross correlation result with the vectorized image of the pattern piece received at step 206p. In another embodiment of the invention, the user can have the option to manually scroll through the library of pre-arranged quadrant layouts and make a choice based on either layout shape or name. Next, at step 216p, the grading grid layout chosen at step 208p is lined up with the vectorized image of the pattern piece. An example of a method used to align the grading grid layout for the vectorized image of the garment pattern is to have a reference point on it that aligns with a reference point on the pattern piece to be graded. To achieve this, an algorithm can automatically align the center mass point of the grid with the center mass point of the piece. Meanwhile, another algorithm can automatically align the axis of the grid with the axis of the pattern piece so that the two axes are parallel.

Figure 46:
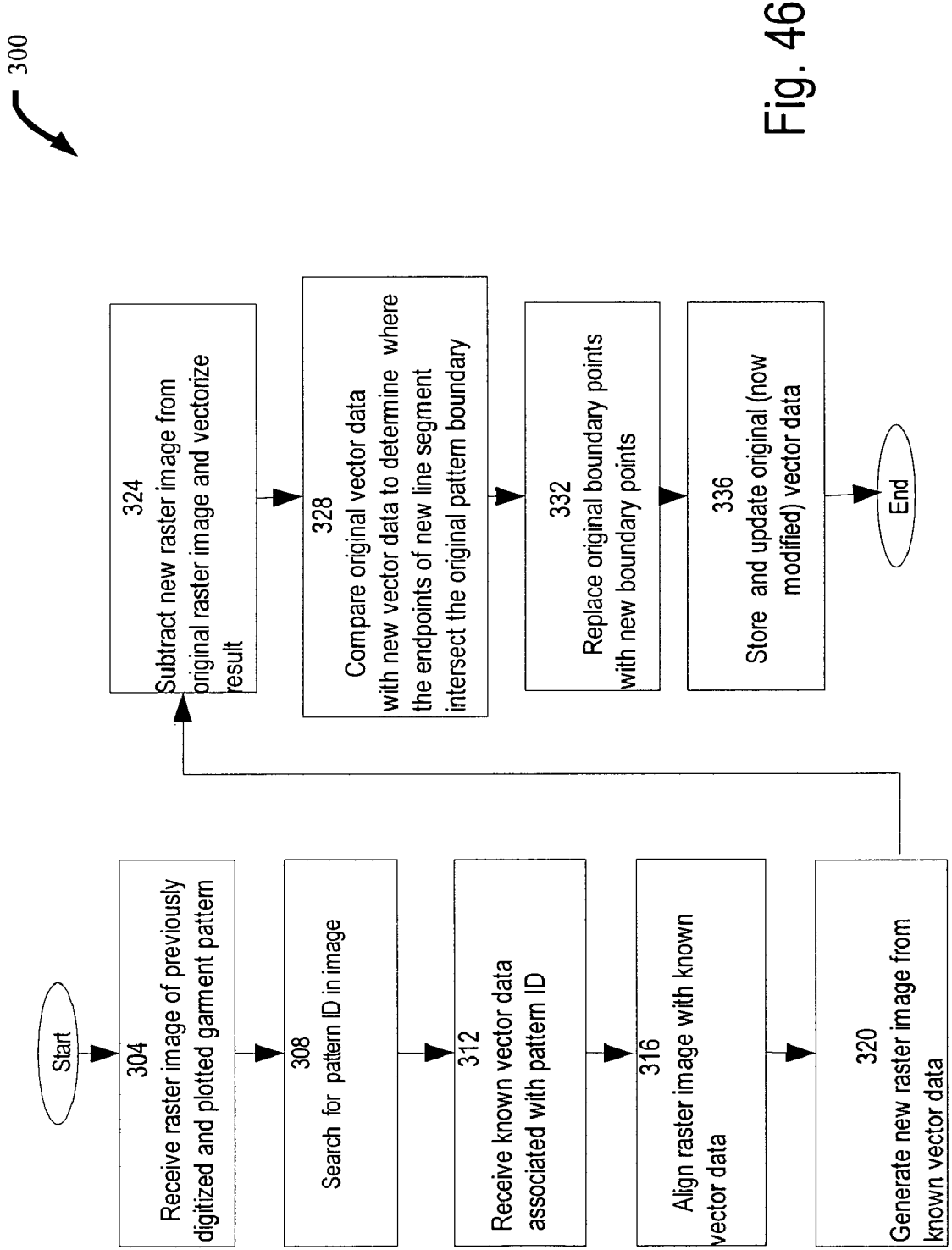
FIG. 46 shows a flow chart of a method of correcting pattern boundaries in accordance with another embodiment of the invention.

In another embodiment of the invention, subsequent to identifying a pattern element, corrections can be made to various pattern elements either automatically or manually. Referring now to FIG. 46, method 300 is a specific example of how an automatic method of correcting the pattern boundary. (Other embodiments can be directed to correcting other elements.) One purpose of this process is to allow the pattern maker to continue drafting patterns using the traditional tool that he or she feels is already skilled with and have an automatic apparatus and method to perform the time consuming remedial tasks that are inherent to the job.

Before explaining method 300 in detail, it is assumed that after performing method 200 (and/or its variants) on a particular pattern, each pattern is assigned a unique identifier referred to herein as a "PatternID". A barcode corresponding to the PatternID can be generated that is applied to any print out or plot of the digitized pattern. Put in other words, after the initial pattern is vectorized through method 200 and its variants, it is assigned a unique Pattern ID. This Patten ID is then configured to appear inside the pattern boundaries as it is plotted on paper. It can be used to identify a particular pattern as a unique unit that has already been entered into database of digitized patterns.

Thus, beginning at step 304, a raster image data is received. The received raster image is data is taken from a printout or "plot" of a garment pattern that has been previously digitized according to method 200 (and/or its variants). The plot includes the PatternID, and also includes manually drawn corrections that have been marked directly on the plot using the traditional tools of the trade. Such corrections can apply to both the boundary and internal items of the pattern, and would only involve new lines. (The erasure of any unwanted lines is optional, as the system can be configured to automate this step). Thus, this raster image of the augmented plotted pattern is captured via a CCD camera or a scanner device as previously described.

Next, at step 308 a search of the raster image received at step 304 is performed for a Pattern ID. At step 312, the retrieved patternID is then used to locate a known set of "good" vector data that corresponds with the PatternID. Having located the vector data, a copy of that vector data is received from storage and further used as described below.

Next, at step 316, the raster image received at step 304 is aligned with the known vector data located and received at step 312. Based on the reference points within the known good vector data, the new raster image of the plotted pattern received at step 304 is aligned with the vector data from the original digitized pattern piece. Such alignment can be performed with rotations and translations until an alignment is achieved.

Next, at step 320, a raster image is regenerated of the corresponding original digitized pattern piece from the vector data received at step 312.

At step 324, the raster image created at step 320 is subtracted from the raster image received at step 304. The result of this step leaves only the newly drafted lines from the pattern makers correction. These results are then vectorized.

Next, at step 328, a comparison is made between the vector data received at step 312 with the of the new vector data generated at step 324. One set of algorithms can be applied to identify data that represents new internal lines so they can be added to the data set of the original digitized pattern piece. Other algorithms can be applied to identify data representing new line segments that intersect the original pattern's boundary. To the software, these intersections represent a gap in the original pattern's boundary.

Next, at step 332, the data from these new line segments generated at step 328 is then inserted into the data set of the original digitized pattern piece received at step 312 to complete a newly defined boundary. The original boundary segment from the raster data received at step 304 is removed and replaced with the new boundary segment found within the vector data from step 312, as matched using step 328. As a result, the replaced boundary segment is automatically erased from view since its representing data has been removed.

At step 336, the now modified vector data is stored as a representation of the original image received at step 304.

As a beneficial result of performing step 300, once all the line corrections have been performed by the software, the pattern maker is allowed the opportunity to manually delete any unwanted digitized lines or items within the pattern piece. At this point the pattern correction is complete and the data set will contain only the vector data of the revised pattern.

It should now be apparent that method 300 can be modified to allow the user to make other types CAD type corrections directly to the vectorized pattern piece. These operations would include, but are not limited to: adding digitized line segments via an input device such as a mouse or stylus, deleting of digitized lines segment, deleting of points within a line segment, moving of points within a line segment, manipulation of point characteristics I.e. changing a turn point into a curve point, manipulation of line characteristics I.e. changing a perimeter line segment to a mirror line, etc.".

Referring now to FIG. 47, method 400 is a specific example of a manual method of correcting the pattern boundary. At step 404, raster data, vector data and a sample of a pattern ID are received. Next, at step 408, the raster data and the vector data are both searched in order to find reference to the pattern ID in each one. Next, at step 412, all raster data and vector data not associated with the pattern ID are removed. Next, at step 416, reference points from the ID marker are used to align the raster image with the vector data on display. Next, at step 420, adjustments are made to the vector data via a Graphical User Interface. Next, at step 424, the modified vector data from step 420 is stored and updated and method 400 ends. While methods 300 and 400 describe and automatic and manual correction of a digitized pattern boundary, it is understood that all elements can be similarly corrected, including, notches, grain lines, mirror lines, internal cutouts, stripe reference lines, plaid reference lines, drill holes, sew lines, cut/fold lines, balance lines, turn points and curve points.

While the embodiments discussed herein are directed to specific examples, it will be understood that subsets and variations of the embodiments are within the scope of the invention. For example, it should now be understood that methods 200a to 200o are only examples of ways in which method 200 can be modified to automatically recognize any type of pattern element desired. Furthermore, methods 300 and 400 are only examples of ways in which an already recognized and stored pattern element can be automatically or manually altered to provide a desired result. Furthermore, any output file generated by the present invention can have the ability to be viewed for correctness. Accordingly, the automated digitizing software can have an onscreen ASTM/MMA-DXF file viewer as well as the ability to plot a copy of a digitized pattern. The onscreen viewer can allow the user to know if the piece has actually been processed properly. For example, the user can identify questionable items such as grain or alternate grade reference lines, or he/she can inspect the results of a pattern plotted on white paper to check against latent defects on a digitized pattern.

It must further be understood that the specific criteria enumerated in each step of methods 200a-200o are mere examples of criteria that can be used to identify each pattern element, and that different criteria can also be used. For example, several different criteria can be used to identify a grain line, only some of which were used in method 200g described above. These criteria include finding the longest line that runs the length of the pattern, finding the line roughly parallel to the mass of the pattern, and finding internal lines intersecting the line at a perpendicular angle.

Furthermore, specific references to specific numbers and/or specific shapes in methods 200a-200o and methods 300 and 400 are only examples. Methods 200a-200o can be modified and used to recognize pattern elements of various shapes and sizes. Moreover, various tolerance settings, degrees of freedom and ranges of numbers can be defined in connection to any numbers or measurement references described above, including inaccuracies of handmade patterns. For example, in recognizing turn points, the corner (i.e., a turn point) of a hand made pattern may be slightly rounded from handling such that instead of one turn point, several turn points (that are also curve points) may be recognized. The present invention includes methods compensating for this through either tolerance settings applied during conversion, or separate methods that search for such points and make corrections to the CAD/CAM system compatible file format.

Furthermore, although specific references have been made to conversion of pattern elements to the ASTM/AAMA-DXF file format, it is understood that conversion of specific pattern elements to any file format compatible with CAD/CAM system is within the scope of the invention.

Finally system 30 is only an example of a system that can be implemented to capture and analyze the image of a garment pattern. A heads-down interactive display can also be used for performing the input, output, as well as the edit functions. A heads down interactive display is a horizontally angled interactive display that responds directly to a pen (stylus) touching its screen's surface. The operator interacts with the system using this "interactive pen display" in place of a mouse. The interactive pen display acts as a combination display and work surface, allowing the users to take advantage of their natural hand-eye coordination to work more quickly and intuitively. The benefits over a typical heads-up display and mouse configuration are now apparent when a CAD operator attempts by computer to mimic the delicately finest pattern corrections of a traditional pattern maker using pencil on paper. For example, if a CAD operator needs to adjust the delicate hip curve on a woman's skirt pattern using a heads-up display and mouse configuration, it can be a laborious and time consuming task as many points along the digitized line need to be subtly moved to achieve the appropriate look. Whereas with the heads-down interactive display the operator can draw directly on the display surface using traditional pattern making tools achieving quick and well finessed results. Additionally, the procedure includes a traditional heads-up display monitor to be used in conjunction with the above mentioned heads-down interactive display. Through this arrangement the user can "zoom in" and edit data through the heads-down interactive display, while retaining a wide-angle overview of the data on the traditional heads-up monitor. Using this interaction/display scheme, the system combines the best attributes of both "heads-down" and "heads-up" operation.

The invention claimed is:

1. A method of digitizing shapes, said method comprising:
receiving at least one data representing at least one shape;
identifying at least one outline of the at least one shape in the at least one data, wherein the outline has a curvature;
identifying at least one corner of the at least one outline wherein said corner is identified by calculating the curvature of the outline in a neighborhood of a point on the outline and determining whether the curvature is at least a pre-defined minimum value; and
identifying at least one notch of the at least one outline wherein said notch, is identified by determining at least three turn points on the outline, including a first turn point followed in a first direction by a second turn point and followed in a second direction by a third turn point, wherein the distance between the first turn point, and the third turn point is less than a predetermined maximum value and at least a predetermined minimum value.

2. The method of claim 1, wherein the at least one notch is represented by a series of point coordinates.

3. A system for digitizing shape, shapes, said system comprising:
a memory arrangement including thereon a computer program: and
a processing arrangement which, when executing the computer program is configured to:
receive at least one data representing at least one shape;
identify at least one outline of the a least one shape in the at least one data,
wherein the outline has a curvature;
identifying at least one corner having a relatively large average curvature of the at least one outline wherein said corner is identified by calculating the curvature of the outline in a neighborhood of a point on the outline and determining whether the curvature is at least a pre-defined minimum value; and
identifying at least one notch of the at least one outline wherein said notch, is identified by determining at least three turn points on the outline, including a first turn point followed in a first direction by a second turn point and followed in a second direction by a third turn point, wherein the distance between the first turn point, and the third turn point is less than a predetermined maximum value and at least a predetermined minimum value.

4. The system of claim 3, wherein the at least one notch is represented by a series of point coordinates.

5. Computer-readable storage medium having stored therein software which, when executed by a processing arrangement, is configured to digitize shapes, said software comprising:
- a first module which, when executed, receives at least one data representing at least one shape;
- a second module which, when executed, identifies at least one outline of the at least one shape in the at least one data, wherein the outline has a curvature;
- a third module which, when executed, identifies at least one corner having a relatively large average curvature of the at least one outline wherein said corner is identified by calculating the curvature of the outline in a neighborhood of a point on the outline and determining whether the curvature is at least a pre-defined minimum value;
- and identifies at least one notch of the at least one outline wherein said notch is identified by determining at least three turn points on the outline, including a first turn point followed in a first direction by a second turn point and followed in a second direction by a third turn point, wherein the distance between the first turn point, and the third turn point is less than a predetermined maximum value and at least a predetermined minimum value.

6. The Computer-readable storage medium of claim 5, wherein the at least one notch is represented by a series of point coordinates.

7. A method of digitizing shapes, said method comprising:
- receiving at least one data representing at least one shape;
- identifying at least one outline of the at least one shape in the at least one data; and
- identifying at least one notch of the at least one outline wherein said notch is identified by determining at least three turn points on the outline, including a first turn point followed in a first direction by a second turn point and followed in a second direction by a third turn point, wherein the distance between the first turn point, and the third turn point is less than a predetermined maximum value and at least a predetermined minimum value.

8. The method of claim 7, wherein said digitized shape corresponds to the shape of a pattern for producing sewn goods.

9. The method of claim 7, wherein said digitized shape corresponds to the shape of a garment pattern.

10. The method according to claim 7, wherein the at least one notch is further identified by a minimum depth.

11. The method according to claim 7, wherein the at least one notch is further identified by a maximum depth.

12. A system for digitizing shapes, said system comprising:
- a memory arrangement including thereon a computer program; and
- a processing arrangement which, when executing the computer program is configured to:
  - receive at least one data representing at least one shape;
  - identify at least one outline of the at least one shape in the at least one data; and
  - identify at least one notch of the at least one outline wherein said notch is identified by determining at least three turn points on the outline, including a first turn point followed in a first direction by a second turn point and followed in a second direction by a third turn point, wherein the distance between the first turn point, and the third turn point is less than a predetermined maximum value and at least a predetermined minimum value.

13. The system of claim 12, wherein said digitized shape corresponds to the shape of a pattern for producing sewn goods.

14. The system of claim 12, wherein said digitized shape corresponds to the shape of a garment pattern.

15. The system according to claim 12, wherein the at least one notch is further identified by a minimum depth.

16. The system according to claim 12, wherein the at least one notch is further identified by a maximum depth.

17. Computer-readable storage medium which, when executed by a processing arrangement, is configured to digitize shapes, said software comprising:
- a first module which, when executed, receives at least one data representing at least one shape;
- a second module which, when executed, identifies at least one outline of the at least one shape in the at least one data; and
- a third module which, when executed, identifies at least one notch of the at least one outline wherein said notch is identified by determining at least three turn points on the outline, including a first turn point followed in a first direction by a second turn point and followed in a second direction by a third turn point, wherein the distance between the first turn point, and the third turn point is less than a predetermined maximum value and at least a predetermined minimum value.

18. The Computer-readable storage medium of claim 17, wherein said digitized shape corresponds to the shape of a pattern for producing sewn goods.

19. The Computer-readable storage medium of claim 17, wherein said digitized shape corresponds to the shape of a garment pattern.

20. The Computer-readable storage medium according to claim 17, wherein the at least one notch is further identified by a minimum depth said digitized.

21. The Computer-readable storage medium according to claim 17, wherein the at least one notch is further identified by a maximum depth.

* * * * *